(12) United States Patent
Reid et al.

(10) Patent No.: US 11,980,306 B2
(45) Date of Patent: May 14, 2024

(54) HEATED BEVERAGE CONTAINER

(71) Applicant: THUNDER DUNGEON INC., Toronto (CA)

(72) Inventors: Roy Andrew Reid, Toronto (CA); Philip Louis Moniz, Toronto (CA)

(73) Assignee: THUNDER DUNGEON INC., Toronto (CA)

( * ) Notice: Subject to any disclaimer, the term of this patent is extended or adjusted under 35 U.S.C. 154(b) by 745 days.

(21) Appl. No.: 17/060,779

(22) Filed: Oct. 1, 2020

(65) Prior Publication Data

US 2022/0104645 A1 Apr. 7, 2022

(51) Int. Cl.
*A47G 19/22* (2006.01)
*A47G 23/03* (2006.01)
*A47J 36/24* (2006.01)

(52) U.S. Cl.
CPC ..... *A47G 23/0313* (2013.01); *A47G 19/2288* (2013.01); *A47J 36/2472* (2013.01)

(58) Field of Classification Search
CPC ............ A47G 23/0313; A47G 19/2288; A47J 36/2472; A61J 9/0615; A61J 11/04; A61J 2200/42; A61J 9/001; A61J 2200/50
USPC ......................................................... 219/432
See application file for complete search history.

(56) References Cited

U.S. PATENT DOCUMENTS

| | | | | |
|---|---|---|---|---|
| 8,618,448 B2 * | 12/2013 | Alexander | ........... | A47G 19/027 165/61 |
| 8,759,721 B1 * | 6/2014 | Alexander | ............ | A47J 36/321 165/61 |
| 9,035,222 B2 * | 5/2015 | Alexander | ............ | A47J 39/025 165/61 |
| 9,782,036 B2 * | 10/2017 | Alexander | .......... | A47J 36/2433 |
| 9,801,482 B1 * | 10/2017 | Alexander | ........... | H05B 1/0244 |
| 9,814,331 B2 * | 11/2017 | Alexander | ........... | A47J 36/2494 |
| 9,863,695 B2 * | 1/2018 | Alexander | ............ | F25D 29/003 |
| 9,974,401 B2 * | 5/2018 | Alexander | .............. | F25B 21/04 |
| 10,010,213 B2 * | 7/2018 | Alexander | .............. | A47G 19/02 |
| 10,098,498 B2 * | 10/2018 | Alexander | .............. | A61J 9/003 |
| 10,413,119 B2 * | 9/2019 | Alexander | ............... | H05B 3/06 |
| 2002/0074334 A1 * | 6/2002 | Karp | ................... | A47G 19/2205 220/23.86 |

(Continued)

FOREIGN PATENT DOCUMENTS

AU 2011323416 A1 6/2013
CA 2955921 C 12/2015

(Continued)

*Primary Examiner* — Eric S Stapleton

(74) *Attorney, Agent, or Firm* — Perry + Currier Inc.

(57) ABSTRACT

An apparatus for heating beverages is disclosed. The apparatus includes a base and a container for holding liquids. The base has a heater plate that is heated by one or more heater elements attached to the heater plate. A power source in the base provides electricity to the heater elements. The base is removably attachable to the container. The container has an inner cup that sits inside a chassis. The inner cup is made of metal and has an open top for receiving liquid, a circumferential wall, and a closed bottom. The chassis has an open top for receiving a liquid, a circumferential wall, and an open bottom. When the container is attached to the base, the closed bottom of the inner cup is configured to contact the heater plate and receive heat from the heater plate.

14 Claims, 59 Drawing Sheets

(56) References Cited

U.S. PATENT DOCUMENTS

| | | | | |
|---|---|---|---|---|
| 2008/0105692 A1* | 5/2008 | Hiromori | ............ | A47J 41/0072 220/592.16 |
| 2011/0219956 A1* | 9/2011 | Englert | ............... | A47J 31/0636 219/432 |
| 2012/0103562 A1* | 5/2012 | Alexander | ............ | A47J 39/025 165/64 |
| 2014/0165607 A1* | 6/2014 | Alexander | ........ | A47J 27/21083 62/3.3 |
| 2014/0305927 A1* | 10/2014 | Alexander | .......... | A47J 31/4417 62/3.1 |
| 2015/0096972 A1* | 4/2015 | Glucksman | ........ | A47G 19/2288 219/442 |
| 2015/0153088 A1* | 6/2015 | Kim | .......... | F25D 3/08 62/457.2 |
| 2015/0245723 A1* | 9/2015 | Alexander | ............ | A47J 39/025 219/387 |
| 2017/0042373 A1* | 2/2017 | Alexander | ........ | A47J 27/21083 |
| 2017/0280926 A1* | 10/2017 | Khalifa | .................. | B65D 85/72 |
| 2017/0340146 A1* | 11/2017 | Alexander | .............. | F25B 21/04 |
| 2017/0360226 A1* | 12/2017 | Zeidan | ................. | B65D 51/245 |
| 2018/0220819 A1* | 8/2018 | Alexander | ........ | A47J 36/2494 |
| 2018/0360264 A1* | 12/2018 | Alexander | .......... | A47J 41/0044 |
| 2019/0223635 A1* | 7/2019 | Alexander | .......... | A47J 27/2105 |
| 2020/0008604 A1* | 1/2020 | Fontier | .................... | A47J 31/02 |
| 2020/0367691 A1* | 11/2020 | Alexander | ............ | A47J 41/005 |
| 2021/0068567 A1* | 3/2021 | Ganter, I | ............ | A47G 19/2227 |
| 2022/0053971 A1* | 2/2022 | Alexander | ................ | F25D 3/08 |
| 2023/0088824 A1* | 3/2023 | Alexander | ............ | A47J 31/4417 99/483 |
| 2023/0108807 A1* | 4/2023 | Alexander | ............ | A47J 41/005 99/483 |
| 2023/0148790 A1* | 5/2023 | Alexander | ............ | F25D 31/008 99/483 |

FOREIGN PATENT DOCUMENTS

| | | |
|---|---|---|
| CA | 2900398 C | 8/2019 |
| CH | 144508 | 3/2019 |
| CN | 103430416 B | 1/2016 |
| CN | 106998957 B | 5/2019 |
| EM | 006235040-0001 | 2/2019 |
| EM | 006235040-0002 | 2/2019 |
| EM | 006235040-0003 | 2/2019 |
| EP | 2636118 B1 | 7/2019 |
| KR | 20170138992 A | 12/2017 |

\* cited by examiner

HEATED BEVERAGE CONTAINER

FIELD

The specification is directed to heated containers for beverages.

BACKGROUND

Dishware such as cups and mugs are commonly used to hold beverages. However, hot or warm beverages contained in conventional dishware will lose heat over time. Dishware may be heated with an electric coaster, but this solution is not portable. Additionally, ceramic mugs are poor thermal conductors and are ill-suited to transfer heat from an external heat source to the beverage.

Vacuum-insulated flasks are capable of maintaining heat in a beverage for a longer period of time than ceramic mugs, but not indefinitely. Additionally, vacuum flasks require a lid to effectively keep a beverage warm and are not typically dishwasher-safe.

SUMMARY

It is an aspect of the present invention to provide an apparatus for heating beverages.

The above aspect can be attained by an apparatus that includes a base and a container for holding liquids. The base has a heater plate that is heated by one or more heater elements attached to the heater plate. A power source in the base provides electricity to the heater elements. The base is removably attachable to the container. The container has an inner cup that sits inside a chassis. The inner cup is made of a conductive material and has an open top for receiving liquid, a circumferential wall, and a bottom portion. The chassis has an open top for receiving a liquid, a circumferential wall, and an open bottom. When the container is attached to the base, the bottom portion of the inner cup is configured to contact the heater plate and receive heat from the heater plate.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION

Figure 1:
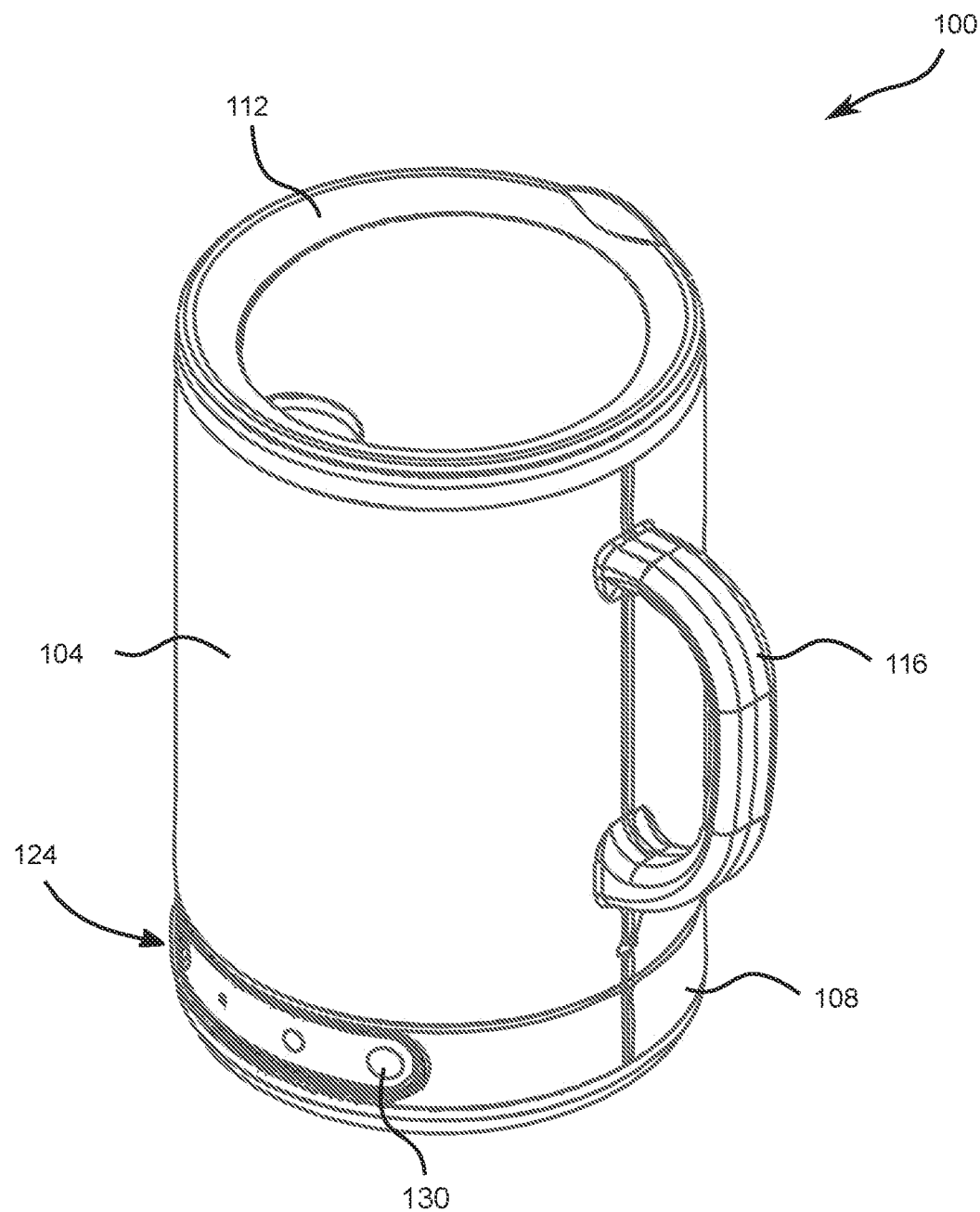
FIG. 1 is a perspective view of an apparatus for heating beverages.
Figure 2:
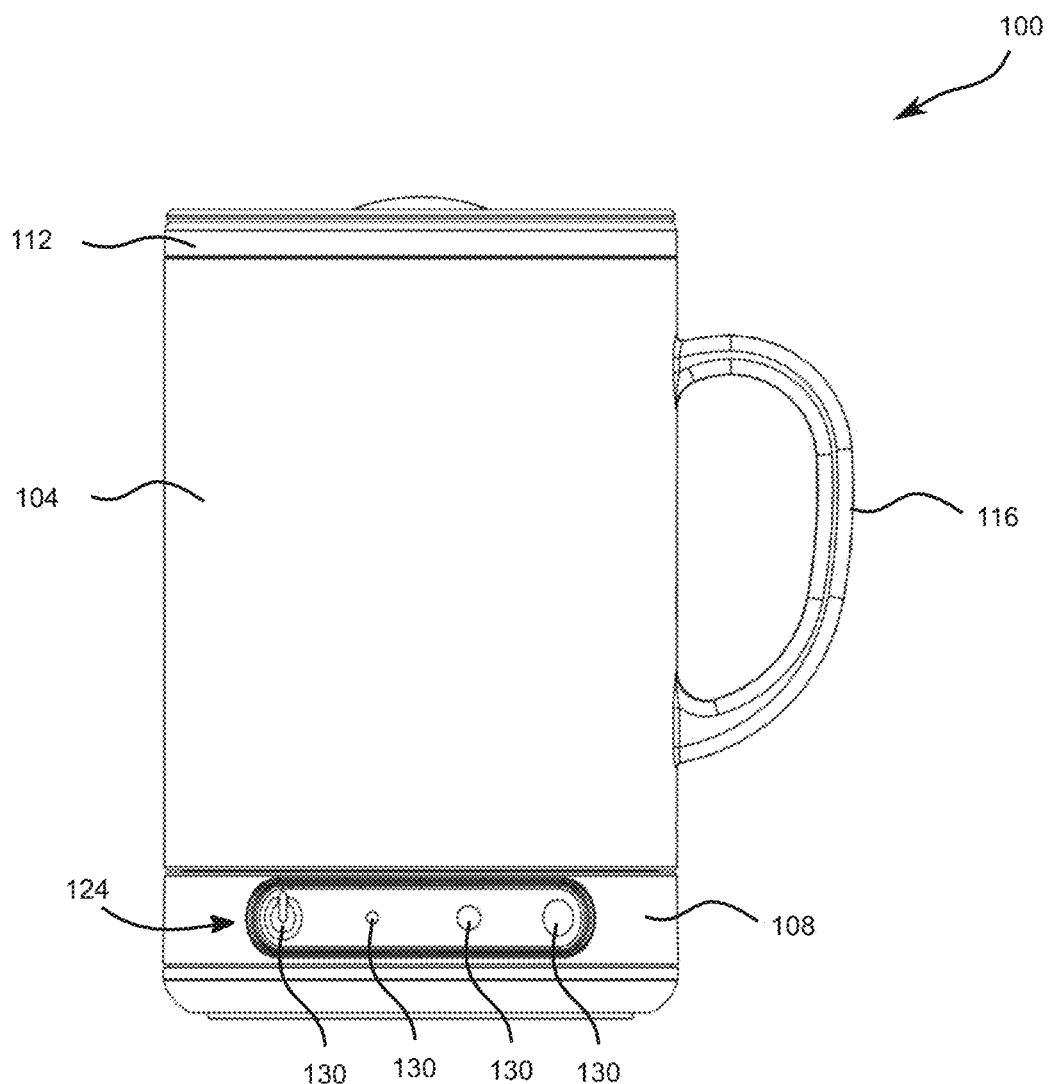
FIG. 2 is a front view of the apparatus from FIG. 1.
Figure 3:
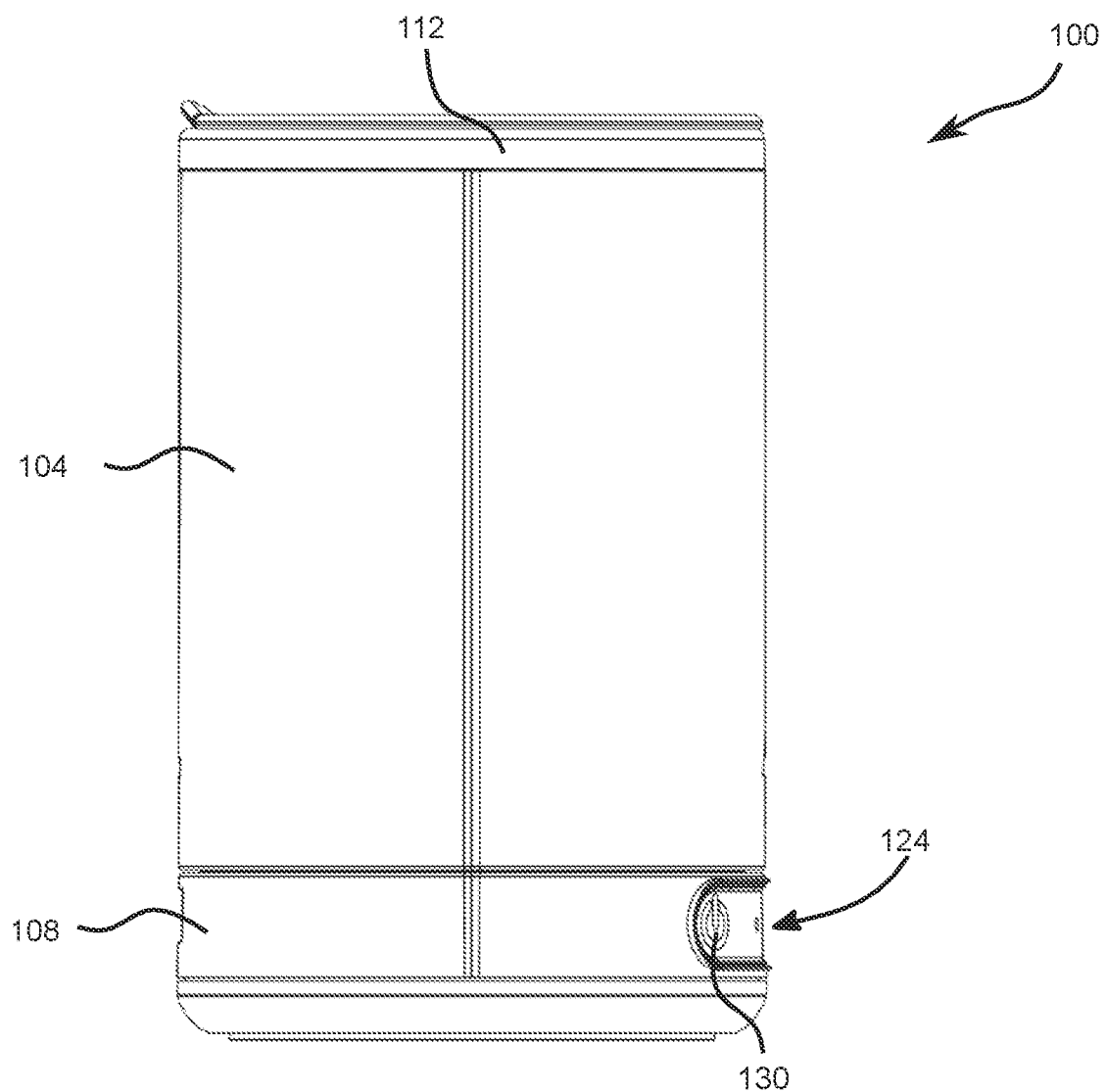
FIG. 3 is a left side view of the apparatus from FIG. 1.
Figure 4:
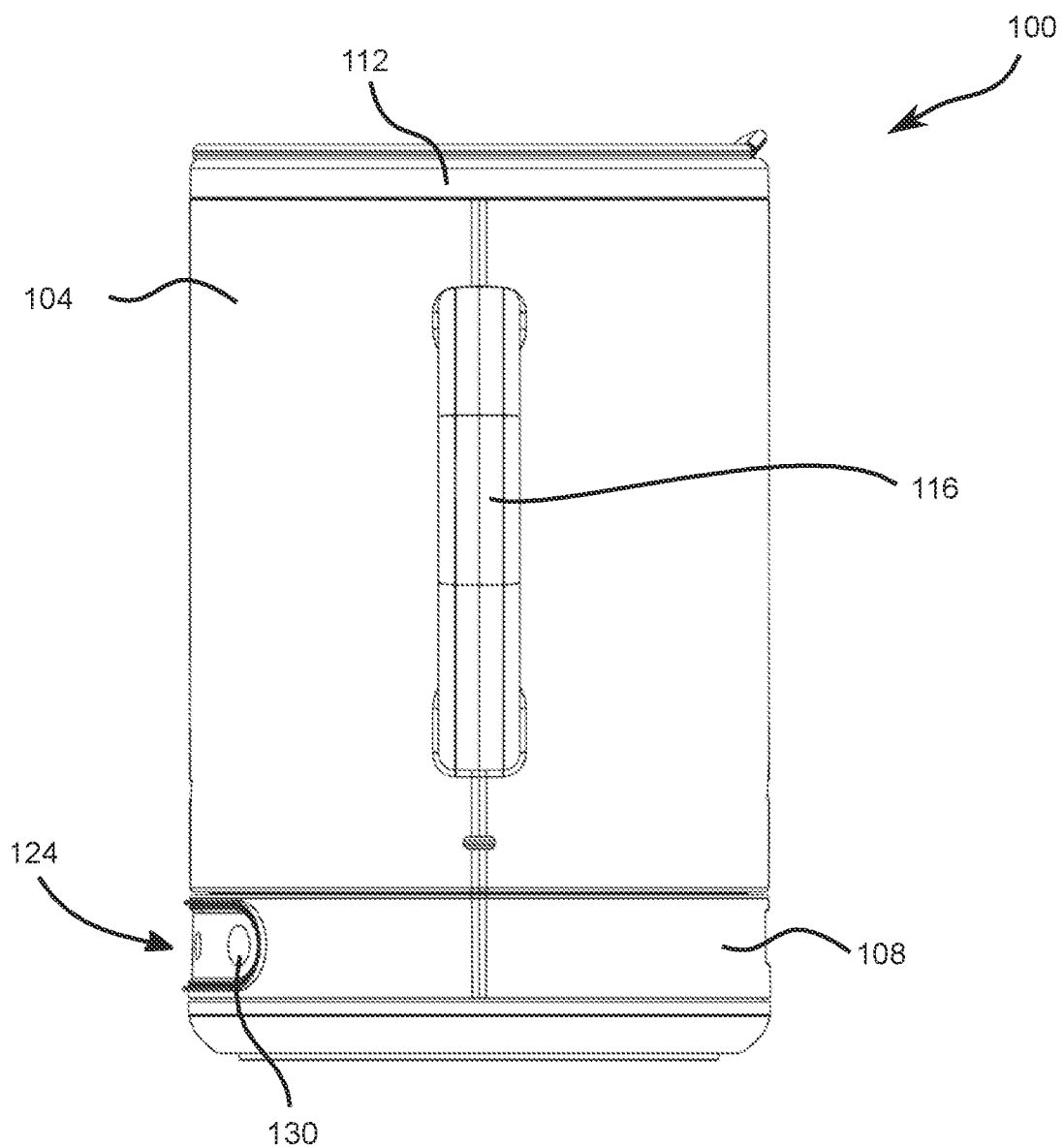
FIG. 4 is a right side view of the apparatus from FIG. 1.
Figure 5:
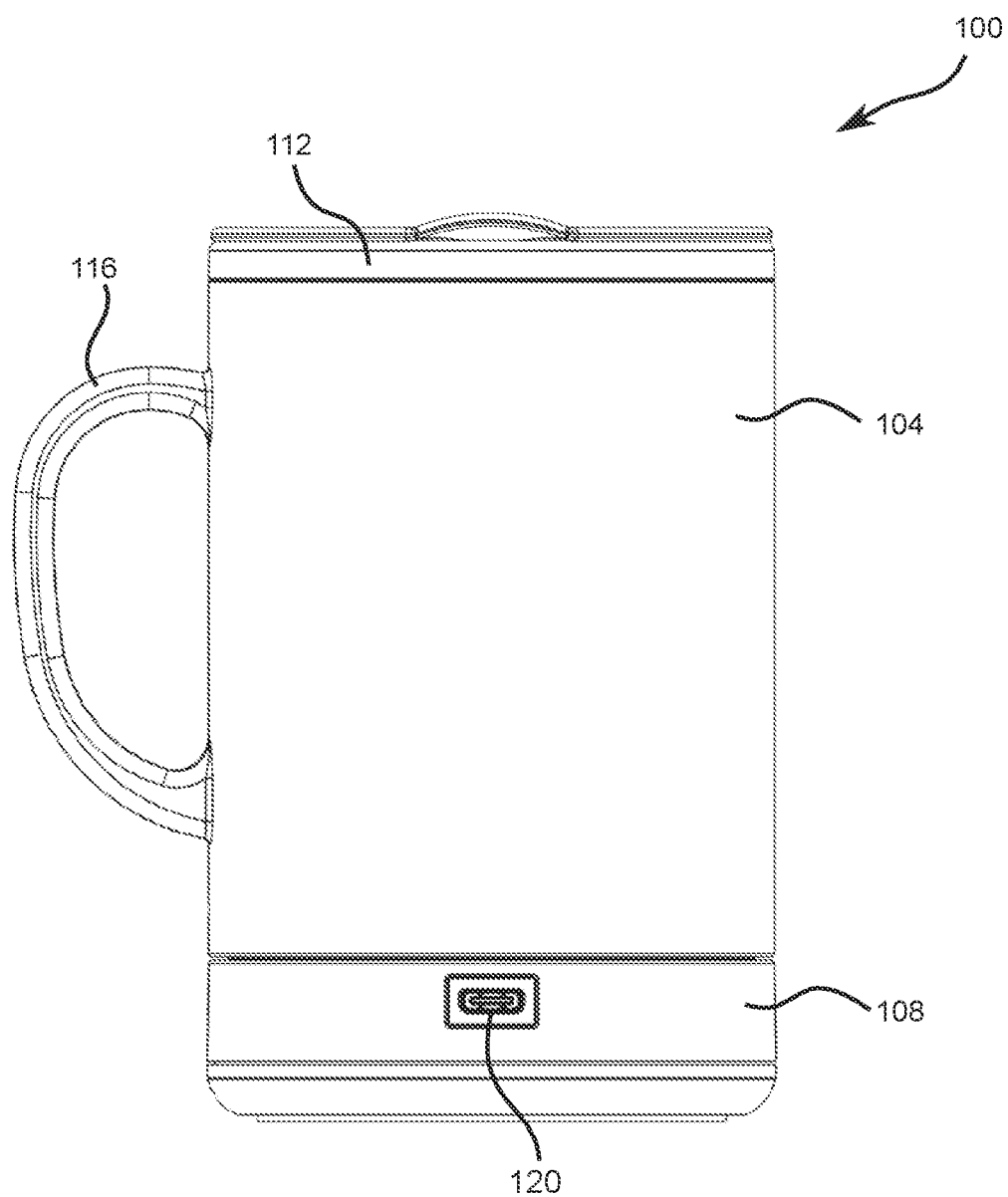
FIG. 5 is a rear view of the apparatus from FIG. 1.
Figure 6:
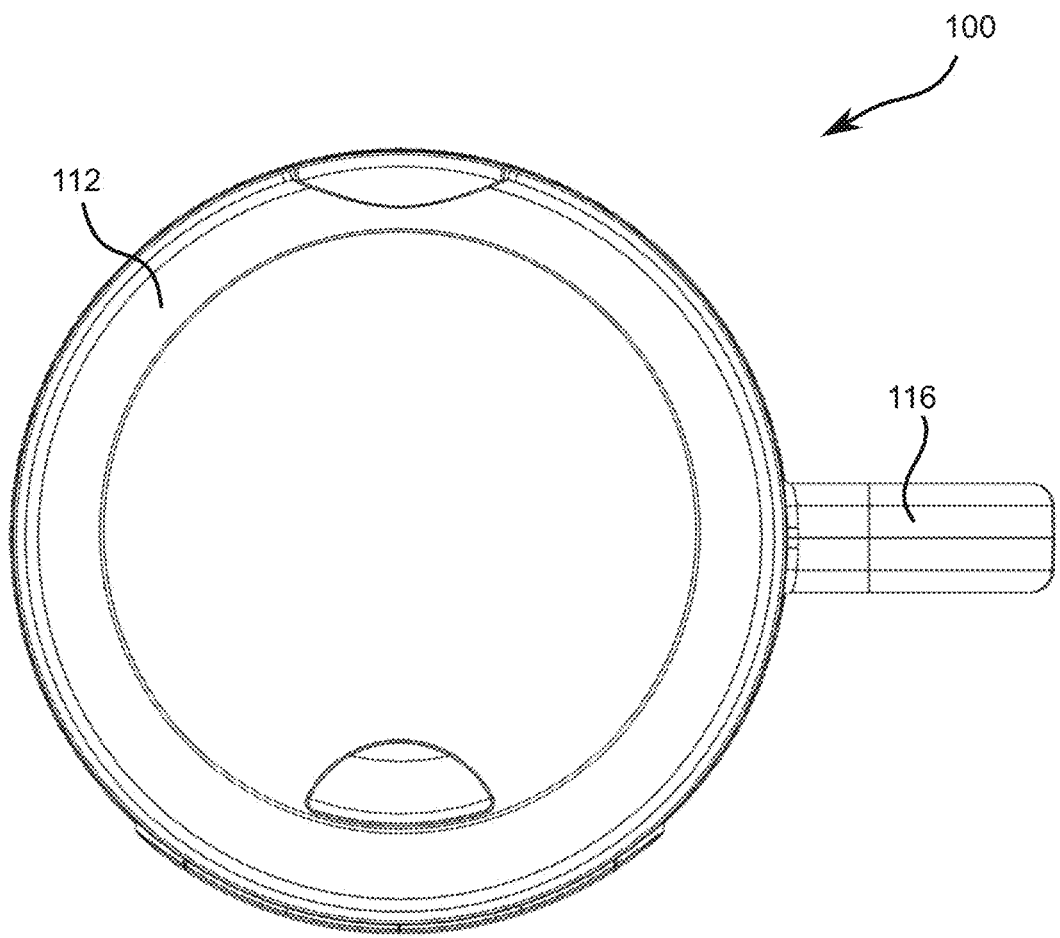
FIG. 6 is a top view of the apparatus from FIG. 1.
Figure 7:
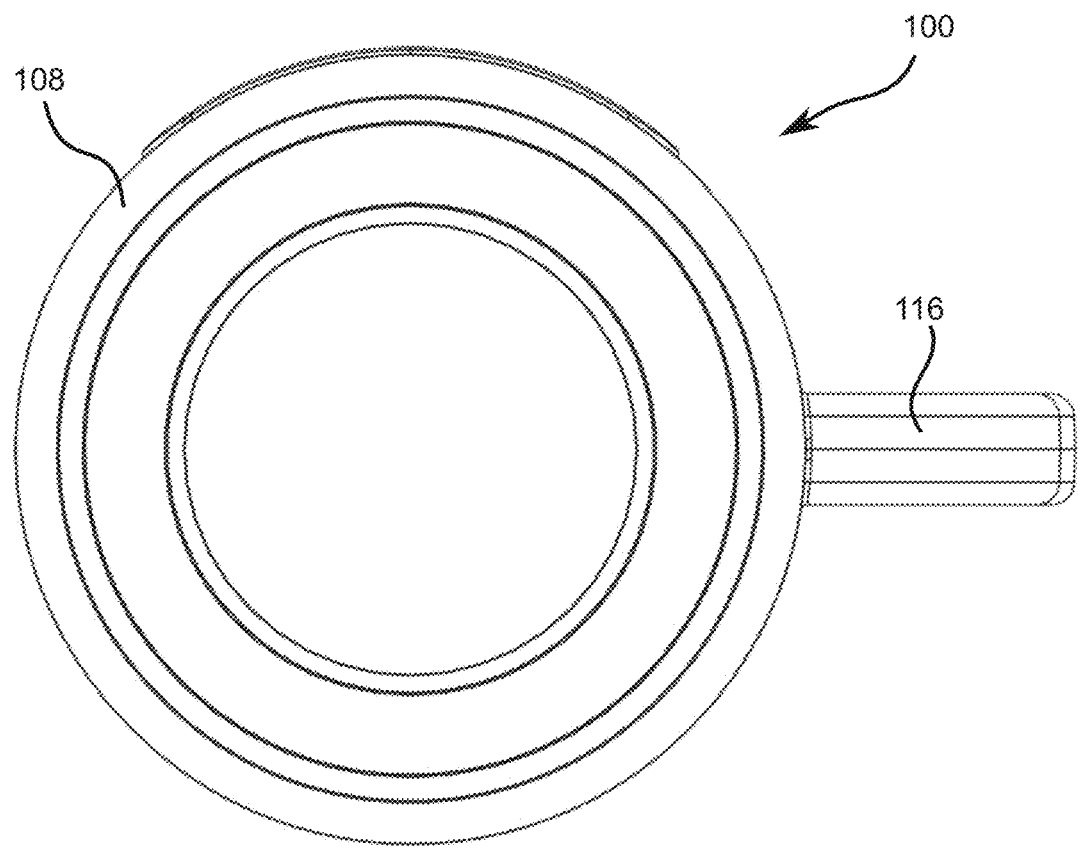
FIG. 7 is a bottom view of the apparatus from FIG. 1.
Figure 8:
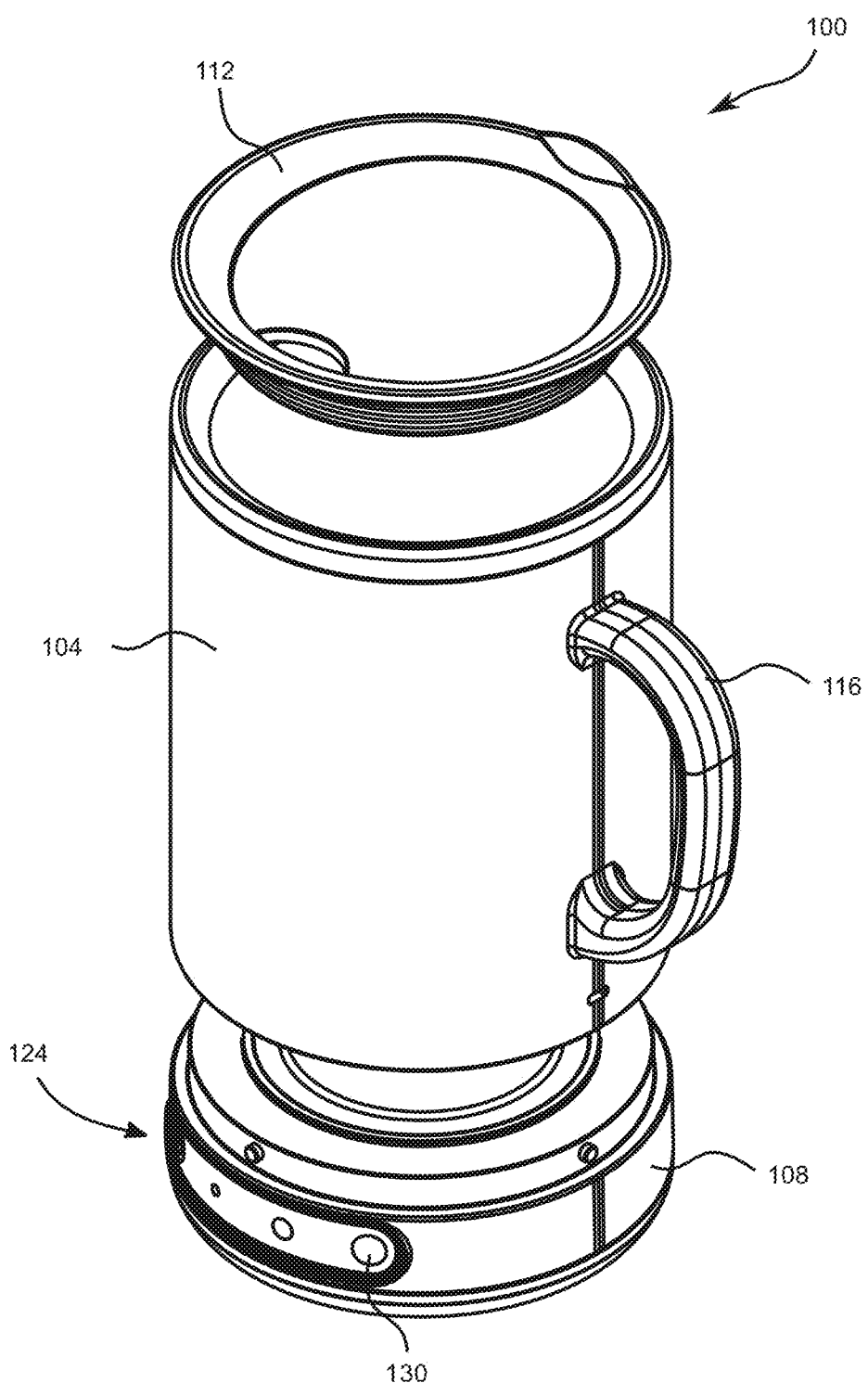
FIG. 8 is an exploded view of the apparatus from FIG. 1.

An apparatus for heating beverages is disclosed. The apparatus includes a container for holding liquids and a base for heating the container. Unlike a heated coaster, the apparatus is portable. The base includes a rechargeable power source so the apparatus does not need to be plugged in during use. Additionally, the base is attachable to the container so that the container can easily be carried around while still heated by the base. Since the container contains no electronic components and is detachable from the base, the container may be washable or even machine-washable. Unlike a washable ceramic mug, however, the container has an inner cup made of a conductive material so that heat is efficiently transferred from the base into the beverage.

To increase the lifespan of the power source and to keep the beverage warm for longer, the container is double-walled, having an inner cup nested inside a chassis. The chassis has an open bottom, leaving the bottom of the inner cup exposed. In this configuration, the base can directly contact the inner cup, which allows for efficient heat transfer between the base and the inner cup.

The features of the apparatus will now be described by way of reference to the drawings.

Referring to FIGS. 1 to 8, an apparatus for heating beverage containers is generally shown at 100. The apparatus 100 includes a container 104 for holding liquids and a base 108 for heating the liquids inside the container 104. In some embodiments, the apparatus may have a lid 112 for keeping liquids inside the container 104. The container 104 may include a handle 116 for manipulating the container.

The container 104 contains no electronic components for heating liquids. Instead, liquids are heated by the base 108, which applies heat to the container 104. A power port 120 may be included in the base 108 for receiving current from a charging cord, for example, a USB cable. The base 108 may be operated with an input device 124. The input device 124 may include, but is not limited to, a control panel, a remote control, a tablet, a smartphone, a personal computer. In the example shown in FIGS. 1-8, the input device 124 is a control panel with a plurality of buttons 130. Each of the buttons 130 may correspond to a desired temperature for the liquid, increases or decreases to the current temperature of the liquid, "on" or "off" status, or other functions known in the art. For example, the input device 124 may include a "high", "medium", and "low" button where "high" corresponds to a liquid temperature of about 70° C., "medium" corresponds to a liquid temperature of about 65° C., and "low" corresponds to a liquid temperature of about 60° C. The buttons 130 may also include a power button for turning the base 108 "ON" and "OFF". The function of the buttons 130 may be indicated by colors, sizes, shapes, textures, symbols, characters, or any combination thereof. In one example, the buttons 130 may include a power button indicated by a symbol and three buttons corresponding to low, medium, and high heat as indicated by the size of the button. The buttons 130 may include lights that are activated responsive to pressure and/or signals received by a microcontroller (described later).

Figure 9:
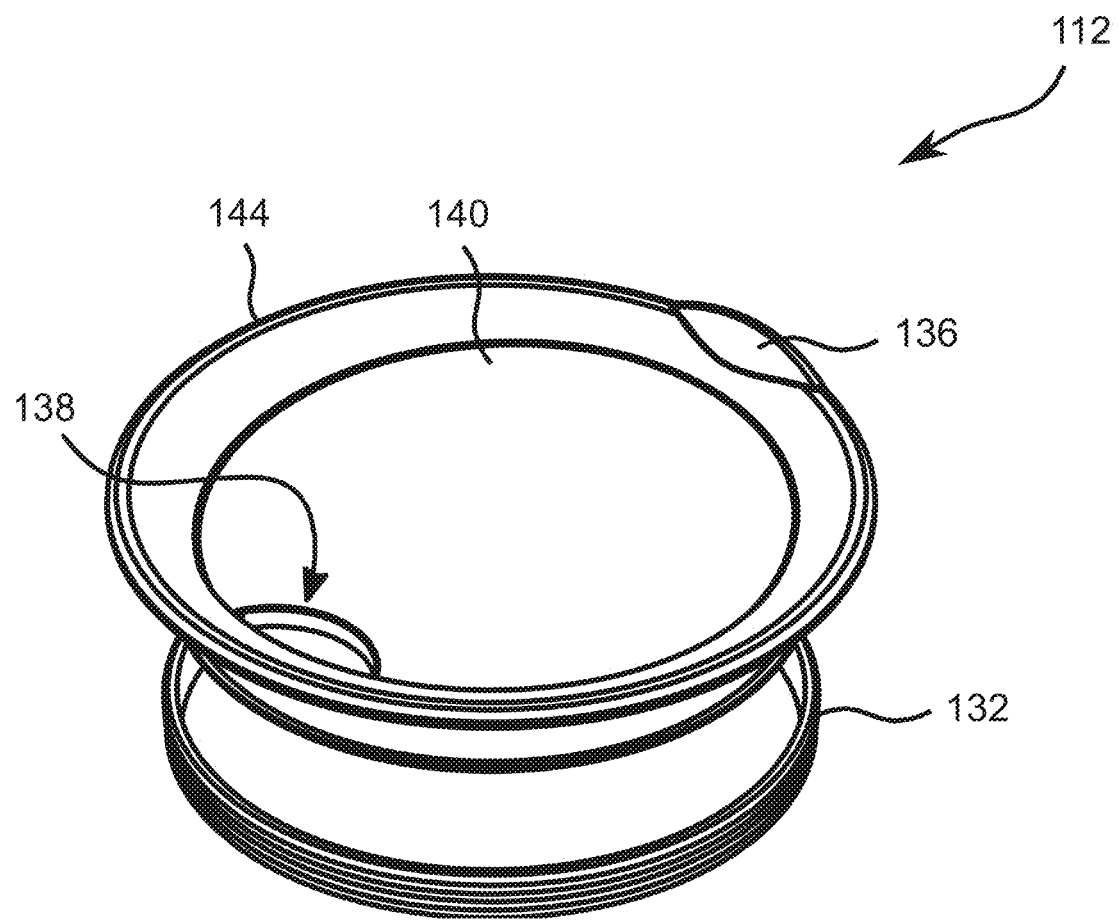
FIG. 9 is an exploded view of a lid.
Figure 10:
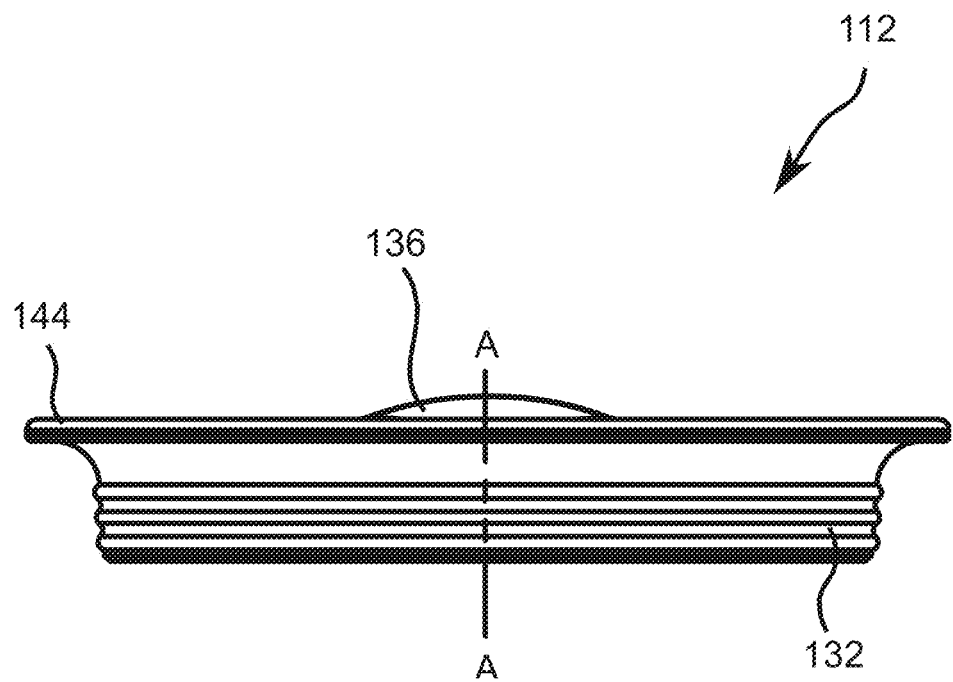
FIG. 10 is a side view of the lid of FIG. 9.
Figure 11:
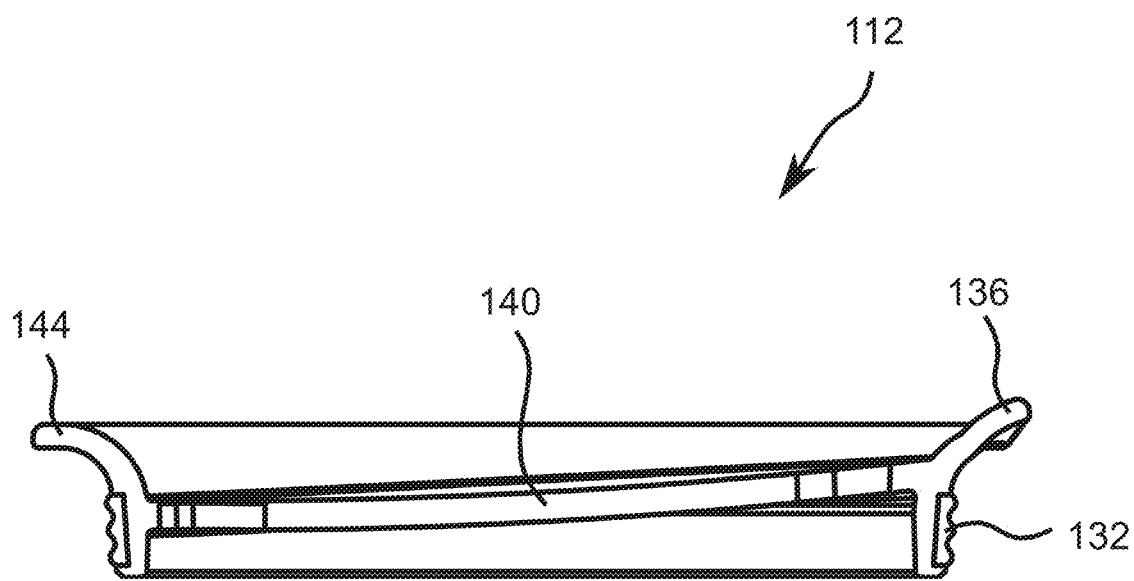
FIG. 11 is a sectional view of the lid of FIG. 9.

Turning now to FIGS. 9 to 11, a lid 112 is illustrated generally at 112. The lid 112 may be insertable into the open top of the inner cup (154 in FIG. 12). The lid 112 may be adapted to prevent liquids from spilling out of the container (104 in FIGS. 1-11). For example, the diameter of the lid 112 may be approximately the same as the inner diameter of the container 104. The lid may further include a ring 132 for sealing the lid 112 to the container 104. The ring 132 may comprise rubber or silicone or another flexible material to improve the seal between the lid 112 and the container 104. Removal of the lid 112 may be assisted by a tab 136.

The lid may further include an aperture 138 for dispensing beverages from the container 104. The aperture 138 may be disposed in a top surface of the lid 140 that covers the open top of the container (shown at 154 in FIG. 12). The top surface of the lid 140 may be inclined so that liquid dispensed from the aperture 138 onto the top surface of the lid 140 is conveyed back towards the aperture 138. A raised portion 144 may further assist in conveying liquid towards the aperture 138.

Figure 12:
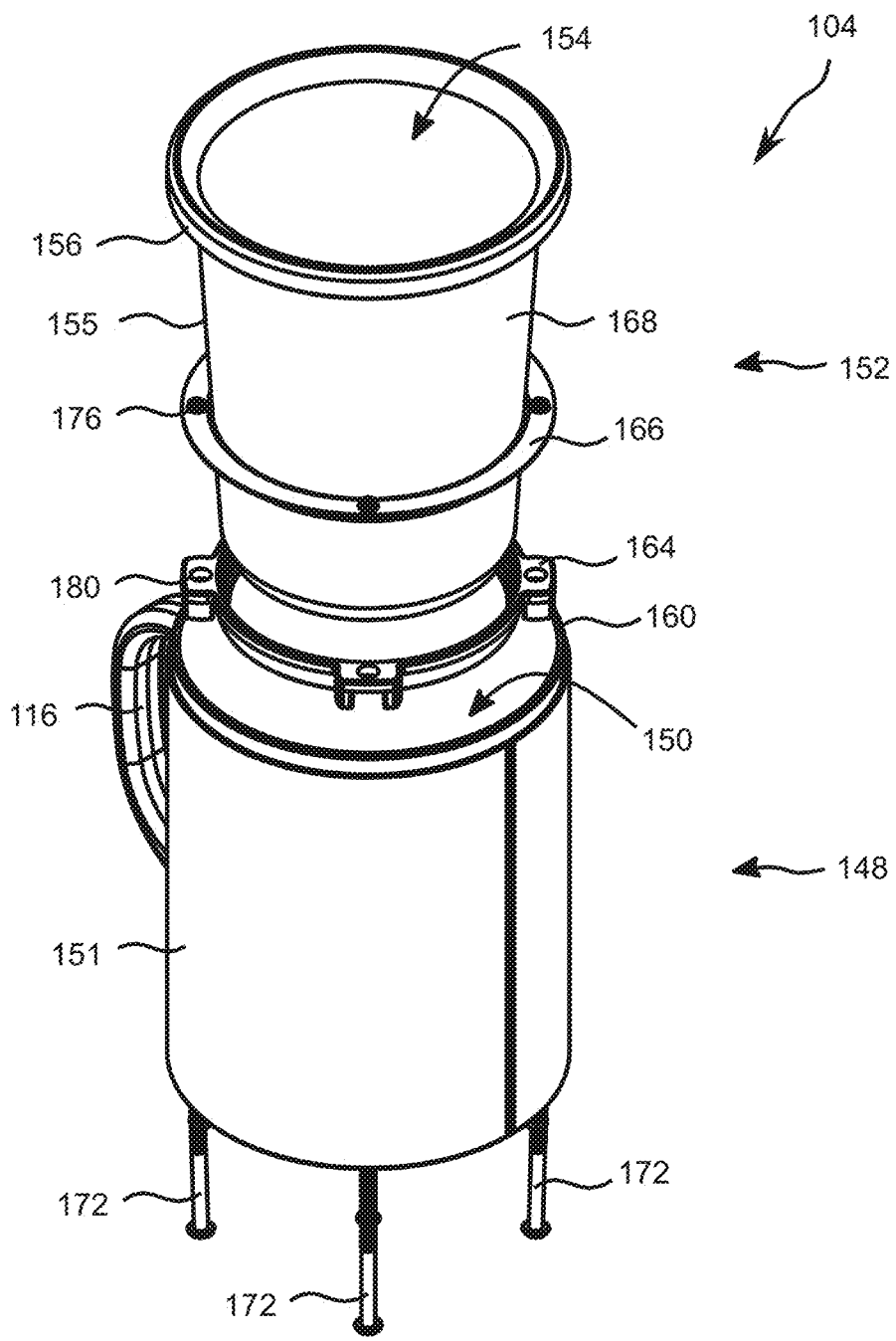
FIG. 12 is an exploded view of a container.
Figure 13:
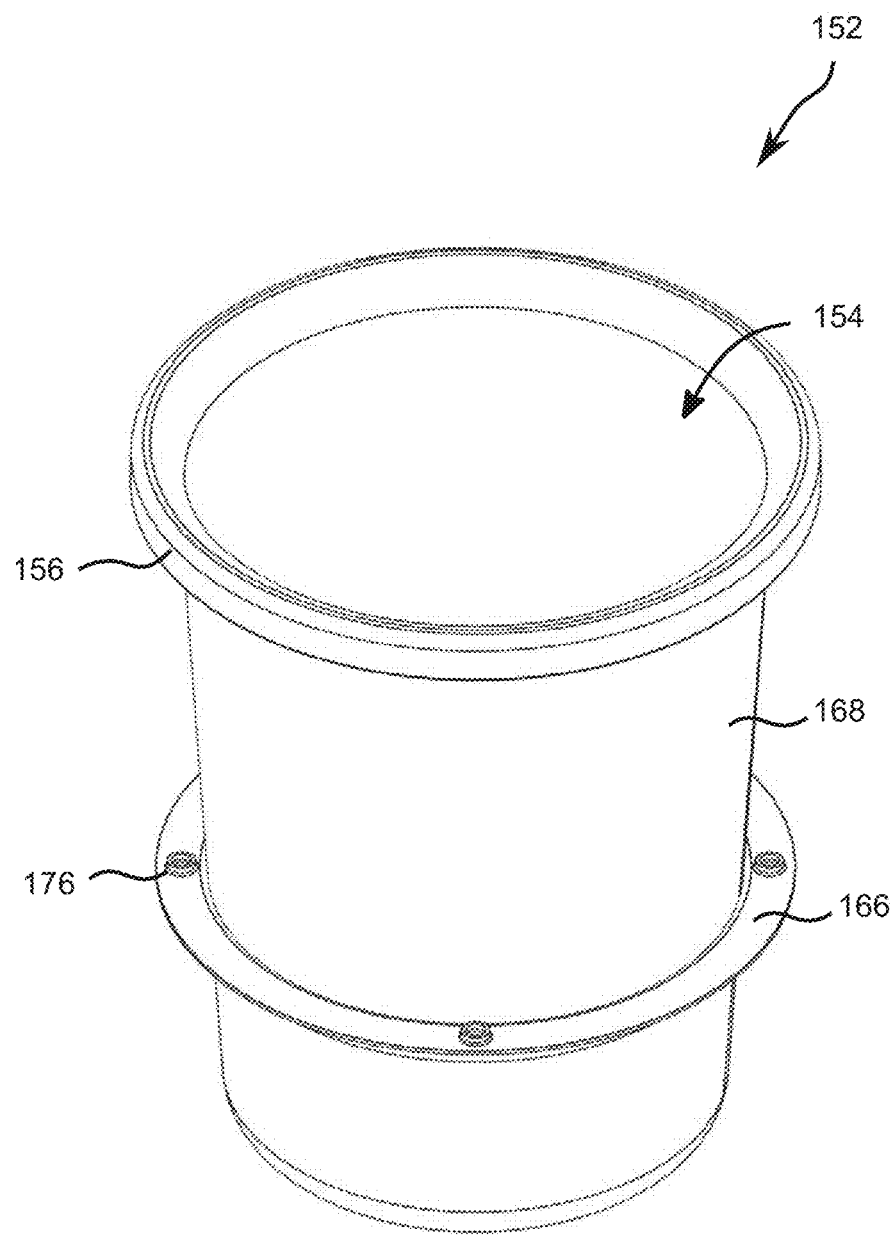
FIG. 13 is a perspective view of an inner cup.
Figure 14:
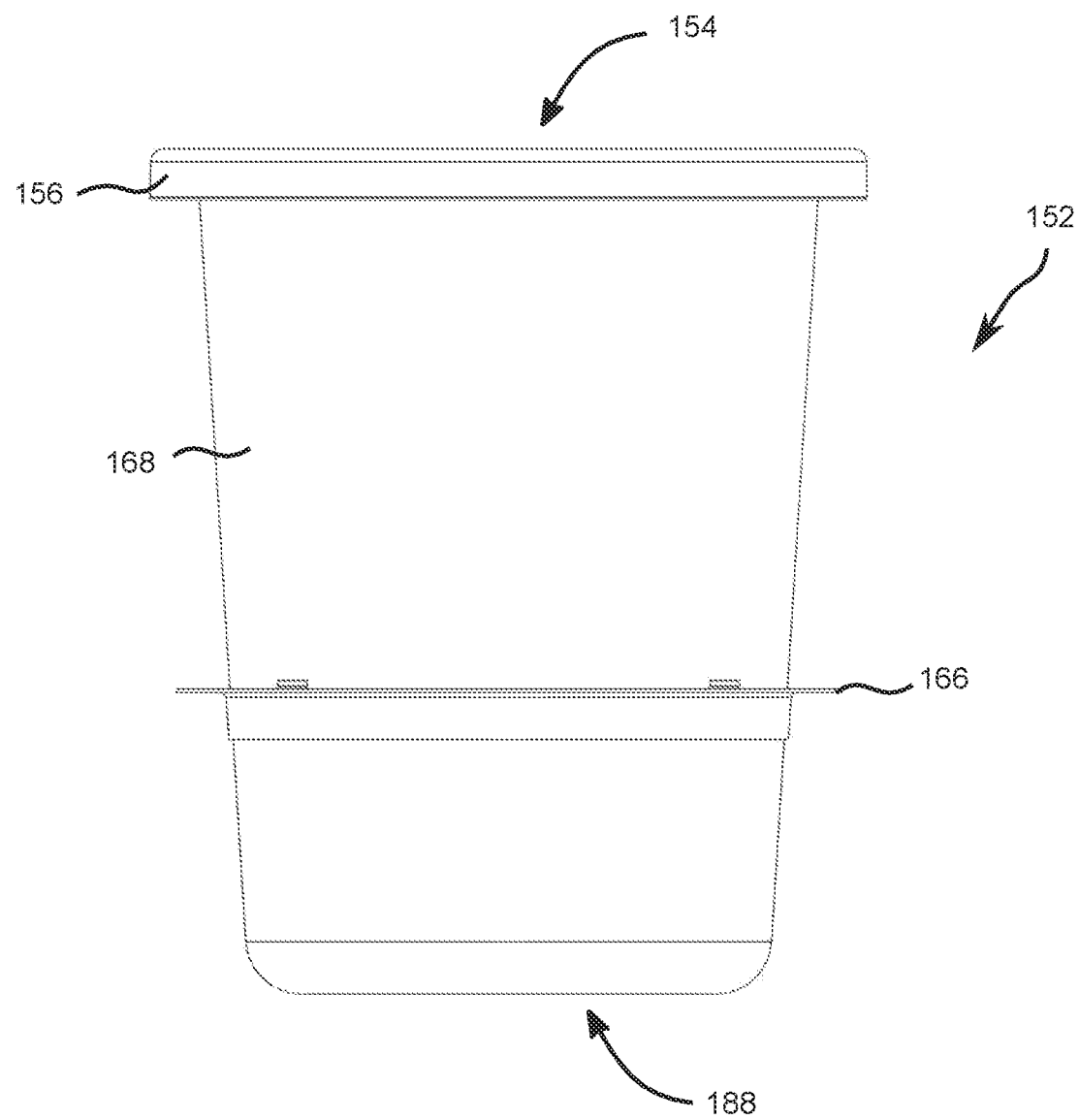
FIG. 14 is a side view of the inner cup of FIG. 13
Figure 15:
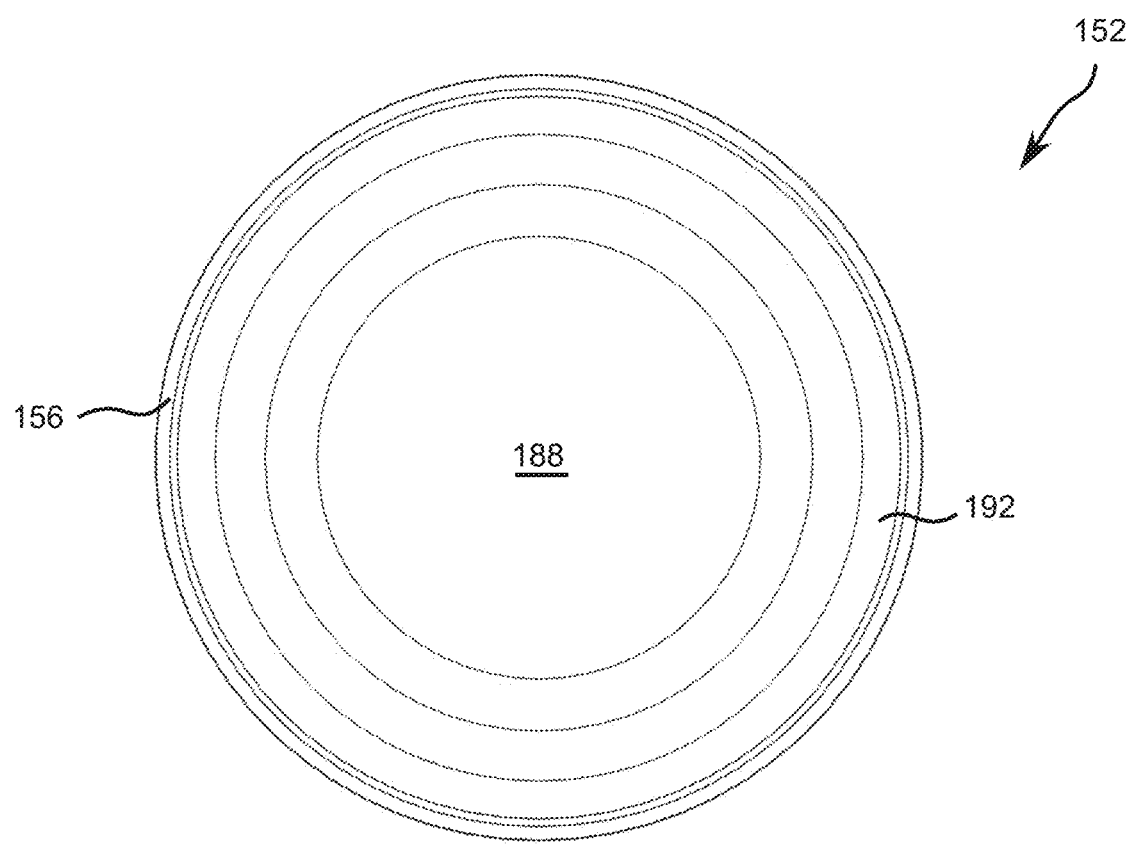
FIG. 15 is a top view of the inner cup of FIG. 13
Figure 16:
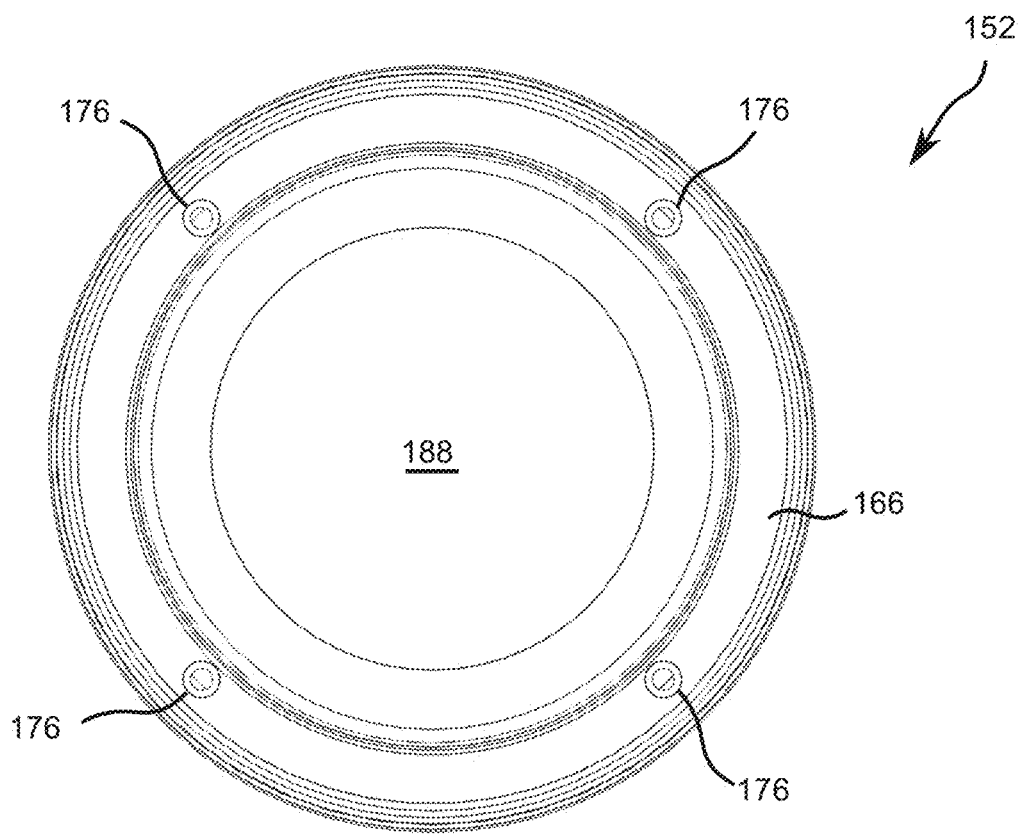
FIG. 16 is a bottom view of the inner cup of FIG. 13
Figure 17:
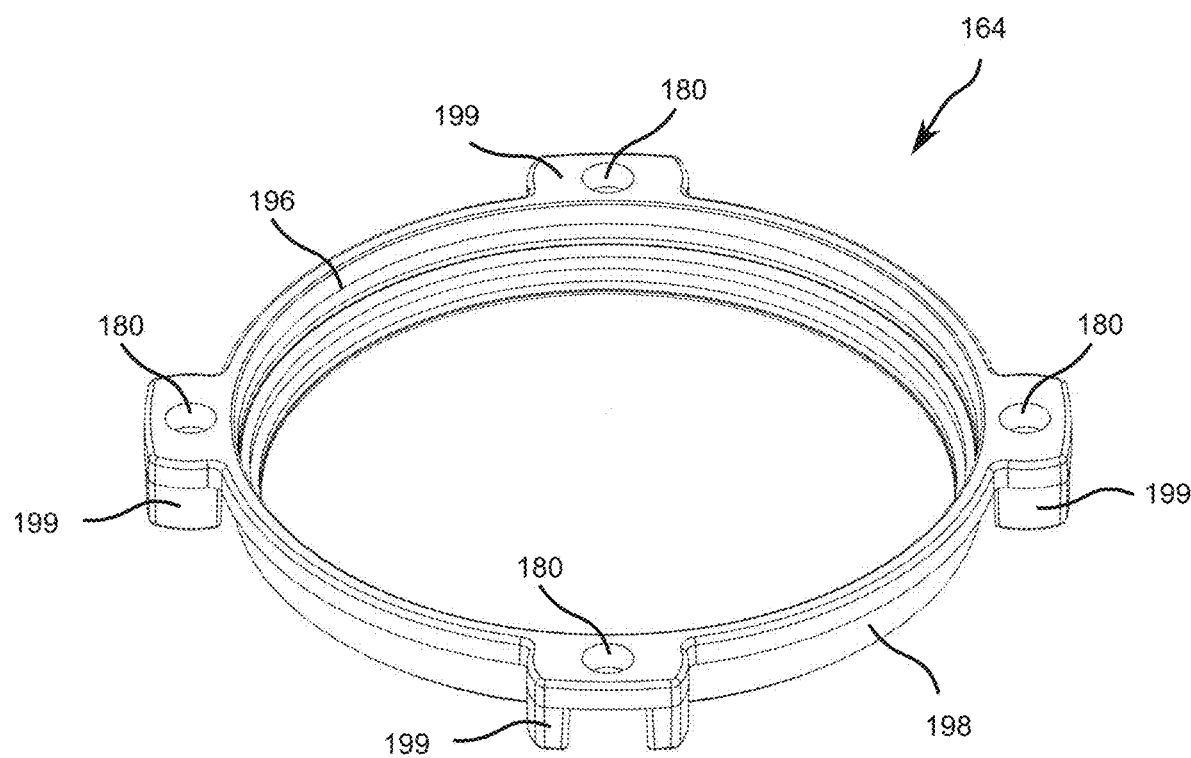
FIG. 17 is a perspective view of a gasket.
Figure 18:
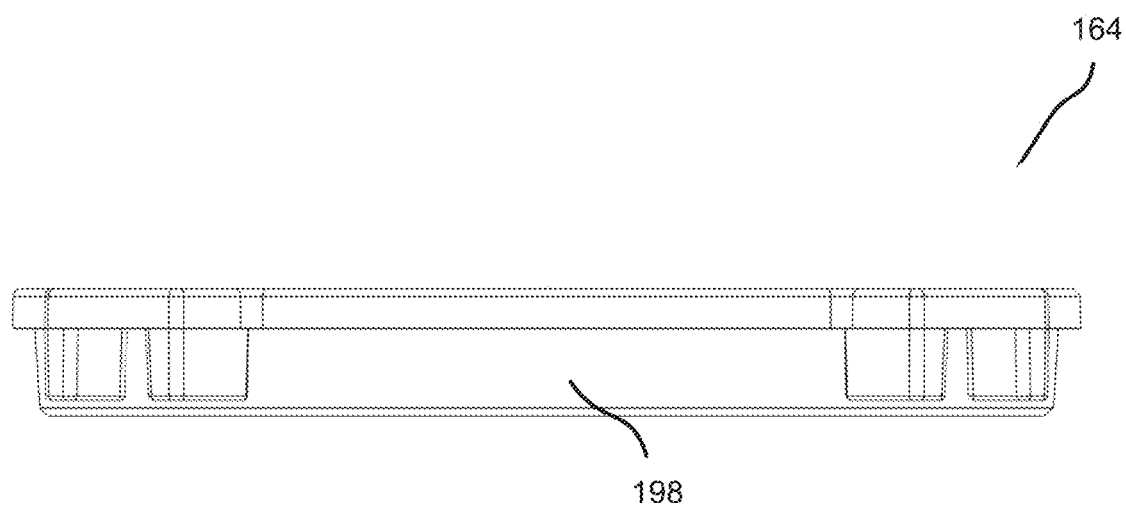
FIG. 18 is a side view of the gasket of FIG. 17.
Figure 19:
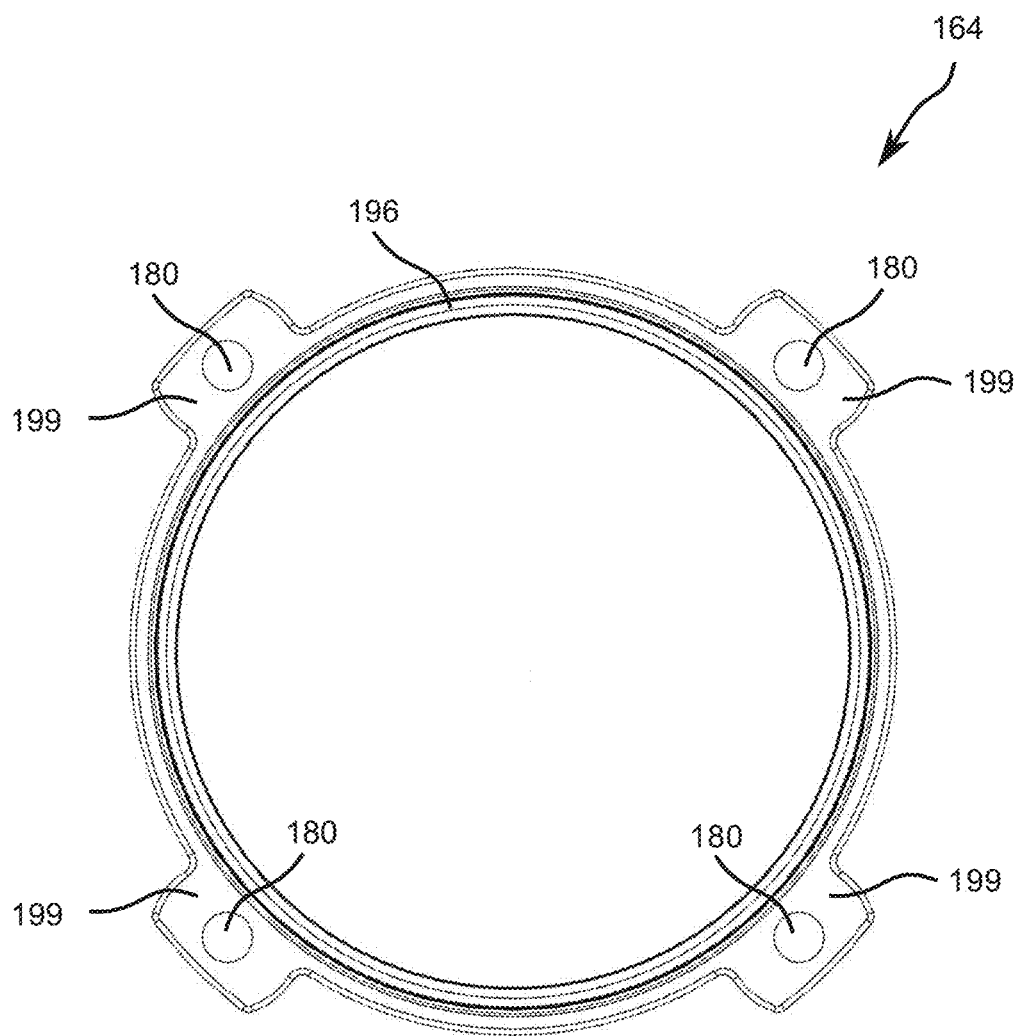
FIG. 19 is a top view of the gasket of FIG. 17.
Figure 20:
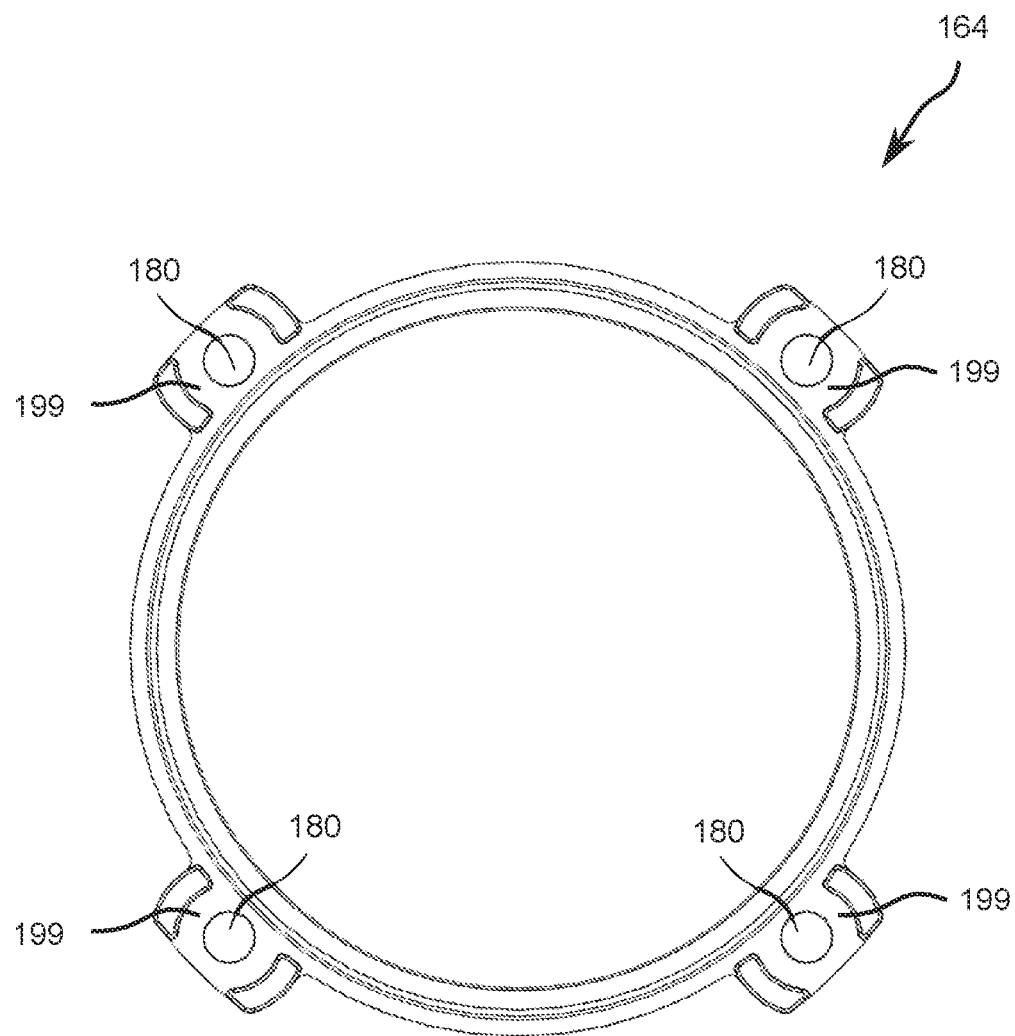
FIG. 20 is a bottom view of the gasket of FIG. 17.

An exploded view of the container 104 is illustrated in greater detail in FIG. 12. The container has a chassis 148 and an inner cup 152 nested inside the chassis 148. The inner cup 152 is configured to hold liquid and the chassis 148 is configured to insulate the inner cup 152.

The chassis 148 has an open bottom (shown later), an open top 150 for receiving liquid, and a circumferential wall 151. The inner cup 152 is nested inside the chassis. The inner cup 152 has an open top 154 for receiving liquid, a closed bottom (shown later) for retaining liquid, and a circumferential wall 155 that is spaced from the circumferential wall 151 of the chassis to define an annular gap (shown later in FIG. 25). When the inner cup 152 is nested inside the chassis 148, a lip 156 of the inner cup 152 may overlap with a top edge 160 of the chassis 148.

The container 104 may further comprise a sealing mechanism for sealing the annular gap. The sealing mechanism may prevent water and other liquids from becoming trapped between the chassis 148 and the inner cup 152. The sealing mechanism may be adapted to maintain a seal between the chassis 148 and the inner cup 152 as the inner cup 152 heats up and cools down. Since the inner cup 152 receives heat from the base 108, the inner cup 152 may expand during use of the apparatus. When the base 108 is not in use, the inner cup 152 may shrink in size. This thermal expansion and contraction may cause the lip 156 to pull away from the top edge 160 of the chassis 148. The sealing mechanism may assist in maintaining the seal during thermal expansion and contraction.

The sealing mechanism may include a gasket 164 and a metal ring 166. A metal ring 166 may be attached to an outer surface 168 of the circumferential wall 155. A bottom portion of the chassis (shown later) may then attached to the metal ring 166 with the at least two fasteners 172, which are accommodated by apertures 176 in the metal ring 166 and apertures (shown later) in the chassis 148. As the fasteners 172 are tightened, the inner cup 152 is biased towards the bottom portion of the chassis (shown later). The gasket 164 is fitted between the chassis and the inner cup 152 such that, when the fasteners 172 are tightened, the gasket 164 is squeezed between the chassis 148 and the inner cup 152. The gasket 164 may comprise rubber, silicone, or another flexible material, to improve the seal between the chassis 148 and the inner cup 152. The gasket 164 may further include apertures 180 for accommodating the fasteners 172.

The sealing mechanism may further include a sealant between the lip 156 and the top edge 160.

The sealing mechanism may further include a sealant between the chassis 148 and the metal ring 166 to assist in sealing the chassis 148 to the metal ring 166. In some embodiments, a sealant may be applied to the gasket 164 to assist in sealing the gasket 164 to the chassis 148 and/or the inner cup 152. The sealant may prevent water from entering the annular gap (shown later).

The inner cup 152 may be adapted to receive heat from the base 108 and transfer the heat to a liquid contained in the inner cup 152. The inner cup 152 may comprise a conductive material, such as metal, to quickly and efficiently absorb heat from the base 108 and release heat into the liquid. The chassis 148 on the other hand, may comprise metal, ceramic, polymer, carbon composite, wood, or another suitable material. The material for the chassis 148 may be selected for aesthetic reasons, to minimize cost, or to inhibit heat conduction from the inner cup 152. The chassis 148 may include a handle 116 for manipulating the container 104.

The inner cup 152 is illustrated in FIGS. 13-16. The inner cup 152 has an open top 154 for receiving liquids and a closed bottom 188 for retaining liquids. The inner cup 152 may be substantially frustoconical in shape, with the closed bottom 188 having a diameter that is smaller than the diameter of the open top 154. The metal ring 166 may be disposed on the outer surface 168 proximal to the closed bottom 188. The metal ring 166 may include at least one aperture for accommodating at least one fastener 172. In the example shown in FIG. 16, the metal ring 166 includes four apertures 176. The inner cup 152 may comprise a material that is food-safe and conducts heat well.

Turning now to FIGS. 17-20, the gasket 164 is illustrated in greater detail.

The gasket 164 is sized and shaped to fit between the inner cup 152 and the chassis 148, so as to seal the inner cup 152 to the chassis 148. The gasket 164 is configured to accommodate the inner cup 152, with the inner surface of the gasket 196 in contact with the outer surface of the inner cup 168. The inner surface of the gasket 196 may comprise a series of radial ridges for improving the seal between the gasket 164 and the inner cup. The outer surface of the gasket 198 may be adapted to seal the gasket 164 to the chassis 148, with the outer surface of the gasket 198 in contact with a bottom portion of the chassis (described below with respect to FIGS. 21 to 23). The outer surface of the gasket 198 may comprise a series of radial ridges for improving the seal between the gasket 164 and the chassis 148.

The gasket 164 may further comprise at least two protrusions 199 for the at least two apertures 180. In the embodiment shown in FIGS. 17-20, the gasket has four apertures 180, corresponding to the four apertures on the metal ring 166. The at least two protrusions 199 may be positioned between the bottom portion of the chassis (described later) and the metal ring 166.

Figure 21:
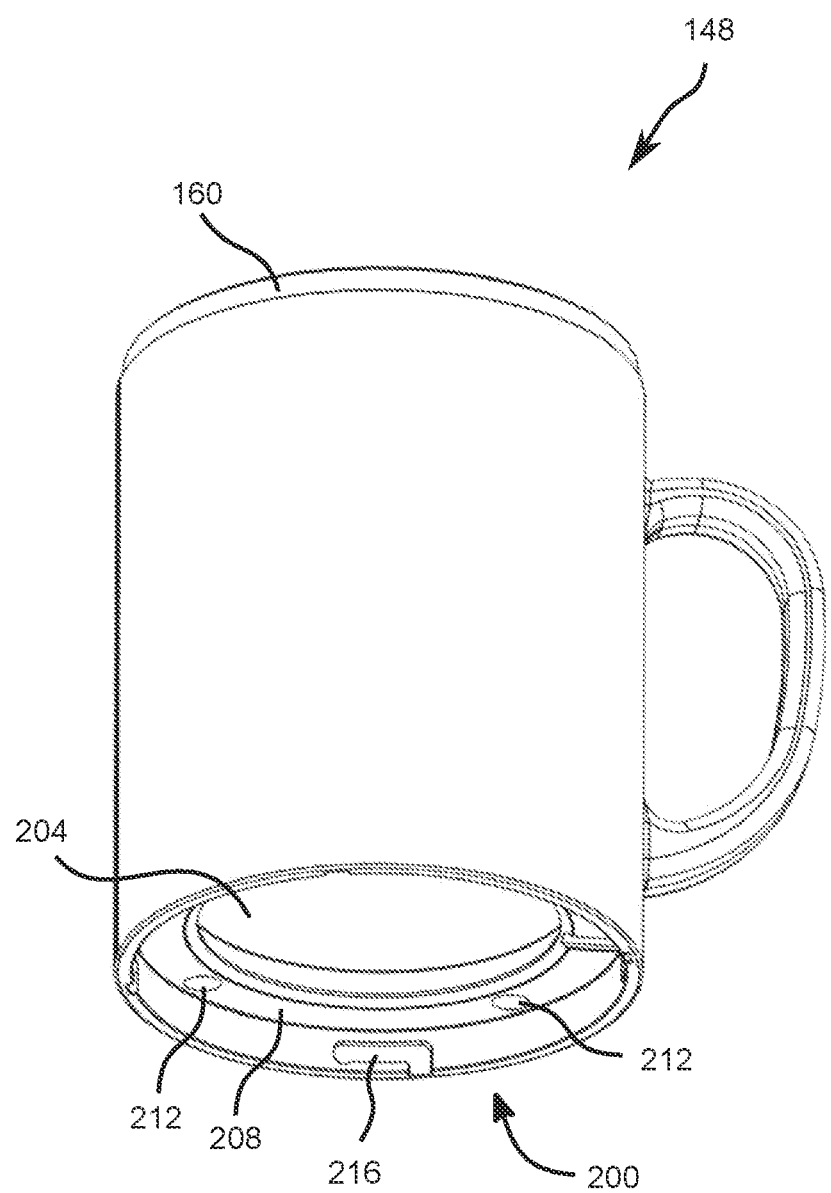
FIG. 21 is a perspective view of a chassis.
Figure 22:
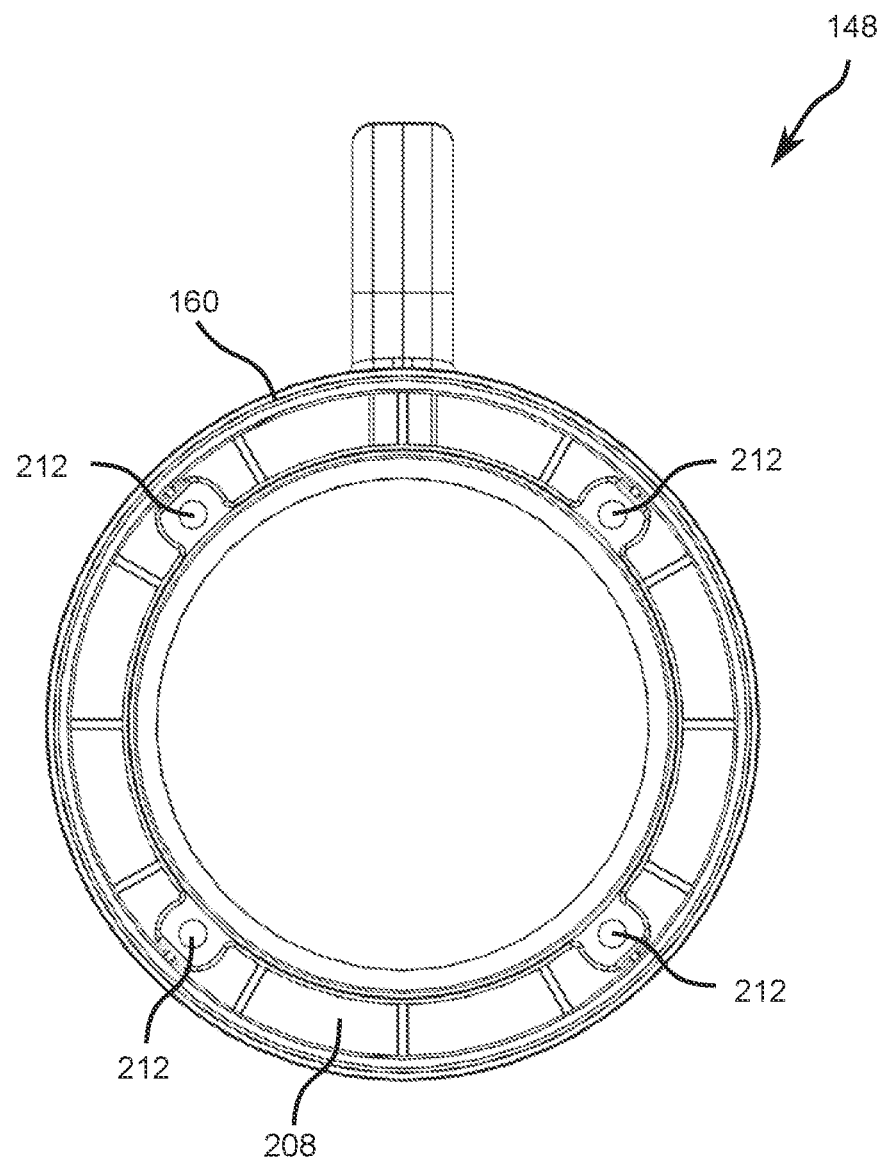
FIG. 22 is a top view of the chassis of FIG. 21.
Figure 23:
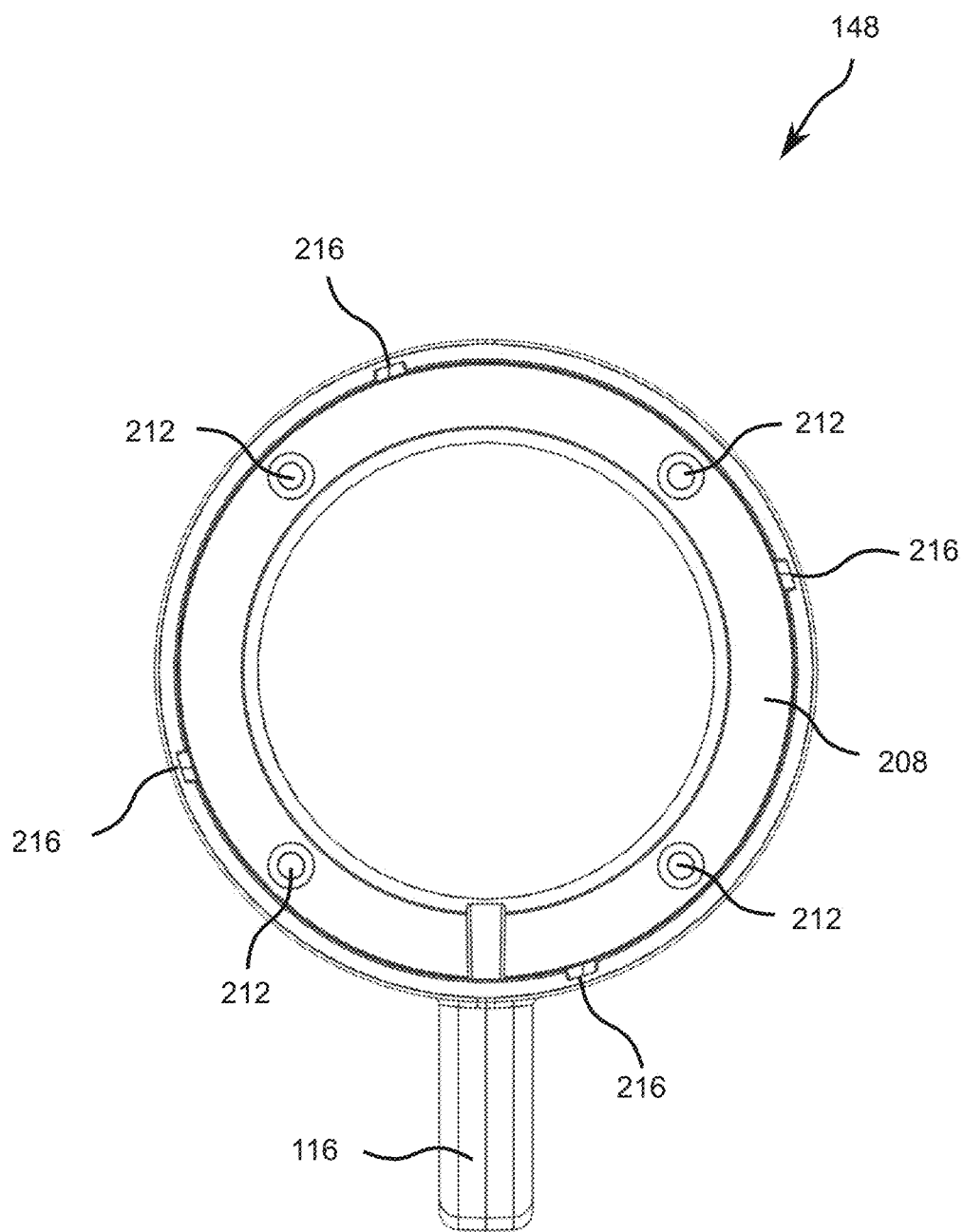
FIG. 23 is a bottom view of the chassis of FIG. 21.
Figure 24:
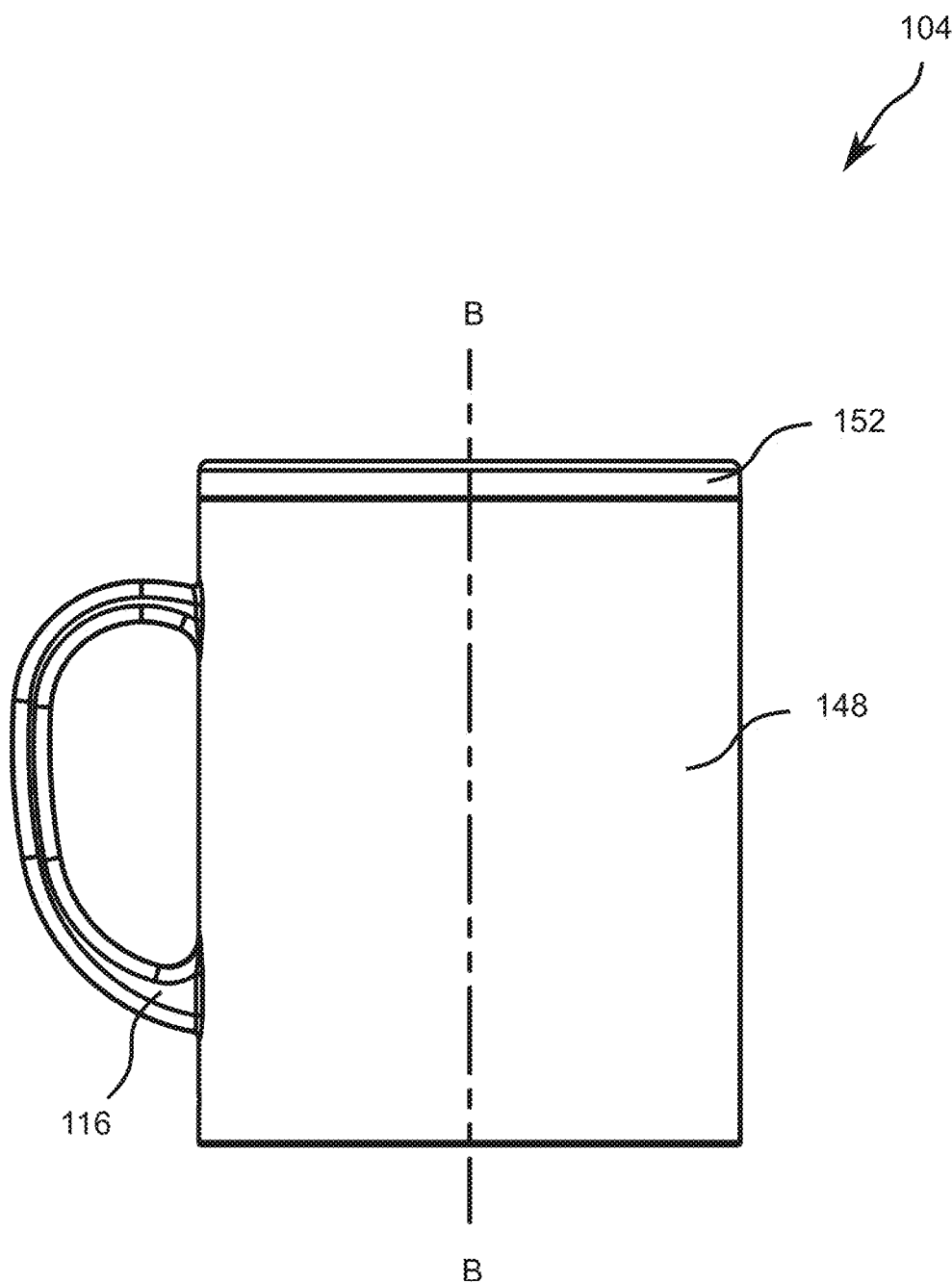
FIG. 24 is a rear view of the chassis of FIG. 21.

The chassis 148 is illustrated at FIGS. 21 to 23. FIG. 21 is a bottom perspective of the chassis 148, FIG. 22 is a top view, and FIG. 23 is a bottom view. The chassis 148 has an open bottom 200 for accessing the closed bottom of the inner cup 188 and the fasteners 172. When the inner cup 152 is inserted into the chassis 148, an inner surface of the chassis 204 faces the outer surface of the inner cup (shown later). A bottom portion of the chassis 208 is configured to seal the chassis 148 to the inner cup 152. The bottom portion of the chassis 208 includes at least two apertures 212 for accommodating fasteners. The chassis 148 may further include an attachment mechanism 216 for removably attaching the chassis 146 to the base 108. The attachment mechanism 216 may include a bayonetting system, magnets, threading, clips, lap joints, or another suitable mechanism.

Turning to FIGS. 24 to 27, the container is illustrated at 104, showing the inner cup 152 seated in the chassis 138.

Figure 25:
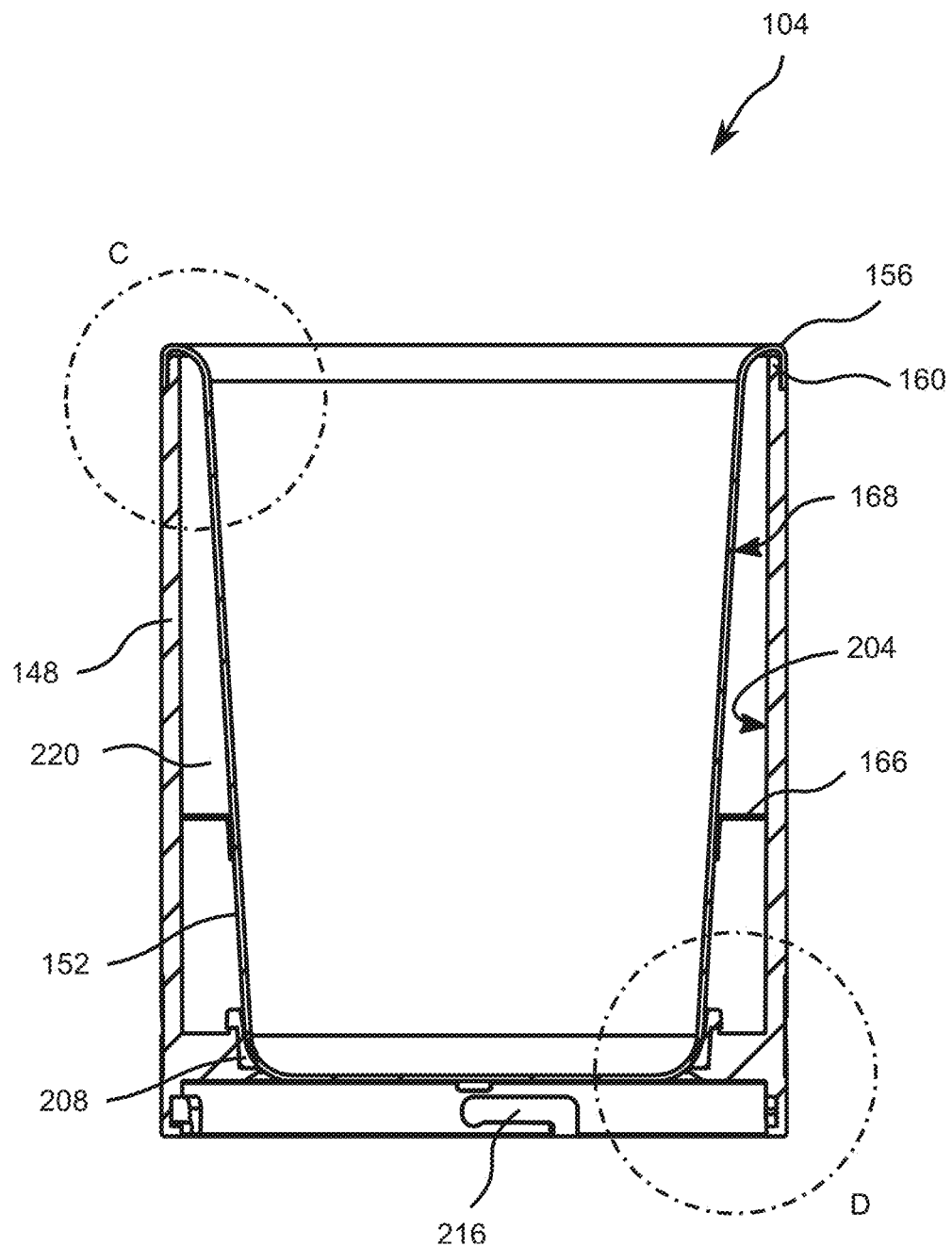
FIG. 25 is a sectional view of the chassis of FIG. 21.

FIG. 25 shows a cross-section of the container 104 at plane B-B. Because the inner cup has a roughly frustoconical shape and the chassis 148 is roughly cylindrical, there is an annular gap 220 between the inner surface of the chassis 204 and the outer surface of the inner cup 168. The annular gap 220 may inhibit the dissipation of heat from the inner cup 152. When the container 104 is assembled, the chassis 148 may be sealed to the inner cup 152 to prevent liquids from entering the annular gap 220. To further inhibit the dissipation of heat from the inner cup 152, the annular gap 220 may contain a gas or it may be vacuum-sealed.

Because the inner cup 152 comprises a conductive material and the chassis 148 may comprise a material that is a poor heat conductor, the inner cup 152 and the chassis 148 may expand and contract at different rates when exposed to heat. For example, a user may wish to clean the container 104 in a dishwasher, exposing the container 104 to high temperatures. The difference between the two rates of expansion may be greater or less, depending on the materials selected for the chassis 148 and the inner cup 152. Additionally, the inner cup 152 will be exposed to heat sources that the chassis 148 is not exposed to, such as the heat applied by the base 108 and heat from a hot liquid received by the inner cup 152. Because of the annular gap 220, heat does not transfer quickly between the inner cup 152 and the chassis 148. Accordingly, the sealing mechanism is configured to seal the annular gap 220 as the inner cup 152 expands and contracts.

As the inner cup 152 expands, the lip 156 may pull away or lose contact with the top edge of the chassis 160. To counteract the tendency of the inner cup 152 to become unsealed from the chassis 148, at least two fasteners 172 may tighten the sealing mechanism. Although not shown in this view, the fasteners 172 may pass through the bottom portion of the chassis 208, and the metal ring 166. Tightening the fasteners will bias the metal ring 106 towards the bottom portion of the chassis 208. This may enhance the seal between the chassis 148 and the inner cup 152 at both the top edge of the chassis 160 and the bottom portion of the chassis 208.

Figure 26:
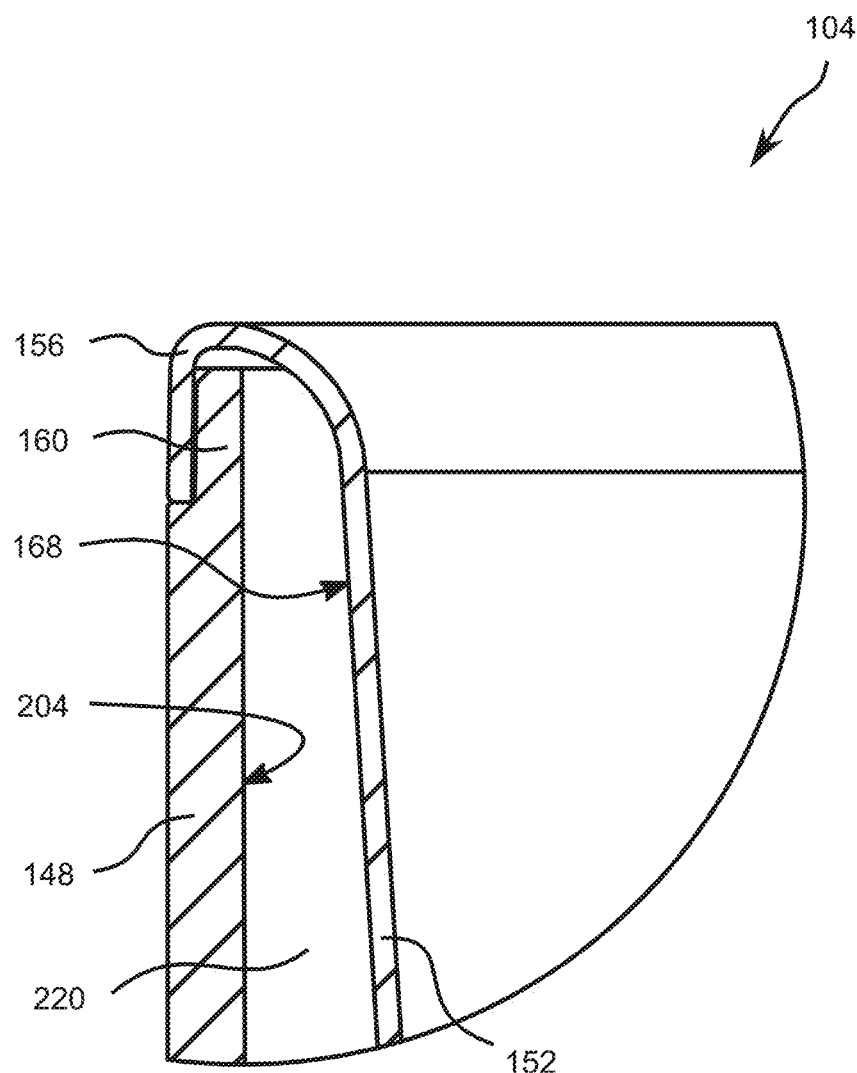
FIG. 26 is a partial sectional view of the chassis of FIG. 21.

FIG. 26 is an enlarged view of C, showing the seal between the lip 156 and the top edge of the chassis 160. When the fasteners 172 are tightened, the lip 156 may be biased towards the top edge 160 of the chassis. This may enhance contact between the lip 156 and the top edge 160.

Figure 27:
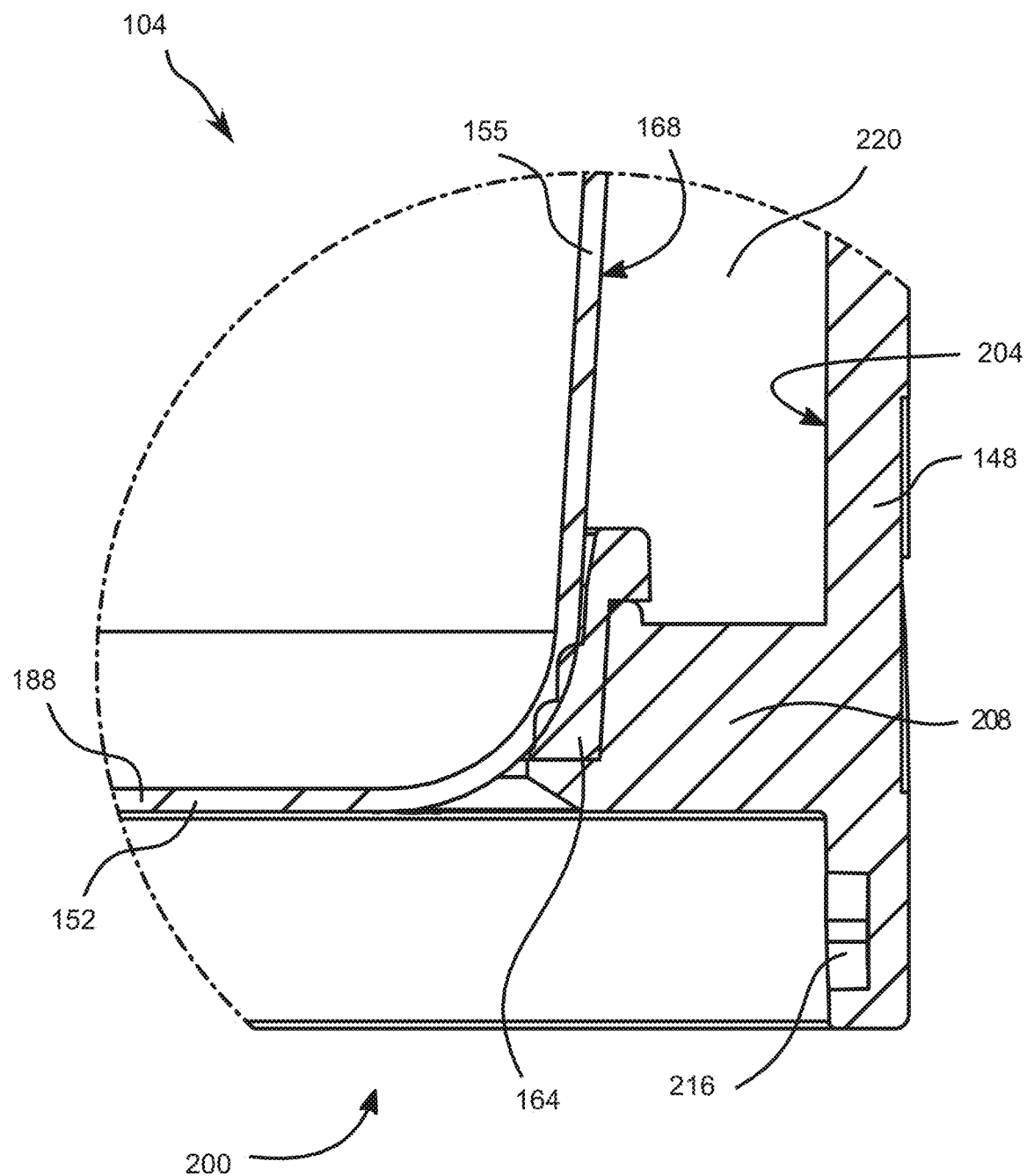
FIG. 27 is a partial sectional view of the chassis of FIG. 21.
Figure 28:
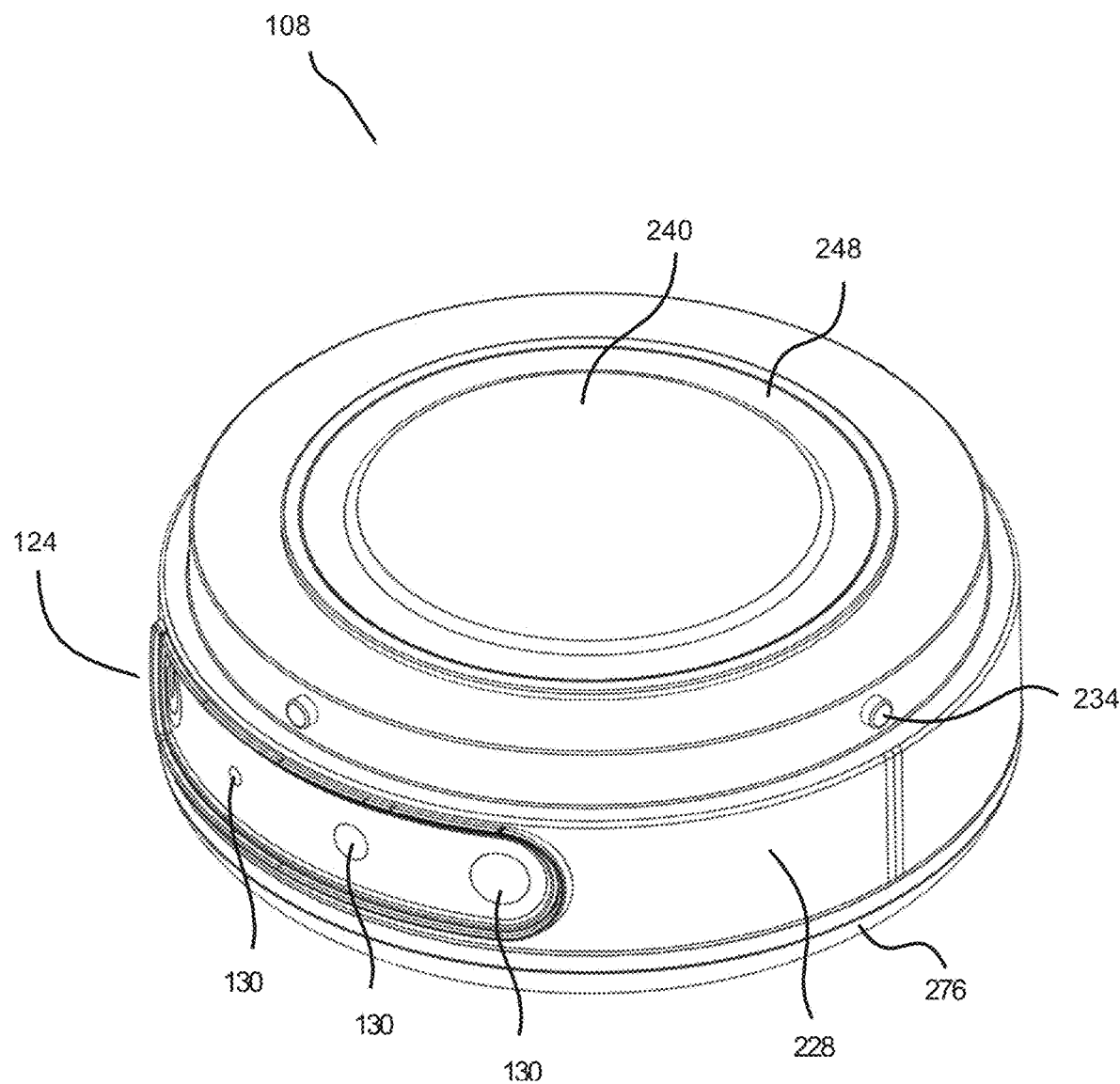
FIG. 28 is a perspective view of a base.
Figure 29:
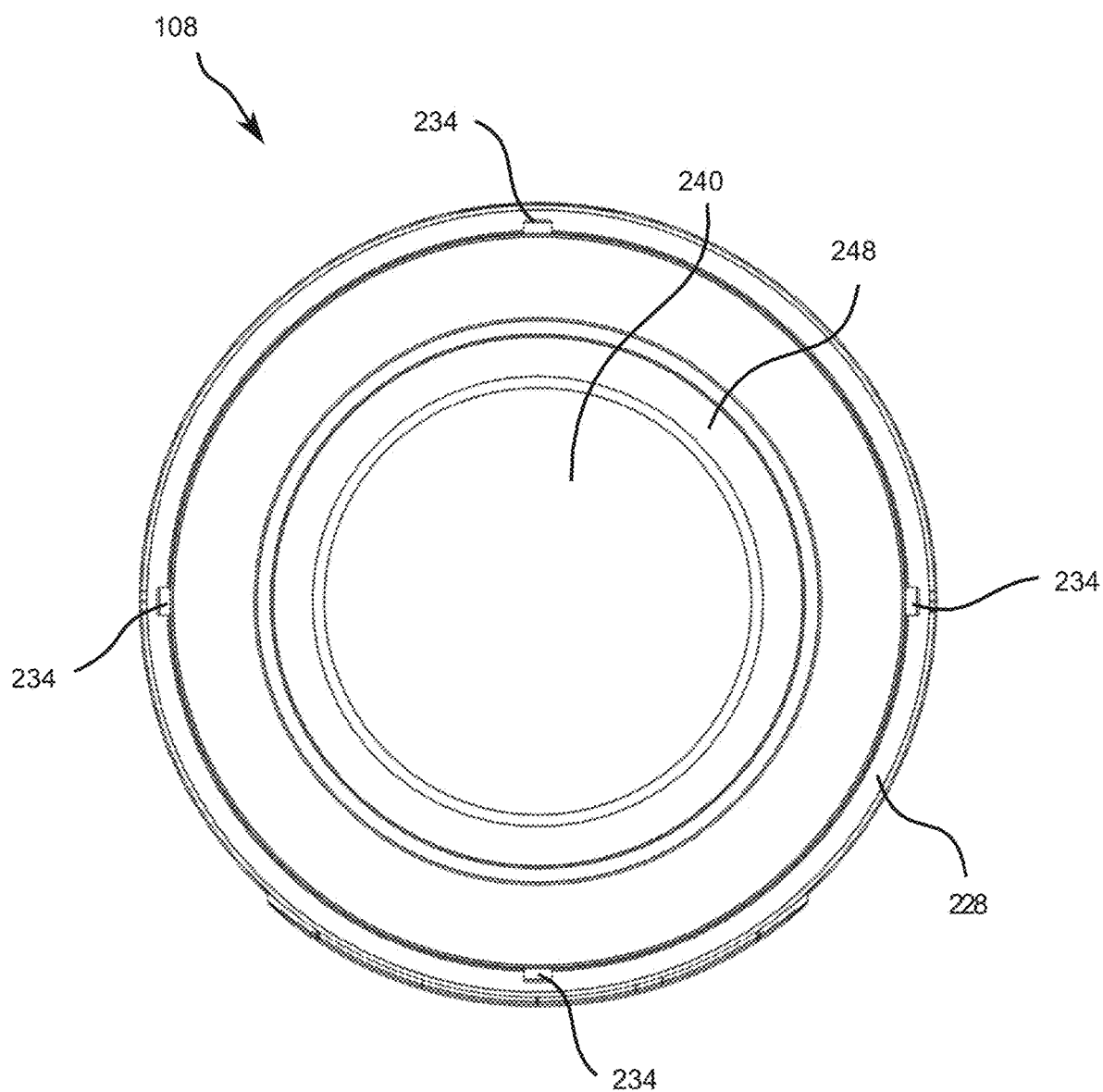
FIG. 29 is a top view of the base of FIG. 28.
Figure 30:
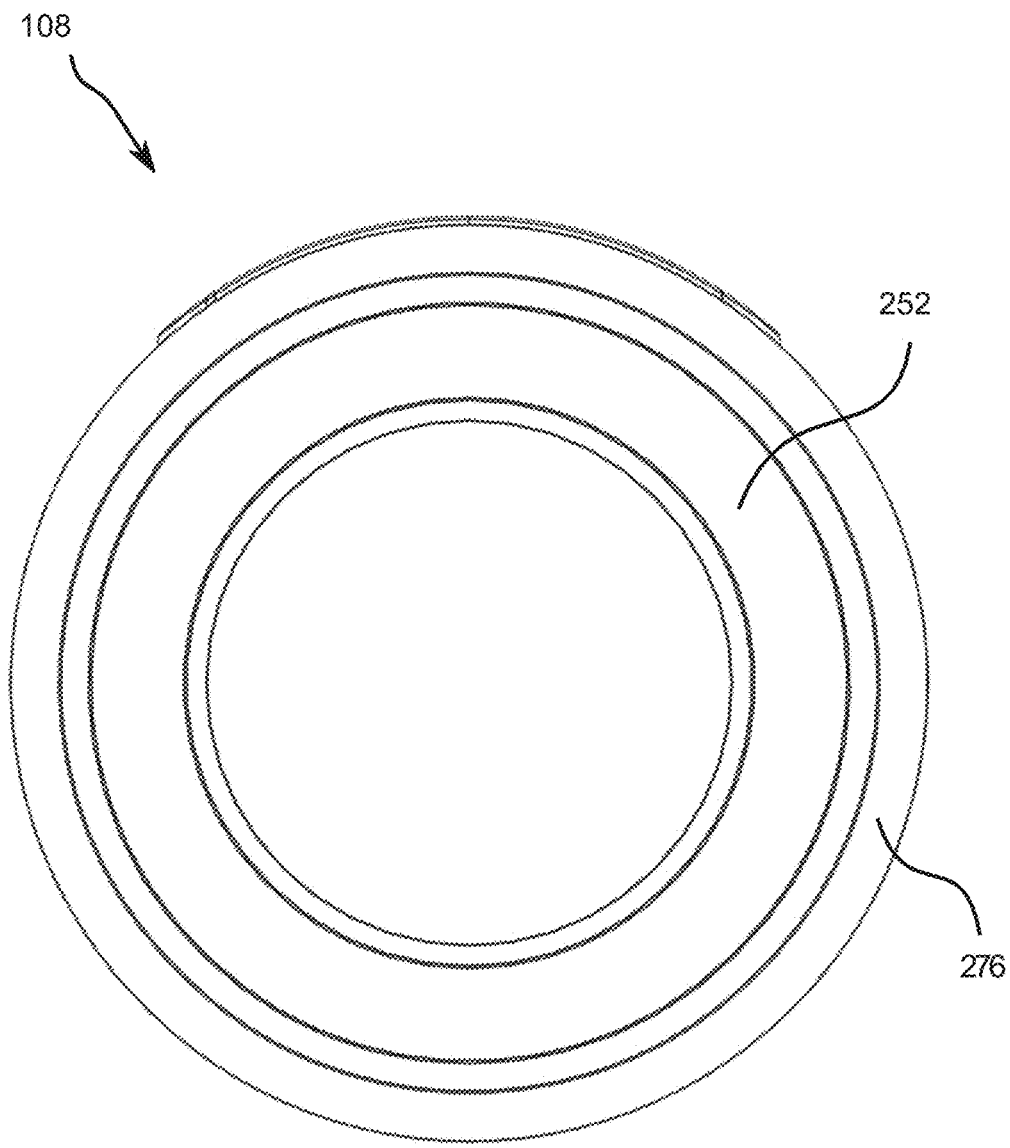
FIG. 30 is a bottom view of the base of FIG. 28.

FIG. 27 is an enlarged view of D, showing the seal between the inner cup 152, the gasket 164, and the bottom portion of the chassis 208. When the fasteners 172 are tightened, the inner cup 152 is biased toward the bottom portion of the chassis 208. This may enhance contact between the outer surface of the inner cup 168 and the gasket 164. This may also improve contact between the gasket 164 and the bottom portion of the chassis 208. The gasket 164 may comprise a flexible or compressible material such as rubber, silicone, or another suitable material.

As shown in FIG. 27, the closed bottom 188 of the inner cup 152 is exposed by the open bottom 200 of the chassis. Consequently, the inner cup 152 may directly contact the base 108. The closed bottom 188 may be thin, to quickly conduct heat from the base 108 to the liquid contained in the inner cup 152. The circumferential wall 155 may also be thin, to quickly conduct heat from the closed bottom 188. In some embodiments, the closed bottom 188 and the circumferential wall 155 may have a thickness of about 0.3 to about 0.9 millimeters, and more preferably about 0.5 to about 0.6 millimeters.

When the container 104 is attached to the base 108, the closed bottom 188 is pressed into the base 108, causing the heater plate 240 to substantially contact the base 108. To improve contact and therefore heat transfer from the base, the closed bottom 188 may be sized and shaped accordingly. The materials and thickness of the closed bottom 188 may be chosen such that the closed bottom 188 is semi-flexible. In embodiments with a semi-flexible closed bottom 188, the closed bottom will be pressed into the base 108 when the container 104 is attached to the base, causing the closed bottom 188 to flex and improving contact between the inner cup 152 and the heater plate (shown later). In some embodiments with a semi-flexible closed bottom 188, the closed bottom 188 is slightly convex. For example, the closed bottom 188 may be substantially flat with a tolerance of approximately 0.2 to 0.3 millimeters, and more preferably about 0.25 millimeters. In these embodiments, when the container 104 is attached to the base 108, the heater plate (shown later) exerts pressure on the closed bottom, reducing the convexity of the closed bottom 188. Thus, when the container 104 is attached to the base 108, the closed bottom 188 is pressed substantially flat.

FIGS. 28 to 34 show the base at 108. The base may have an outer shell 228, 276 for enclosing a number of electronic components. The outer shell 228, 276 may comprise an upper portion 228 and a bottom portion 252. The outer shell 228, 276 may further include an attachment mechanism 234 for attaching to the container 104.

The base 108 is adapted to provide heat to the inner cup 152. In this embodiment, the base 108 includes a heater plate 240 which is configured to contact the closed bottom of the inner cup 188 when the container 104 is attached to the base 108. The heater plate 240 is configured to transmit heat to the inner cup 152. The base 108 may be operated by an input device 124. The input device may include a number of buttons 130 for controlling the amount of heat delivered by the heater plate 240. The base 108 may include a power port 120 for receiving electrical power.

The base 108 may further include a sealing ring 248 for sealing the heater plate 240 to the upper portion of the outer shell 228. Since the heater plate 240 is configured to conduct heat, it will expand and contract during use. The sealing ring 248 may comprise a compressible material such as rubber or silicone to accommodate the expansion and contraction of the heater plate 240. The sealing ring 248 may also be compressed when the container 104 is attached to the base. The materials and dimensions of the sealing ring 248 may be selected to exert pressure against the heater plate when the container 104 is attached to the base. This may increase the contact between the heater plate and the closed bottom of the container 188.

Figure 31:
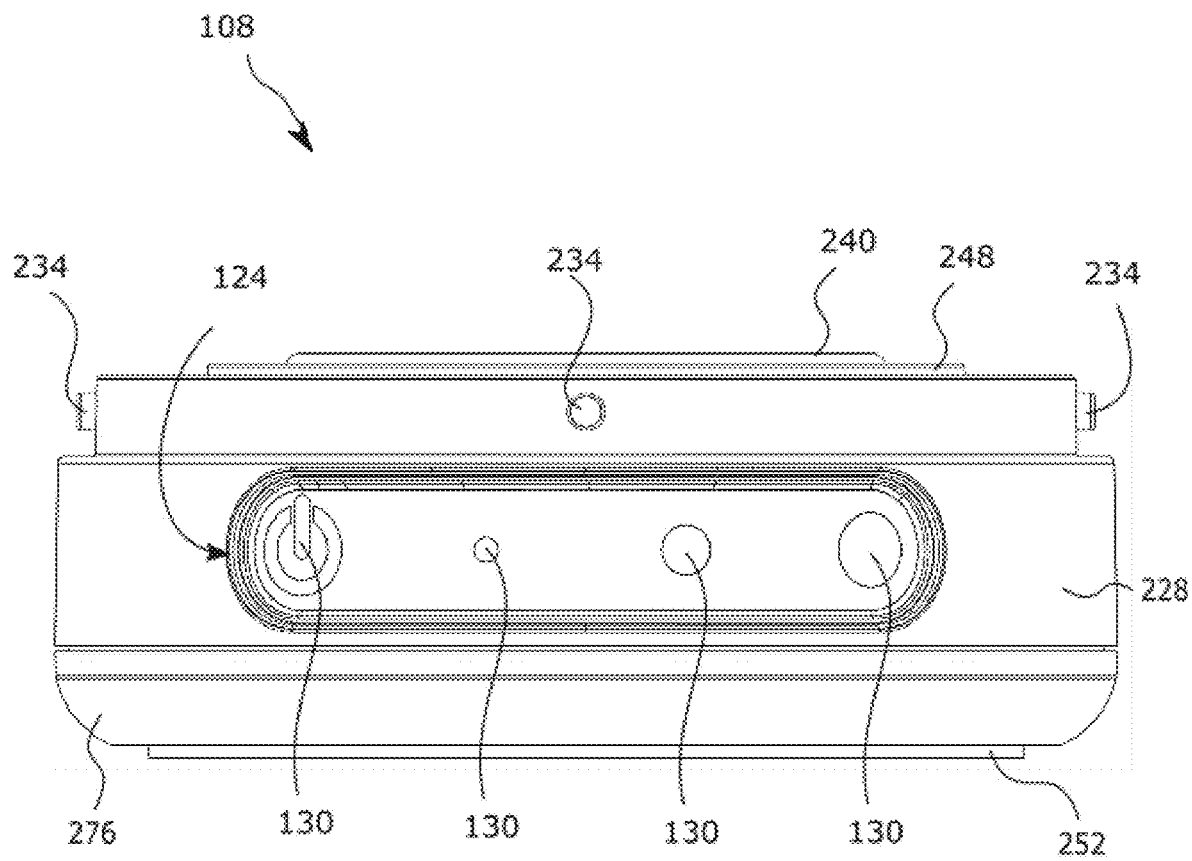
FIG. 31 is a front view of the base of FIG. 28.
Figure 32:
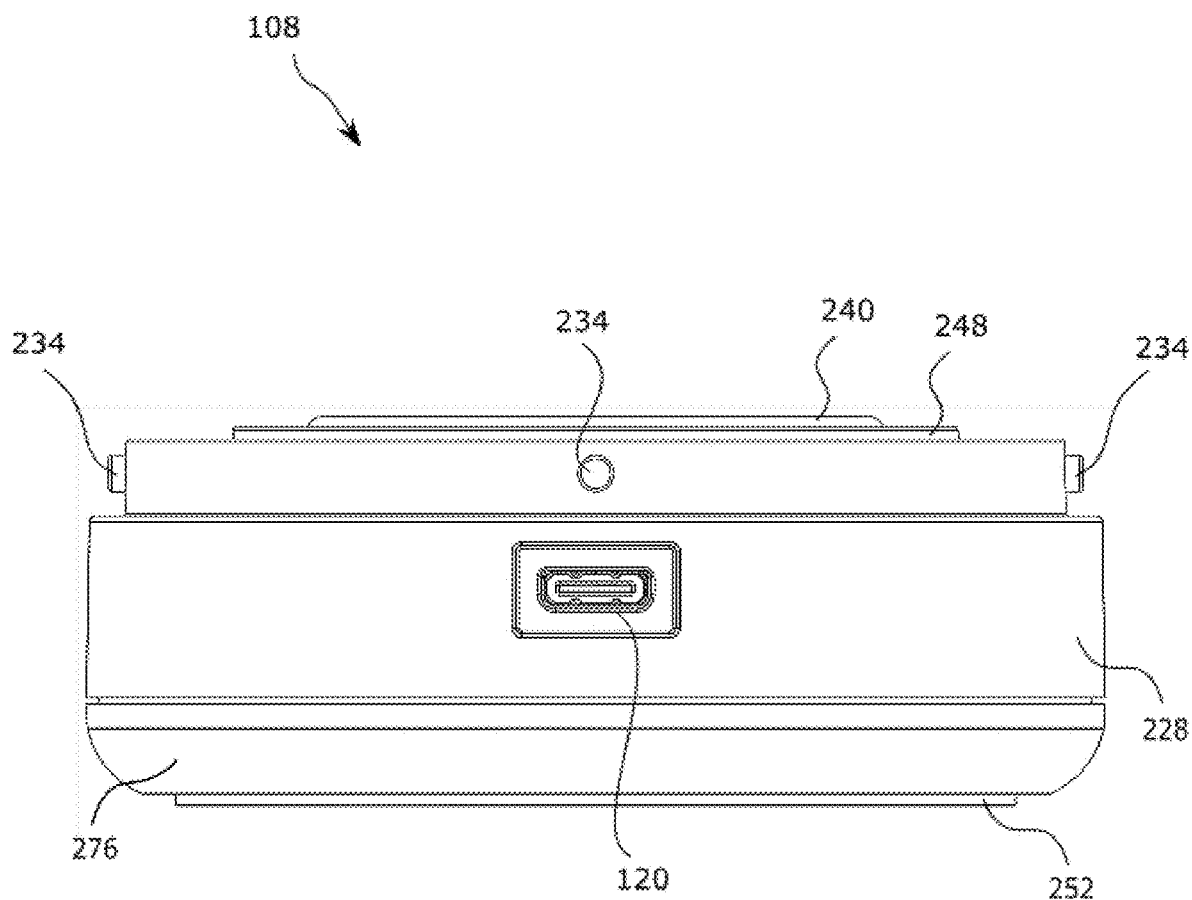
FIG. 32 is a rear view of the base of FIG. 28.
Figure 33:
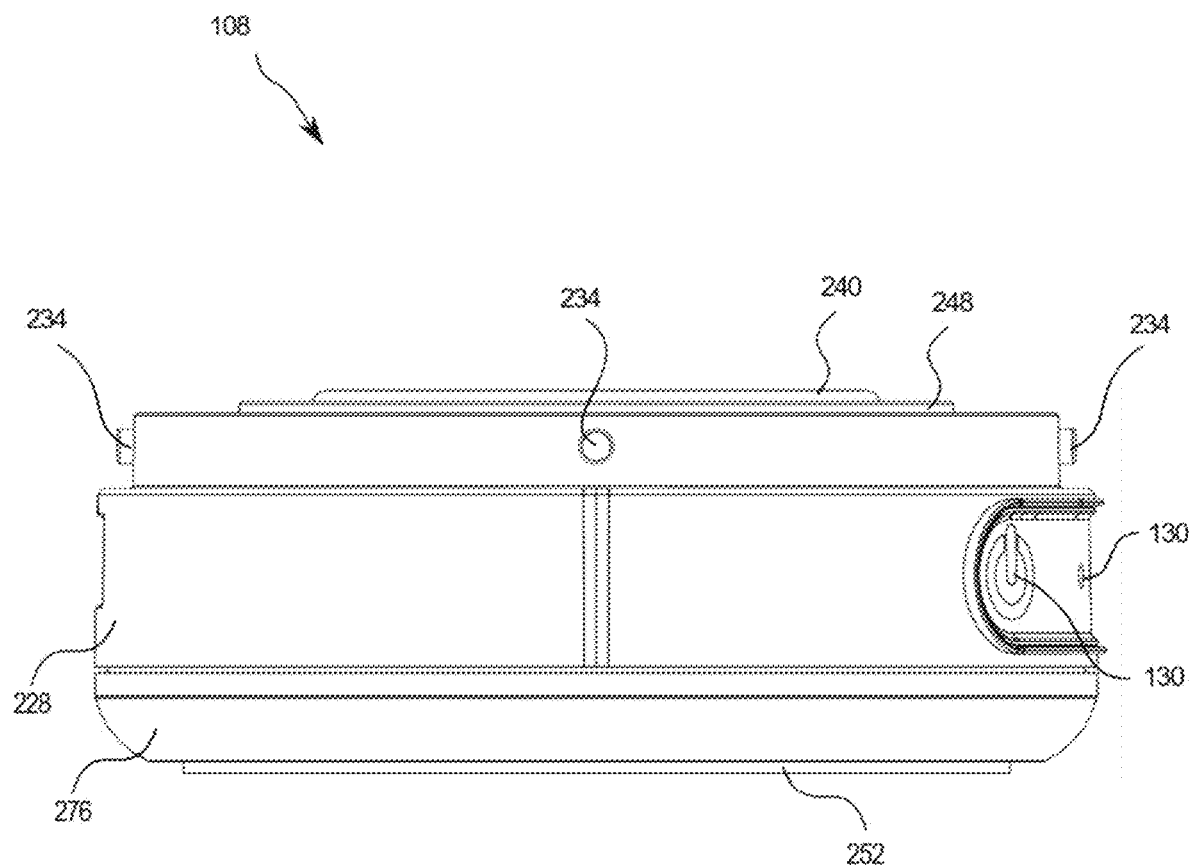
FIG. 33 is a left side view of the base of FIG. 28.
Figure 34:
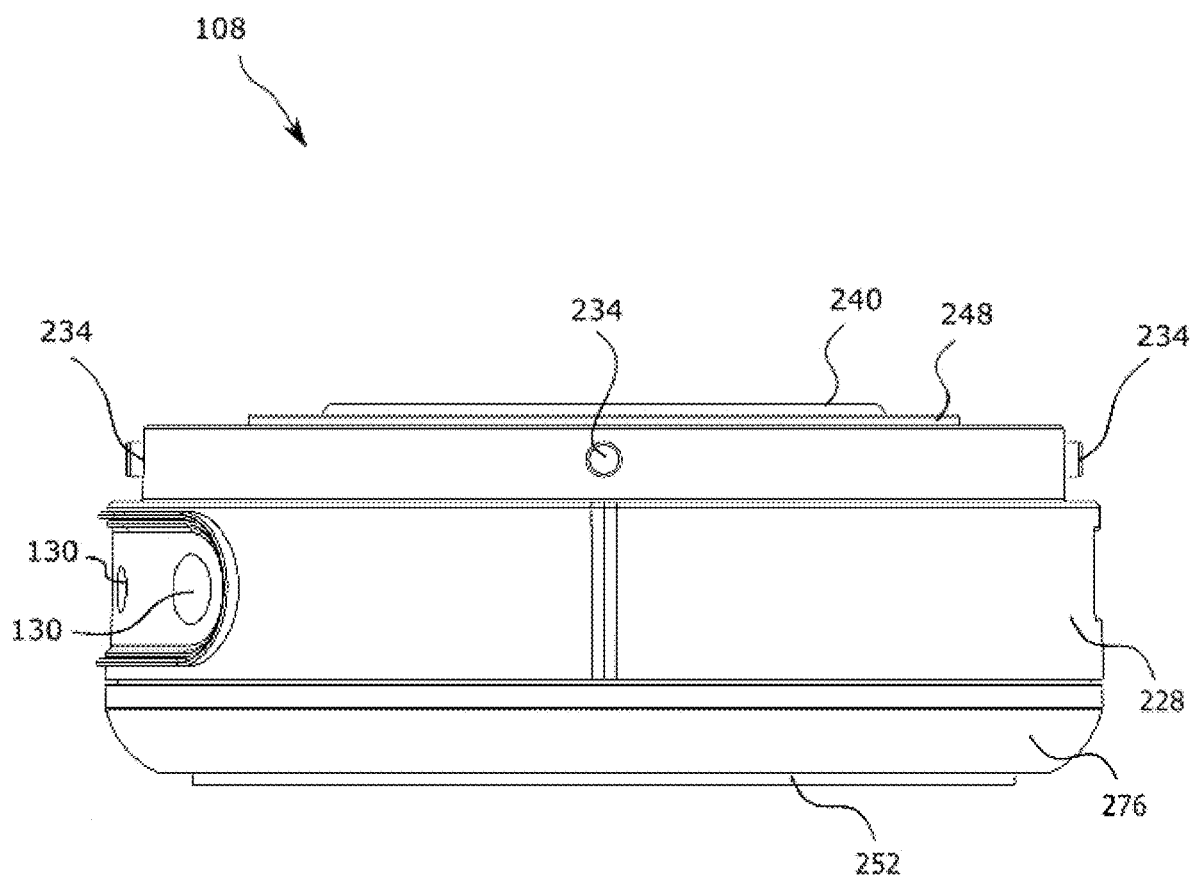
FIG. 34 is a right side view of the base of FIG. 28.

As shown in FIG. 31, the heater plate 240 may be raised above the sealing ring 248, and the sealing ring 248 may be raised above the upper portion of the outer shell 228. In this configuration, any liquid that is spilled on the heater plate 240 or sealing ring 248 may (assisted by gravity) roll off the base 108. In some configurations, the sealing ring 248 may be inclined to further prevent liquid from pooling on the heater plate 240 and sealing ring 248.

The base 108 may include a bottom 252. The bottom may comprise a high friction material such as rubber or silicone for stabilizing the base 108 on a surface.

Figure 35:
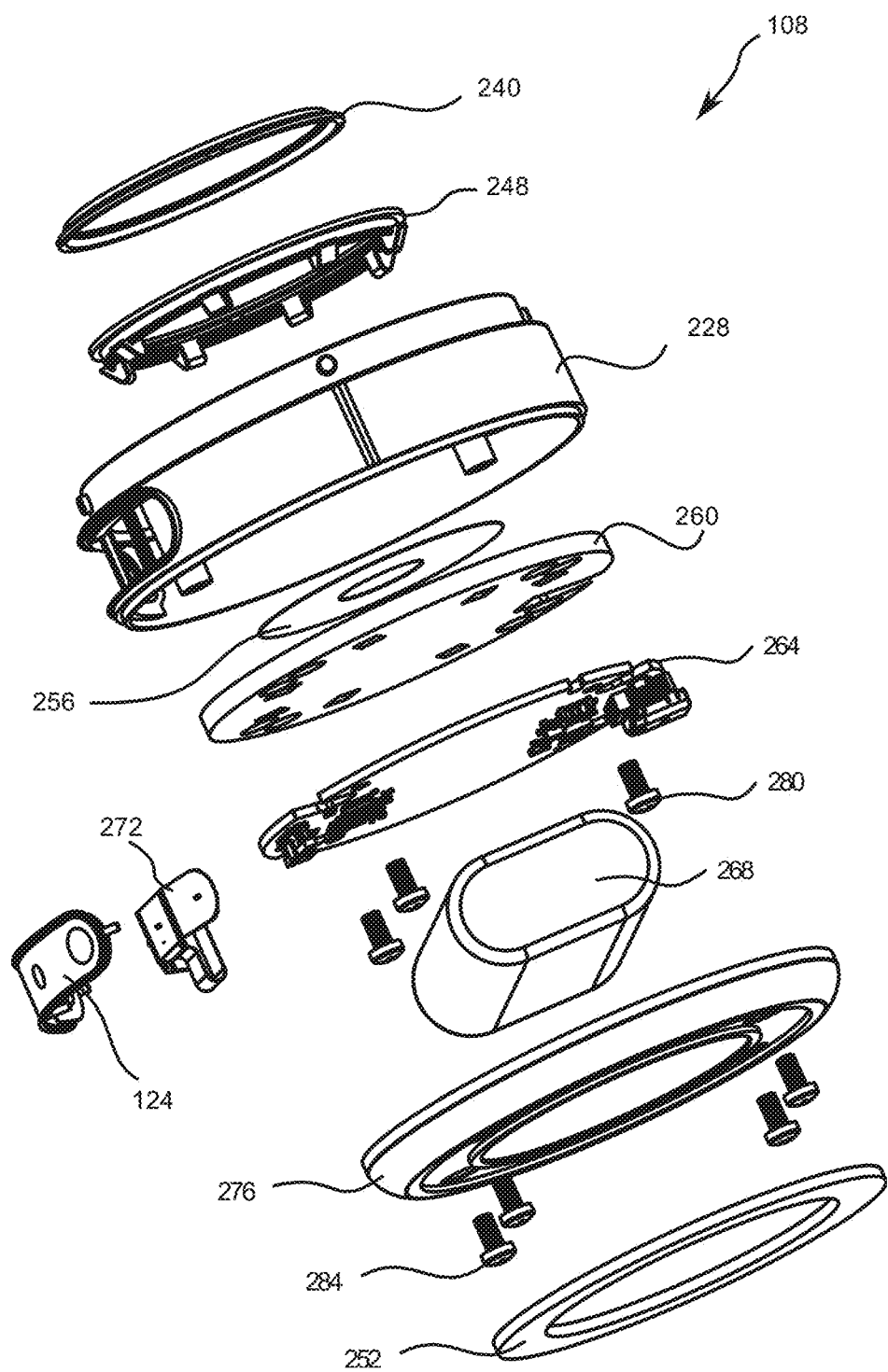
FIG. 35 is an exploded view of the base of FIG. 28.

An exploded view of the base 108 is shown in FIG. 35. The base includes at least one heater element 256 for applying heat to the heater plate 240. The heater element 256 may comprise a material with high heat resistance, for example a polyimide. The heater element 256 may be adhered to the heater plate 240. On the side of the heater element 256 opposite the heater plate 240, there may be an insulating plate 260. The insulating plate 260 may be configured to conserve energy by reflecting heat from the heater element 256. The insulating plate 260 may be further configured to protect the electronic components from the heat generated by the heater element 256.

The base 108 further includes a microcontroller 264 for controlling the heater element 256. The microcontroller 264 may be powered by a power source 268, for example a battery.

The microcontroller 264 may be configured to receive inputs from the input device 124. In this example, a flexible printed circuit board 272 is attached to the input device 124 with a pressure sensitive adhesive. When pressure is applied to the input device 124, an input signal is sent to the microcontroller 264. Power may be provided to the input device 124 by the power source 268.

The base may be enclosed by a bottom portion 276 of the shell. The base 108 may be held together with fasteners. A first set of fasteners 280 may attach the microcontroller 264 to the insulating plate 260. A second set of fasteners 284 may attach the bottom portion of the shell to the upper portion of the shell 228. The high friction bottom 252 may be adhered to the bottom portion 276.

Figure 36:
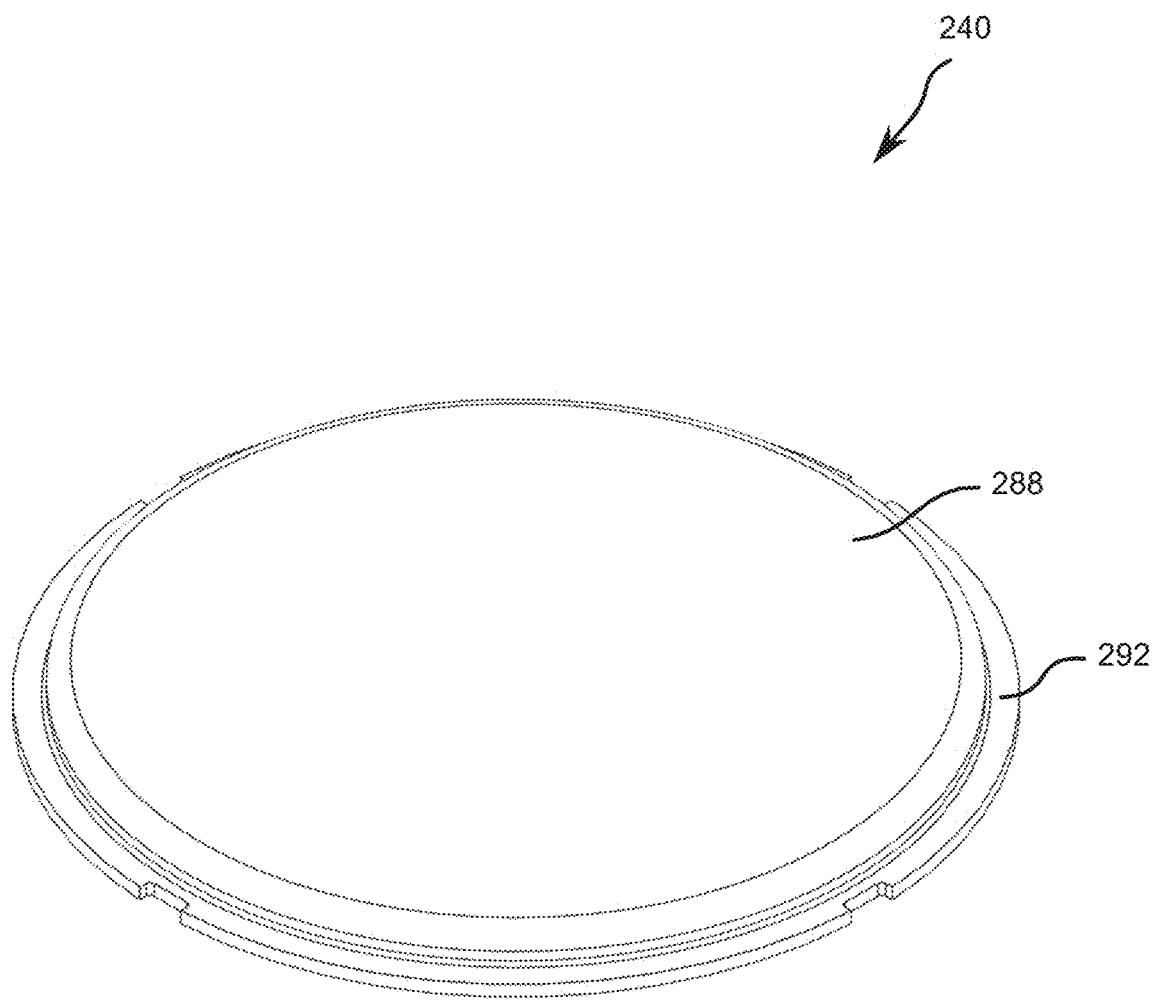
FIG. 36 is a perspective view of a heater plate.
Figure 37:
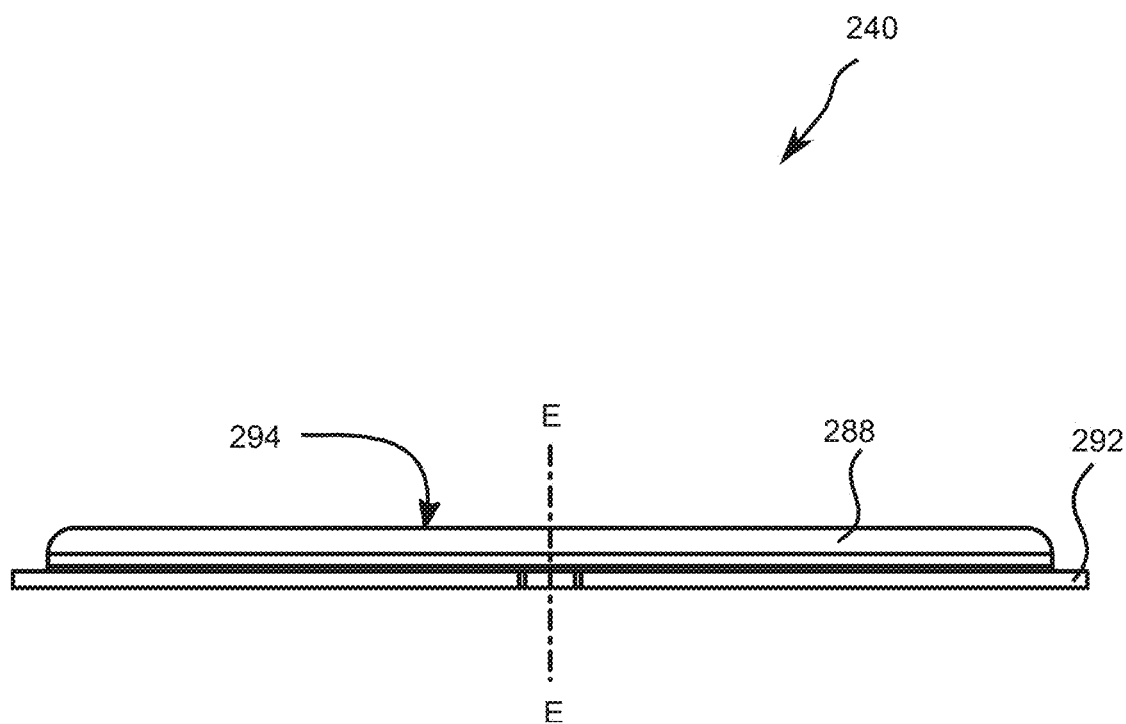
FIG. 37 is a side view of the heater plate of FIG. 36.
Figure 38:
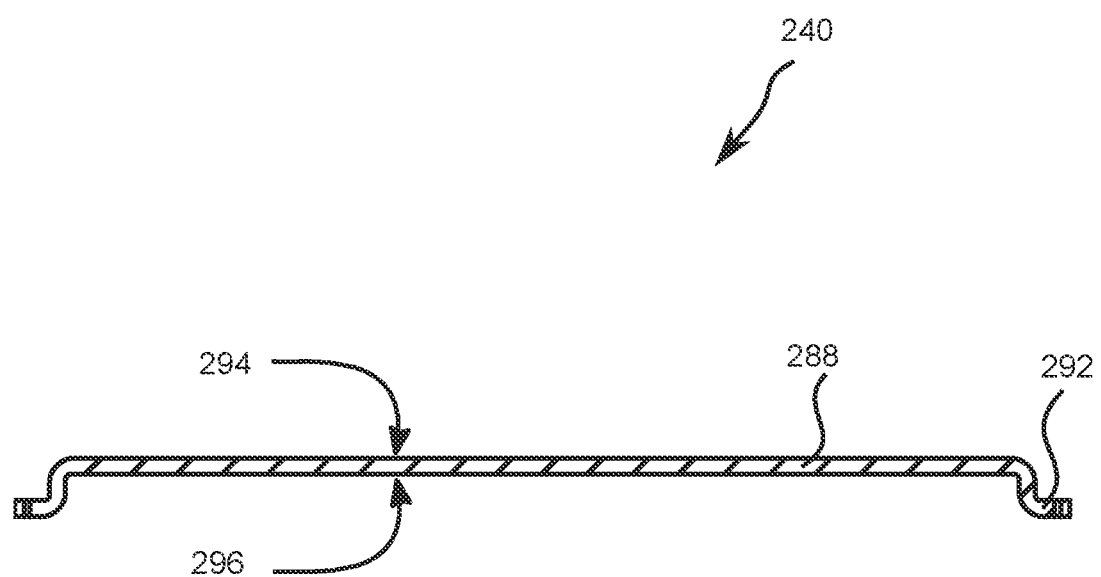
FIG. 38 is a sectional view of the heater plate of FIG. 36.
Figure 39:
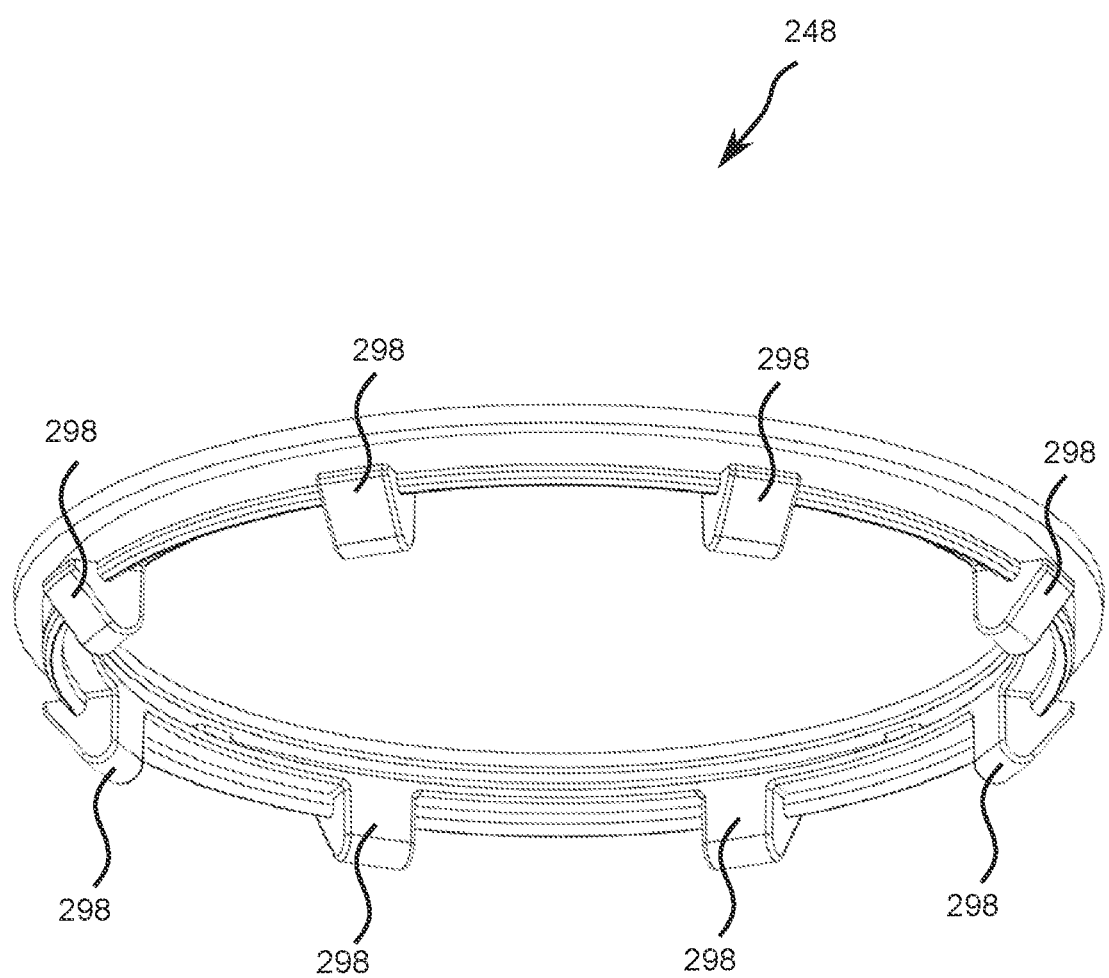
FIG. 39 is a perspective view of a flex ring.
Figure 40:
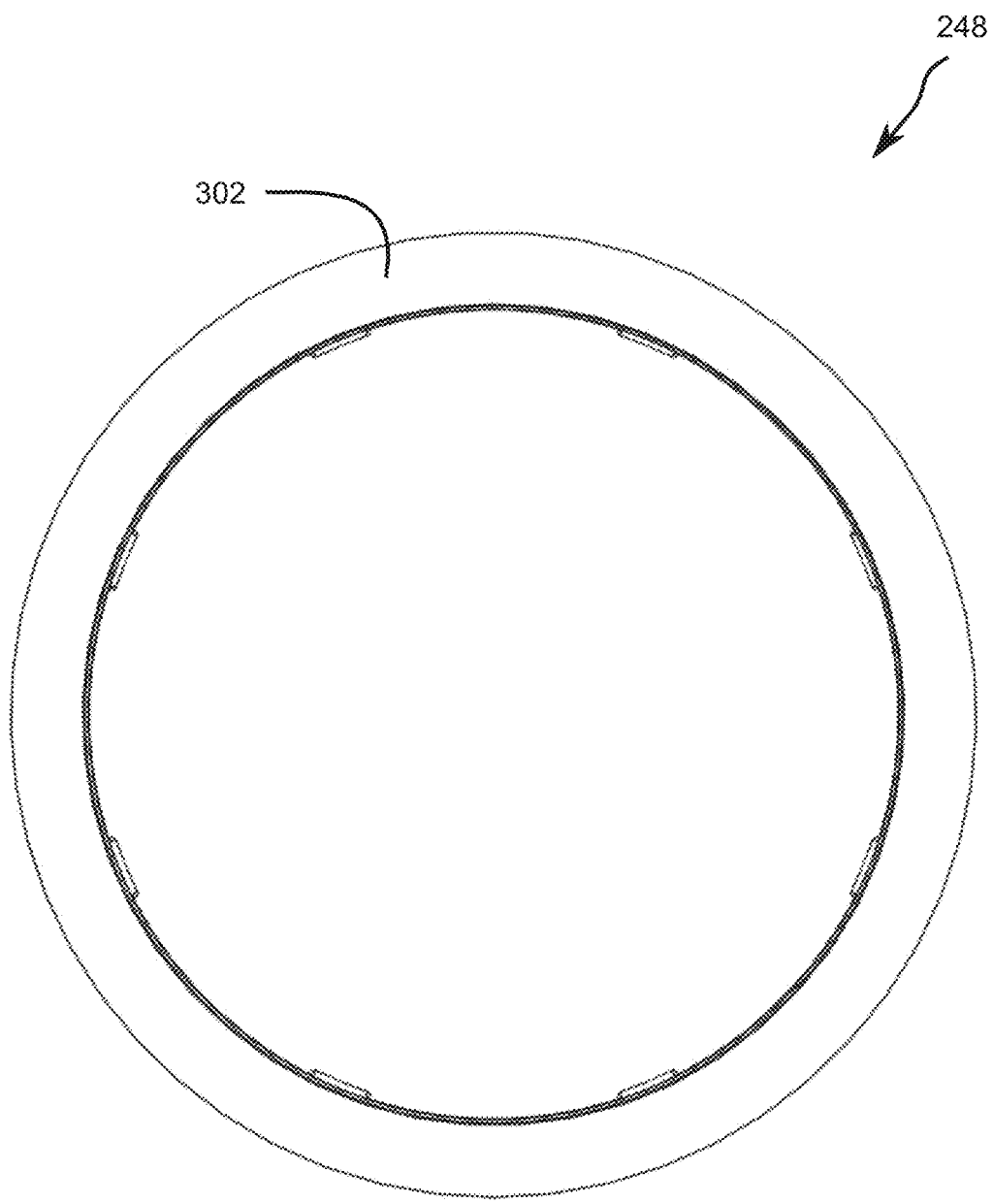
FIG. 40 is a top view of the flex ring of FIG. 39.
Figure 41:
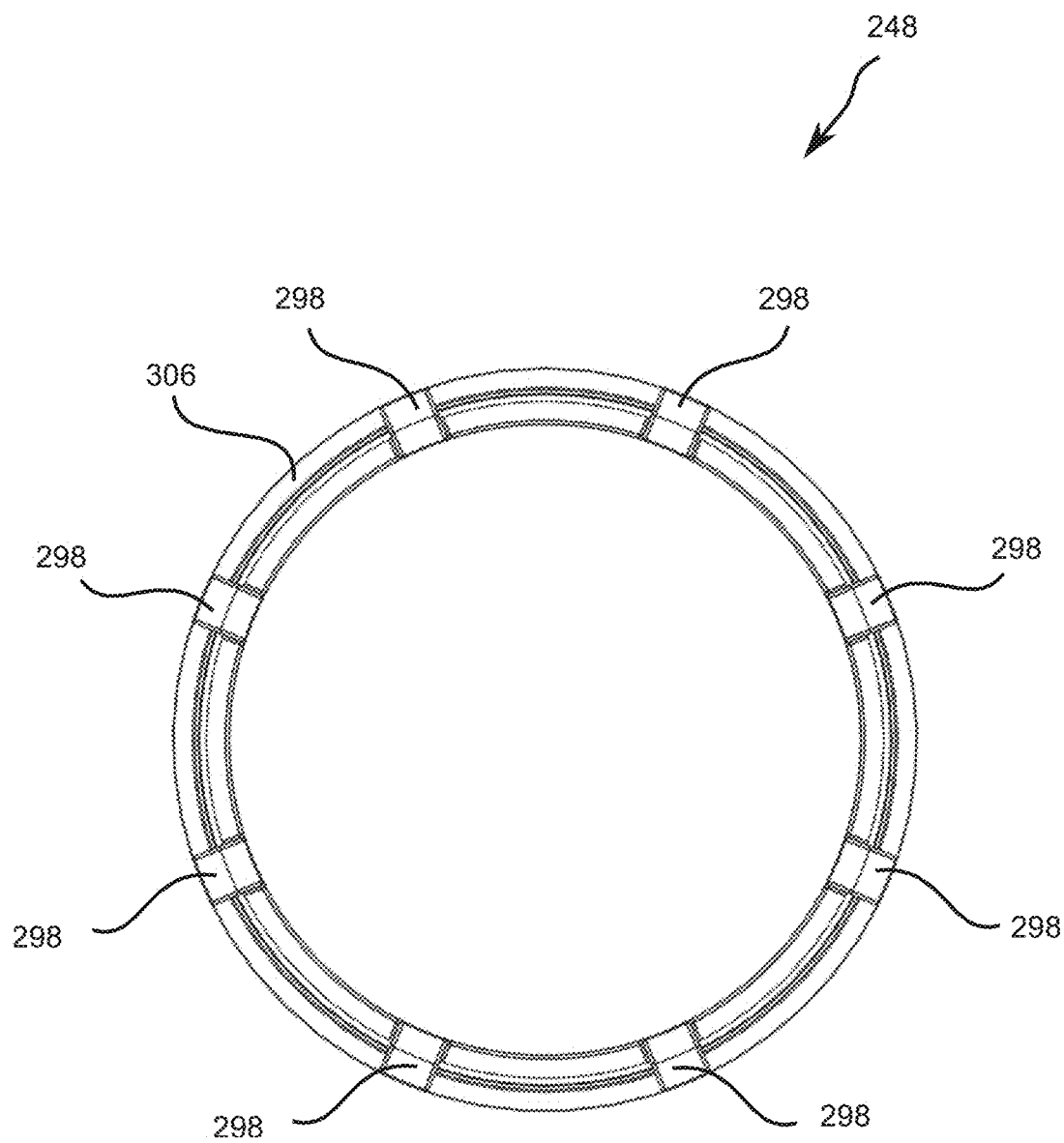
FIG. 41 is a bottom view of the flex ring of FIG. 39.
Figure 42:
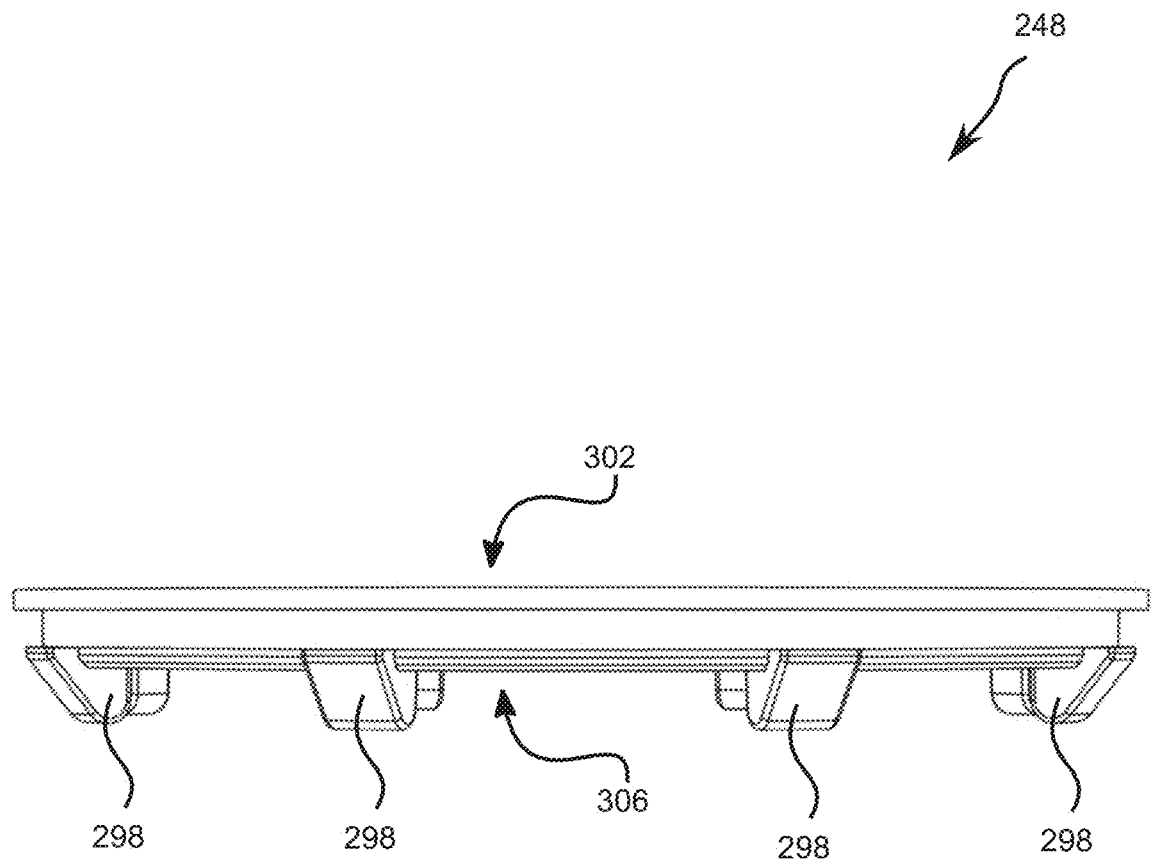
FIG. 42 is a side view of the flex ring of FIG. 39.

The heater plate 240 is shown in FIGS. 36 to 38. The heater plate 240 has a center portion 288 and an edge portion 292 that may be at least partially covered by the sealing ring 248. The center portion 288 may be raised so that when the edge portion 292 that covered by the sealing ring, an outer surface of the heater plate 294 is raised above a top surface of the sealing ring. The outer surface 294 is substantially planar. When the container 104 is attached to the base 108, the top surface 294 is substantially in contact with the closed bottom of the inner cup.

FIG. 38 shows a cross-section of the heater plate 240 at plane E-E. The center portion 288 has an inner surface 296 on a side opposite the outer surface 294. The inner surface 296 is in direct contact with the heater element 256 so as to receive heat from the heater element 256. In order to transfer heat quickly and efficiently from the heater element 256 to the container 104, the heater plate 240 may comprise a metal with high heat conductivity. Heat transfer may be improved in embodiments with a relatively thin center portion 288. In some embodiments, the center portion 288 may have a thickness of about 0.3 to about 0.9 millimeters, and more preferably about 0.5 to about 0.6 millimeters.

When the container 104 is attached to the base 108, the inner cup 152 is pressed into the heater plate 240, causing the heater plate 240 to substantially contact the inner cup 152. To improve contact and therefore heat transfer to the inner cup 152, the heater plate 240 may be sized and shaped accordingly. The materials and thickness of the heater plate 240 may be chosen such that the heater plate 240 is semi-flexible. In embodiments with a semi-flexible heater plate 240, the inner cup 152 is pressed into the heater plate 240 when the container 104 is attached to the base 108, causing the heater plate 240 to flex and improving contact between the heater plate 240 and the inner cup 152. In some embodiments with a semi-flexible heater plate 240, the heater plate 240 is slightly convex. For example, the heater plate 240 may be substantially flat with a tolerance of approximately 0.2 to 0.3 millimeters, and more preferably about 0.25 millimeters. In these embodiments, when the container 104 is attached to the base 108, the inner cup 152 exerts pressure on the closed bottom, reducing the convexity of the heater plate 240. Thus, when the container 104 is attached to the base 108, the heater plate 240 is pressed substantially flat.

The heater element 256 may be powered by the power source 268. The power source 268 may be selected to power the heater element 246 for a suitable period of time between charges. Increasing the efficiency of heat exchange between the heater plate 240 and the inner cup 152, as described above, can increase the period of time between charges.

The sealing ring 248 is shown in FIGS. 39 to 42. The sealing ring 248 may have a plurality of teeth 298 on a lower surface 306 for attaching to the shell 228. An upper surface 302 of the sealing ring may be substantially flat.

Figure 43:
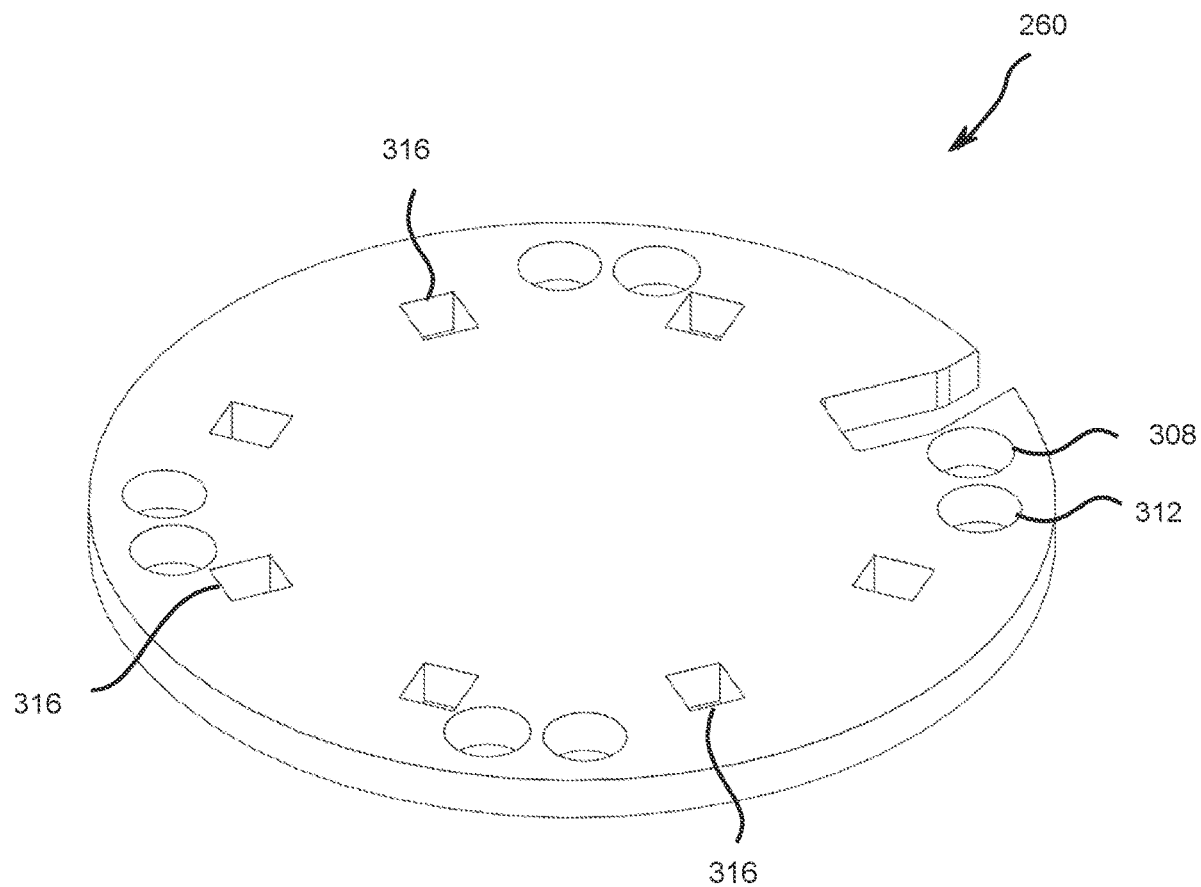
FIG. 43 is a perspective view of an insulating plate.
Figure 44:
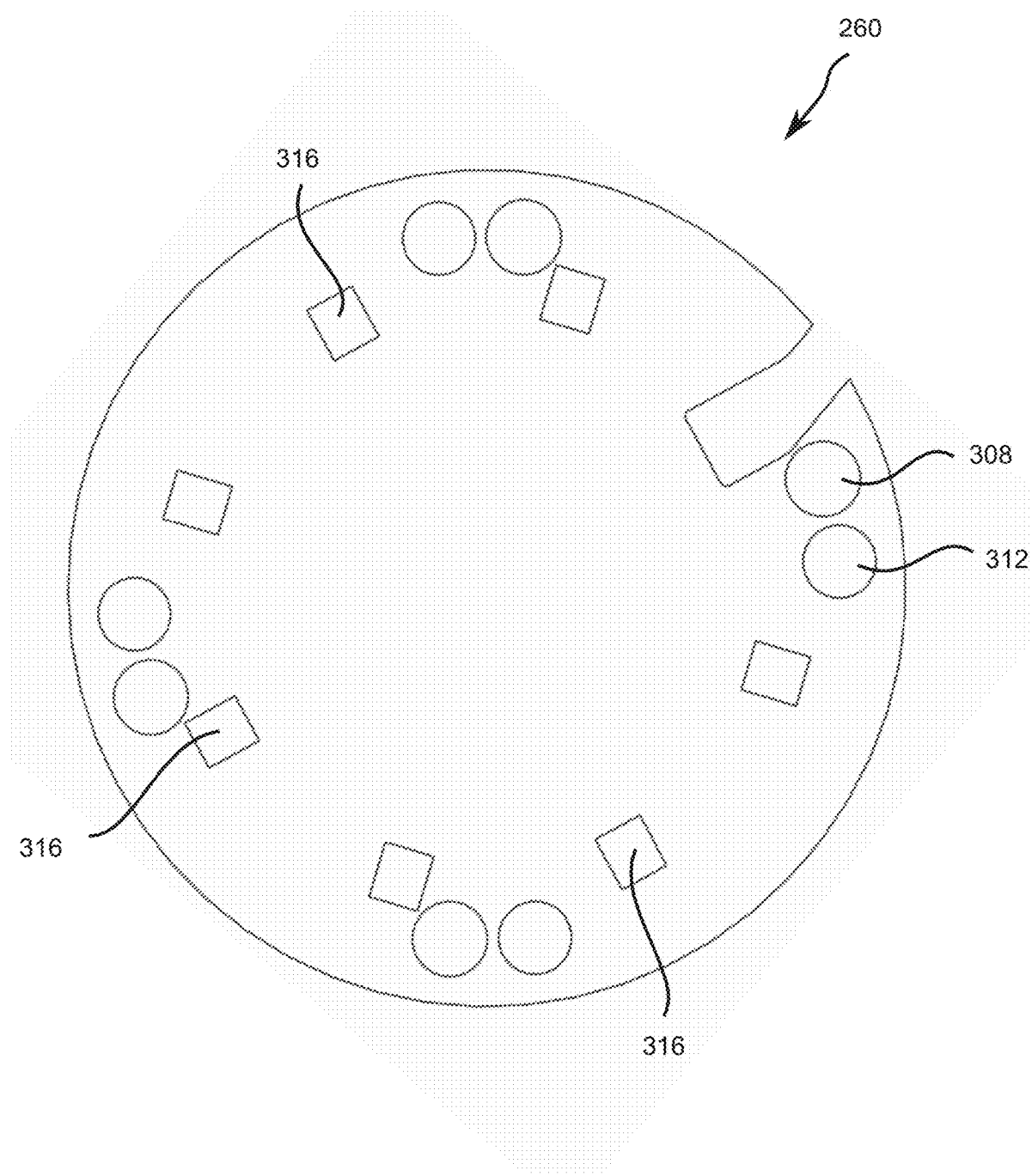
FIG. 44 is a top view of the insulating plate of FIG. 43.
Figure 45:
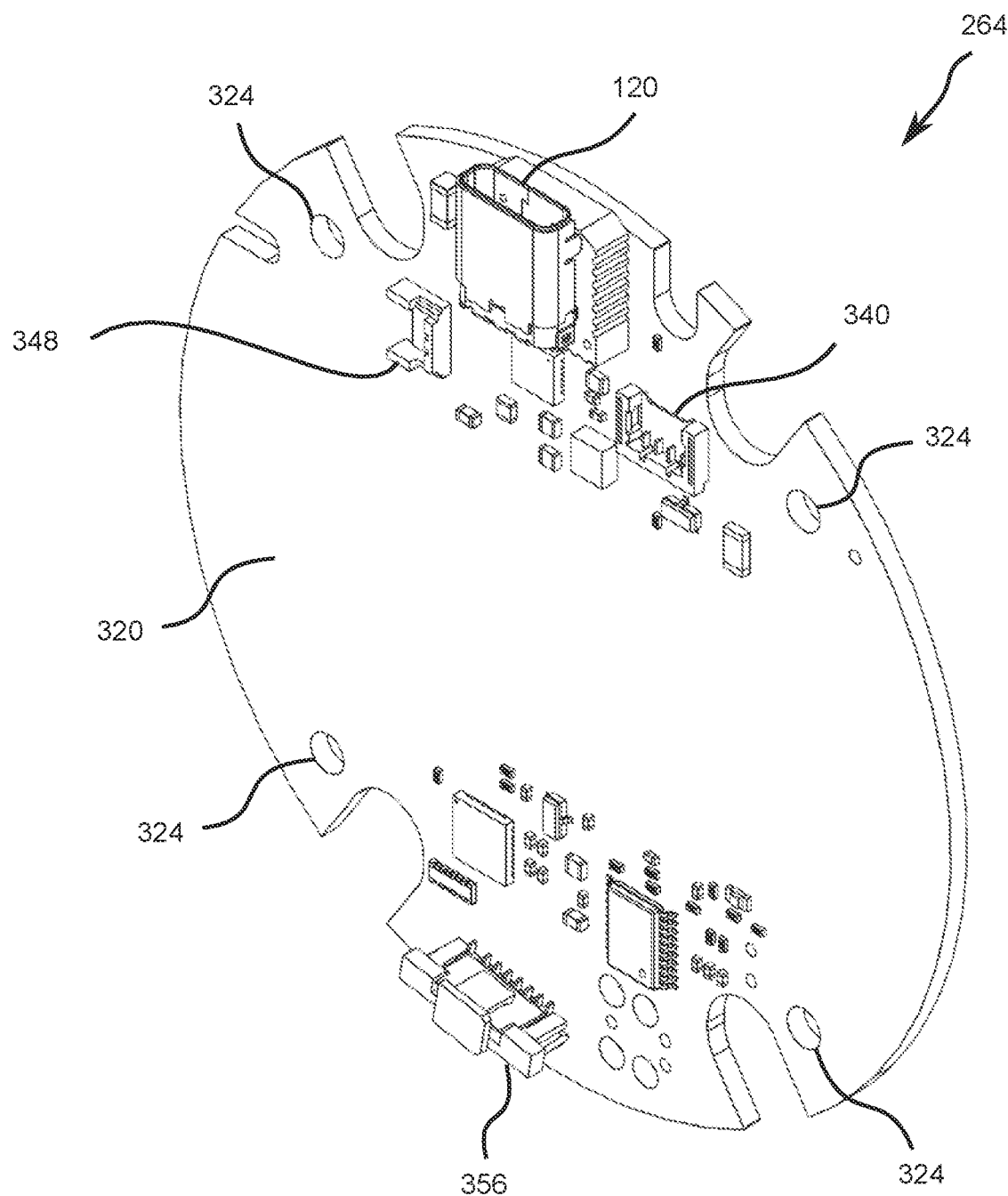
FIG. 45 is a perspective view of a microcontroller.
Figure 46:
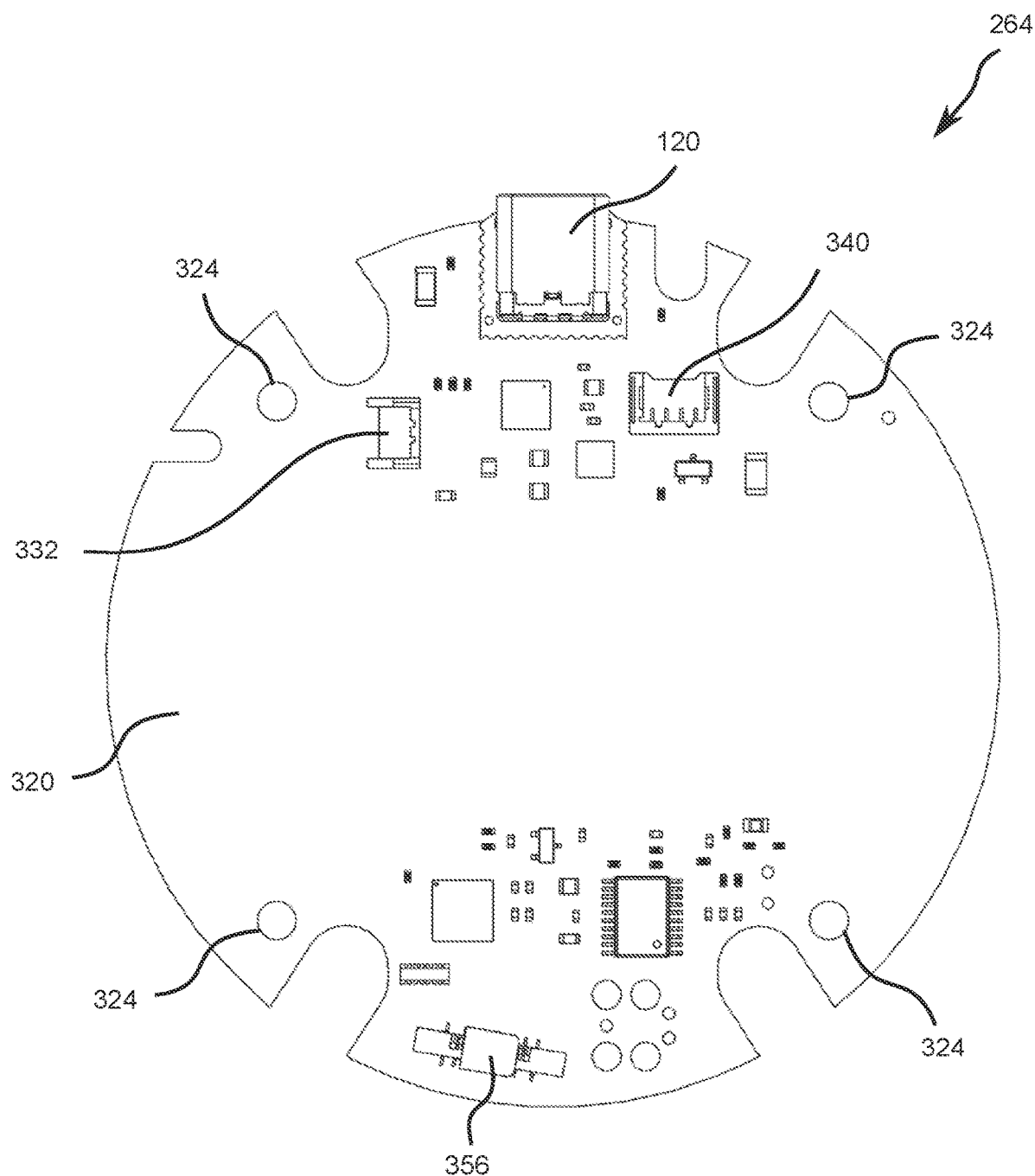
FIG. 46 is a top view of the microcontroller of FIG. 45.
Figure 47:
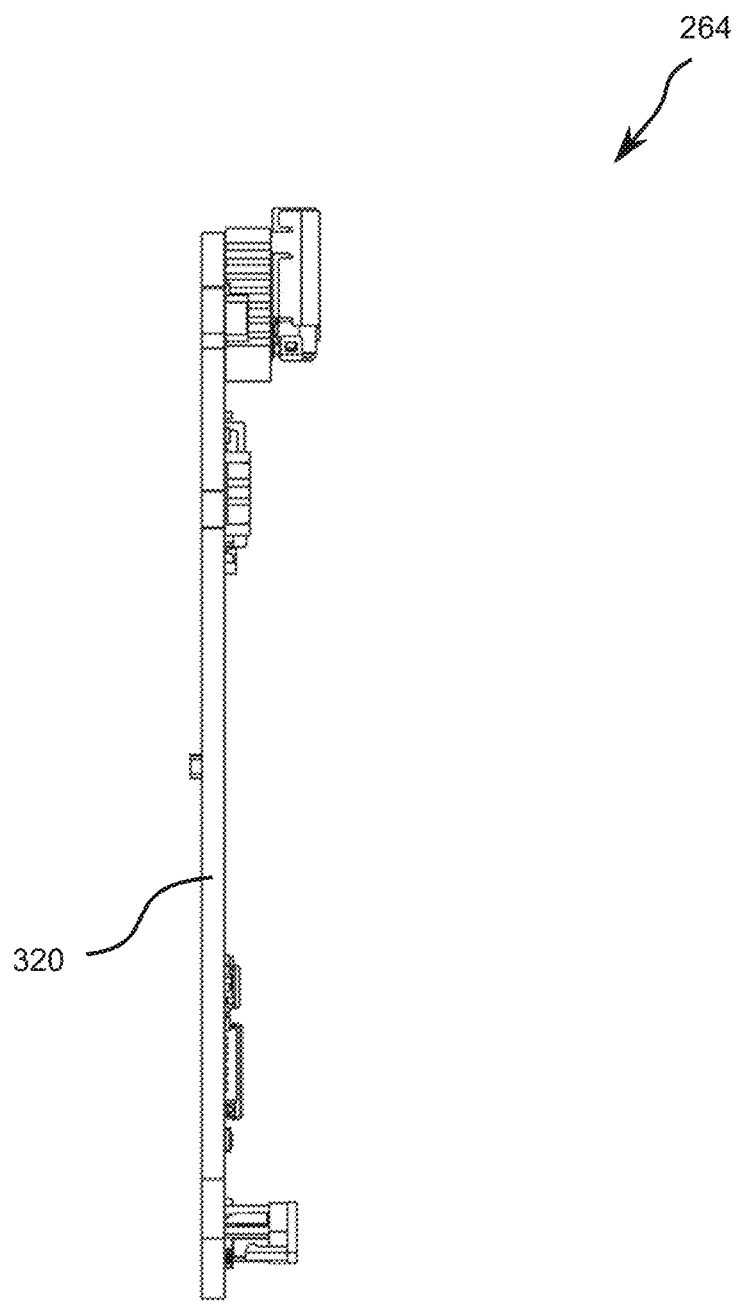
FIG. 47 is a left side view of the microcontroller of FIG. 45.
Figure 48:
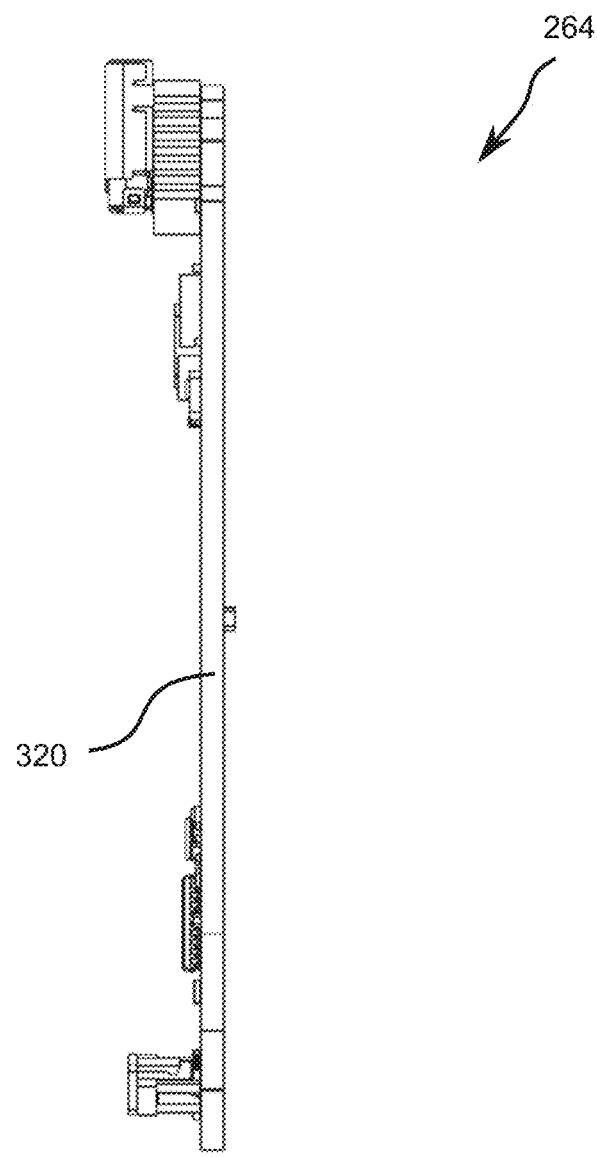
FIG. 48 is a right side view of the microcontroller of FIG. 45.
Figure 49:
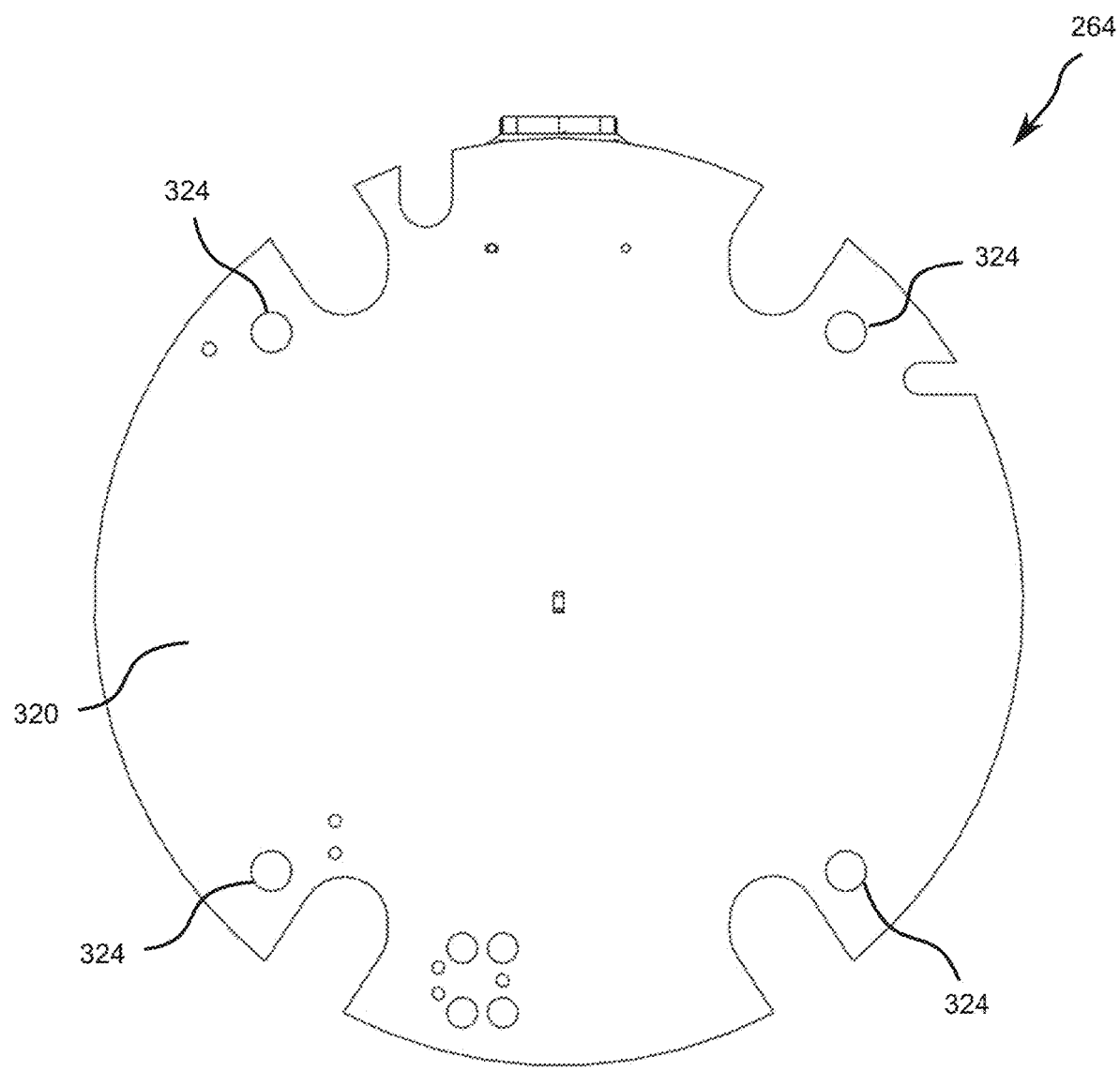
FIG. 49 is a bottom view of the microcontroller of FIG. 45.

Turning now to FIGS. 43 and 44, the insulating plate is shown generally at 260. The material and thickness of the insulating plate 260 may be selected to reflect heat emitted from the heater element 256 towards the heater plate 240.

The insulating plate 260 may include a first set of apertures 308 for accommodating the fasteners 280 that attach the microcontroller 264 to the insulating plate 260. A second set of apertures 312 may be included for accommodating the fasteners 264 that attach the bottom portion of the shell 276 to the upper portion of the shell 228. One or more apertures 316 may be included to accommodate wires (not shown). For example, wires attaching the heater element to the microcontroller 264.

FIGS. 45 to 49 show the microcontroller 264. The microcontroller 264 may comprise a circuit board 320 including a number of components for controlling the heater element. The microcontroller 264 includes a board 320 for supporting the components of the microcontroller 264. The board 320 may include a plurality of apertures 324 for accommodating fasteners to attach the microcontroller 264 to the insulating plate 260. The microcontroller 264 may further include a heater connector 340 for electrically connecting the microcontroller 264 to the heater element (shown in FIG. 35). The microcontroller 264 may include a power port 120 for receiving a charging cable (not shown). In this example, the power port 120 is a USB-C type connector. The power port 120 is configured to receive current from a charging cable (not shown) and transfer current to a power source connector 348. The power source connector 348 is configured to transfer current to the power source 268. The microcontroller 264 may also include an input device connector 356. The input device connector 356 is configured to receive an input signal from the input device.

Figure 50:
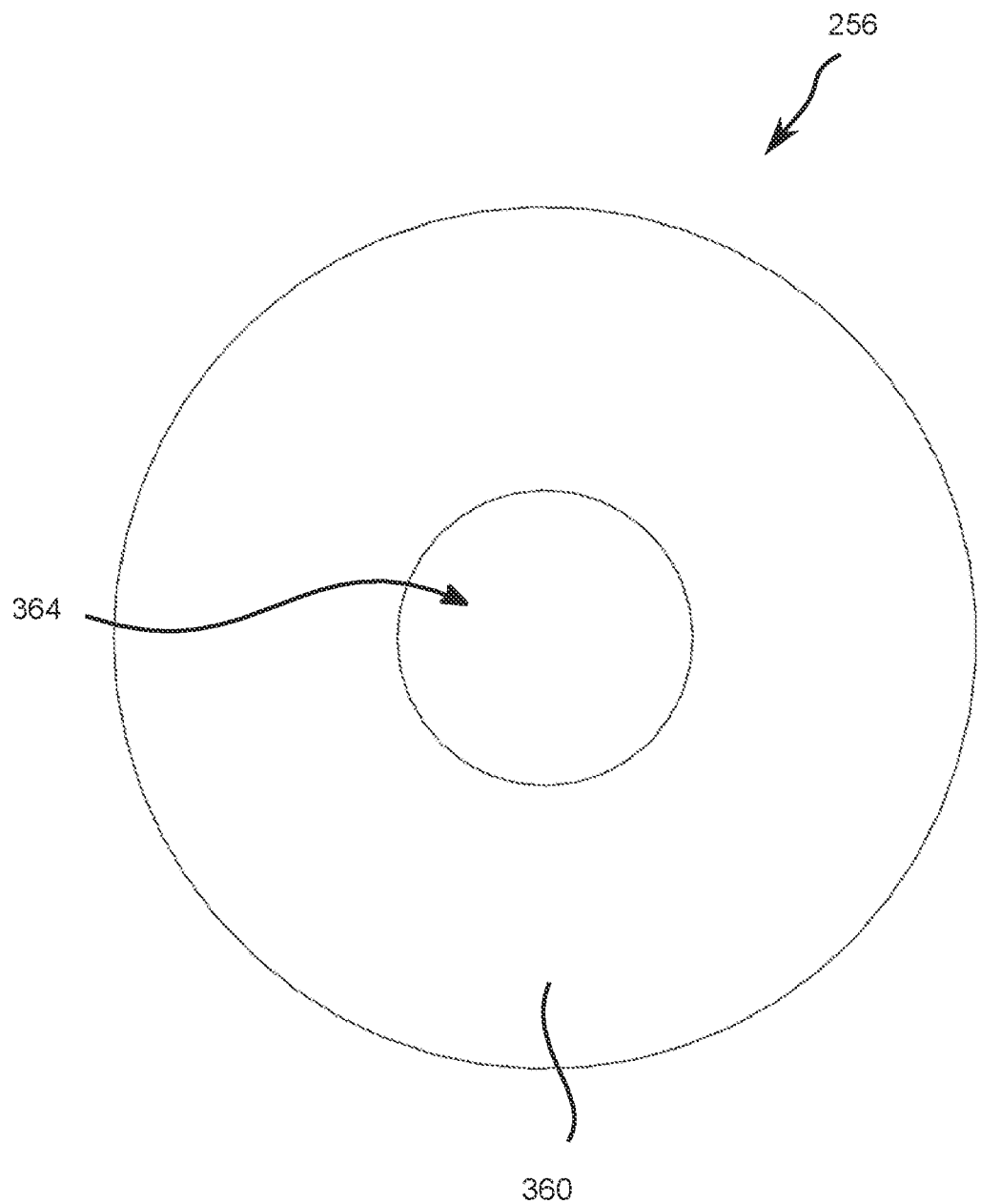
FIG. 50 is a top view of the heater element of FIG. 50.

Referring now to FIG. 50, the heater element is shown generally at 256. The heater element may substantially comprise a disc 360. In the embodiment shown, the disc is circular in shape, but the shape of the disc is not particularly limited. The size and shape of the disc 360 may be chosen to substantially align with the size and shape of the heater plate 240. The heater element 256 may include an aperture 364 for accommodating a temperature sensor (described below with respect to FIG. 51).

Figure 51:
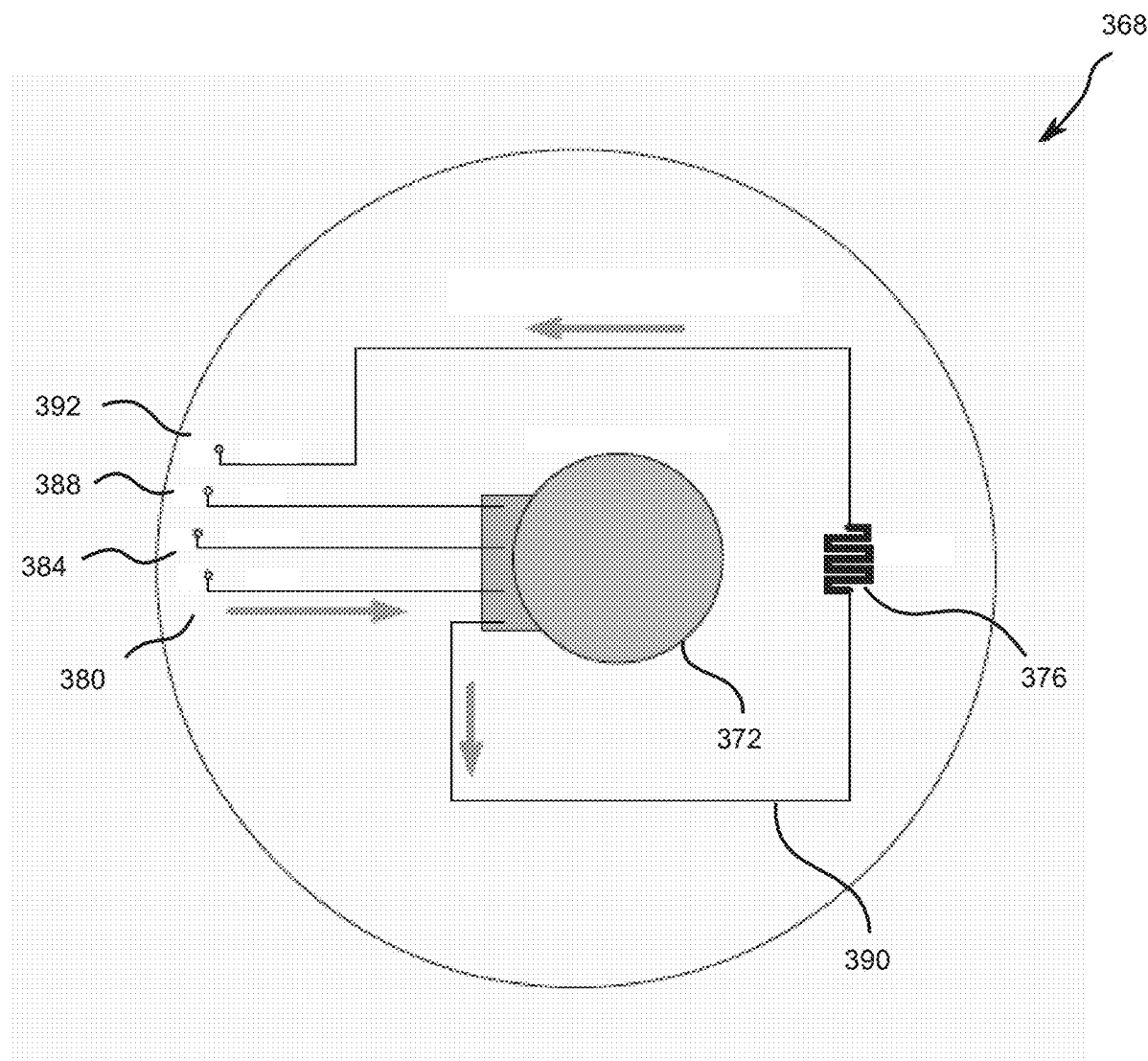
FIG. 51 is a schematic view of a heating system.

FIG. 51 is a schematic diagram 368 showing how the temperature sensor 372 and heater element 376 are electrically connected. The temperature sensor 372 may receive current from the power source from a first pin 380. The temperature sensor detects the temperature of the heater element 376 and generates a temperature signal indicative of the heater element's temperature. The temperature signal is sent to the microcontroller 264 via a second pin 384. A third pin 388 for grounding is also connected to the temperature sensor. A wire 390 connects the temperature sensor to the heater element 376 which generates heat. The heater 376 is configured to transfer the heat into the heater element 376. Current from the heater element 376 is returned to the power source 268 via a fourth pin 392.

The microcontroller 264 may include a computer-readable storage medium that is programmed with an algorithm. The microcontroller 264 can execute instructions stored on the computer-readable storage medium, which when executed, cause the microcontroller 264 to perform the algorithm. The microcontroller 264 may be configured to determine, based on the temperature signal and the input signal, whether to increase or decrease power to the heater element 376. The microcontroller 264 may be programmed to determine the temperature rate of change based on the temperature signal received at two different time points. The microcontroller 264 can then compare the temperature rate of change with a plurality of temperature curves.

Figure 52:
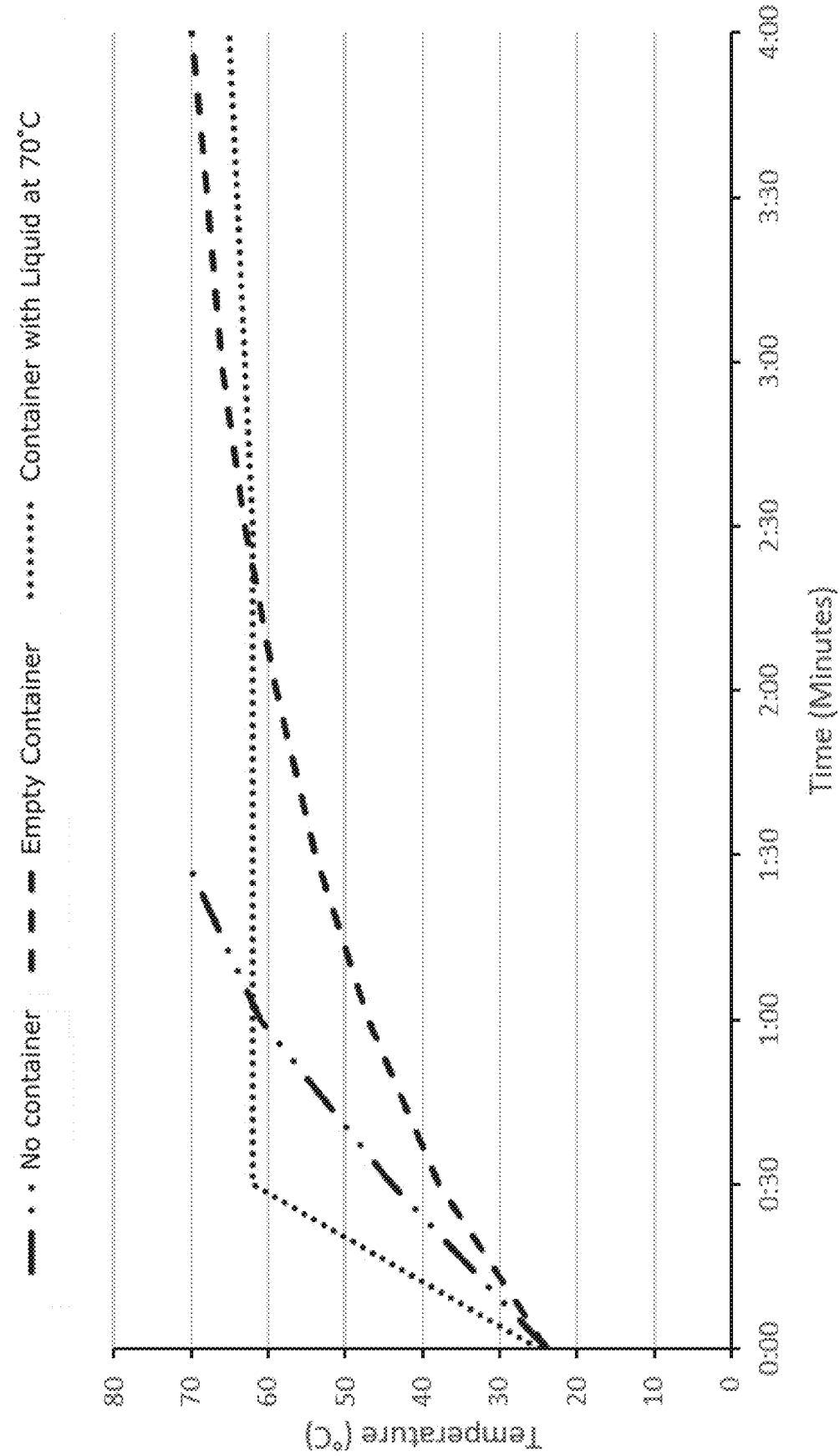
FIG. 52 is a graph showing temperature curves.

FIG. 52 is a graph showing examples of temperature curves under three possible scenarios: (1) a temperature curve expected for the temperature sensor if no container 104 is attached to the base 108; (2) a temperature curve expected for the temperature sensor if an empty container 104 is attached to the base 108; and (3) a temperature curve expected for the temperature sensor if a container 104 holding hot liquid (70° C.) is attached to the base 108.

In FIG. 52, the temperature rate of change for the heater plate 240 when the container 104 is empty is indicated by the dashed line. If the temperature rate of change is approximately that expected for an empty container, then the microcontroller 264 may determine that the container 104 is attached to the base but the container 104 is empty. If the temperature rate of change is below that expected for an empty container, the microcontroller 264 may determine that the mug contains a warm or cold liquid. The increased thermal mass would lessen the rate of temperature increase, as compared with an empty container.

The temperature rate of change for the heater plate 240 after a hot liquid has been poured into the container 104 is indicated by the dotted line. If the temperature rate of change is at or above that expected when a hot liquid is poured into the container 104, then the microcontroller 264 may determine that the container 104 holds a hot liquid. When a hot or warm liquid is added to the container 104, heat from the liquid may transfer into the inner cup and subsequently into the heater plate 240. The heater plate 240 may reach a temperature close to that of the liquid.

The temperature rate of change for the heater plate 240 when the container 104 is not attached to the base is indicated by the dashed and dotted line. If the temperature rate of change is similar to that expected if the container 104 is not attached to the base, the microcontroller may determine that the container 104 is not attached to the base and turn the heater element is "OFF". When the container 104 is not attached to the base 108 and the heater element 376 is "ON", the heater plate 240 may increase temperature rapidly. The microcontroller 264 may turn "OFF" the heater element 376 to avoid wasting power and to avoid the danger of an exposed hot surface.

The computer-readable storage medium may store a plurality of temperature curves representing various volumes, temperatures, and compositions of liquids that may be contained in the apparatus.

The microcontroller 264 may also control the heater element 376 based on an input signal. The input signal may be generated at the input device 124. The algorithm may determine a threshold temperature based on the input signal. The threshold may be a temperature or ranges of temperatures. If the algorithm determines that the temperature of a liquid in the container is above the threshold temperature indicated by the input signal, the microcontroller 264 may control the heater element 376 to turn "OFF". Conversely, if the algorithm determines that the temperature of a liquid in the container is below the threshold temperature indicated by the input signal, the microcontroller 264 may control the heater element 376 to turn "ON".

Figure 53:
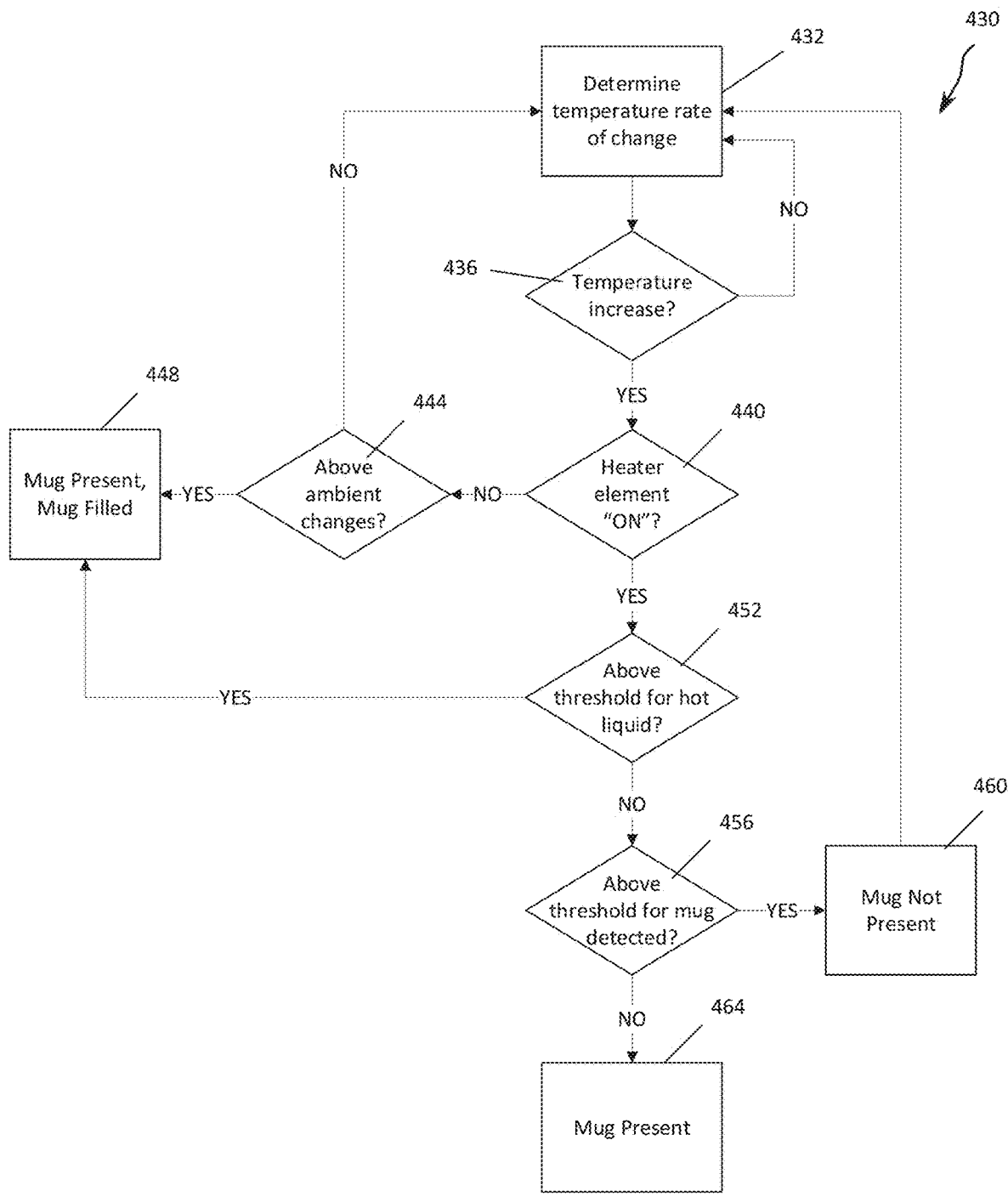
FIG. 53 a flowchart of a method of regulating temperature.
Figure 54:
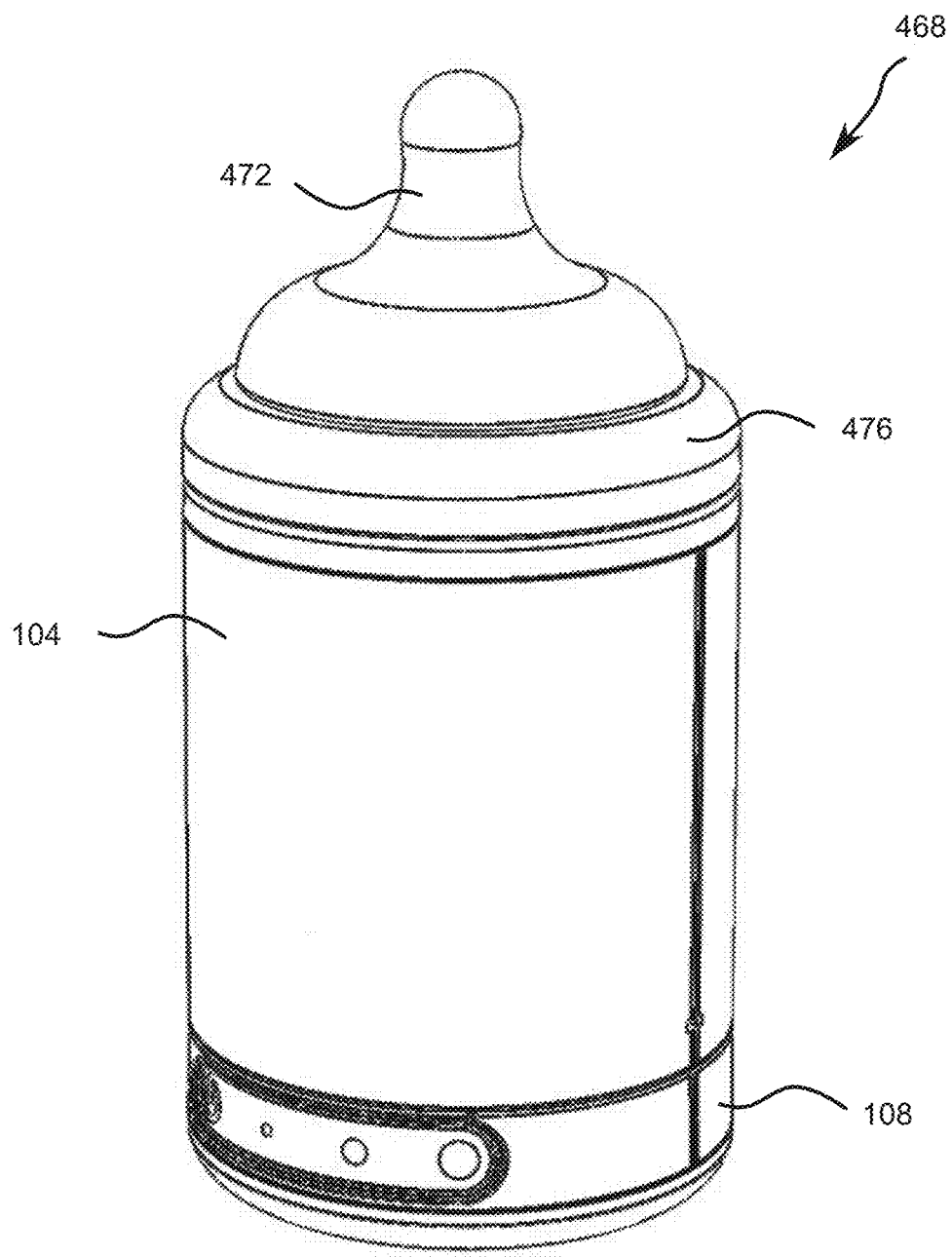
FIG. 54 is a perspective view of a warming apparatus.
Figure 55:
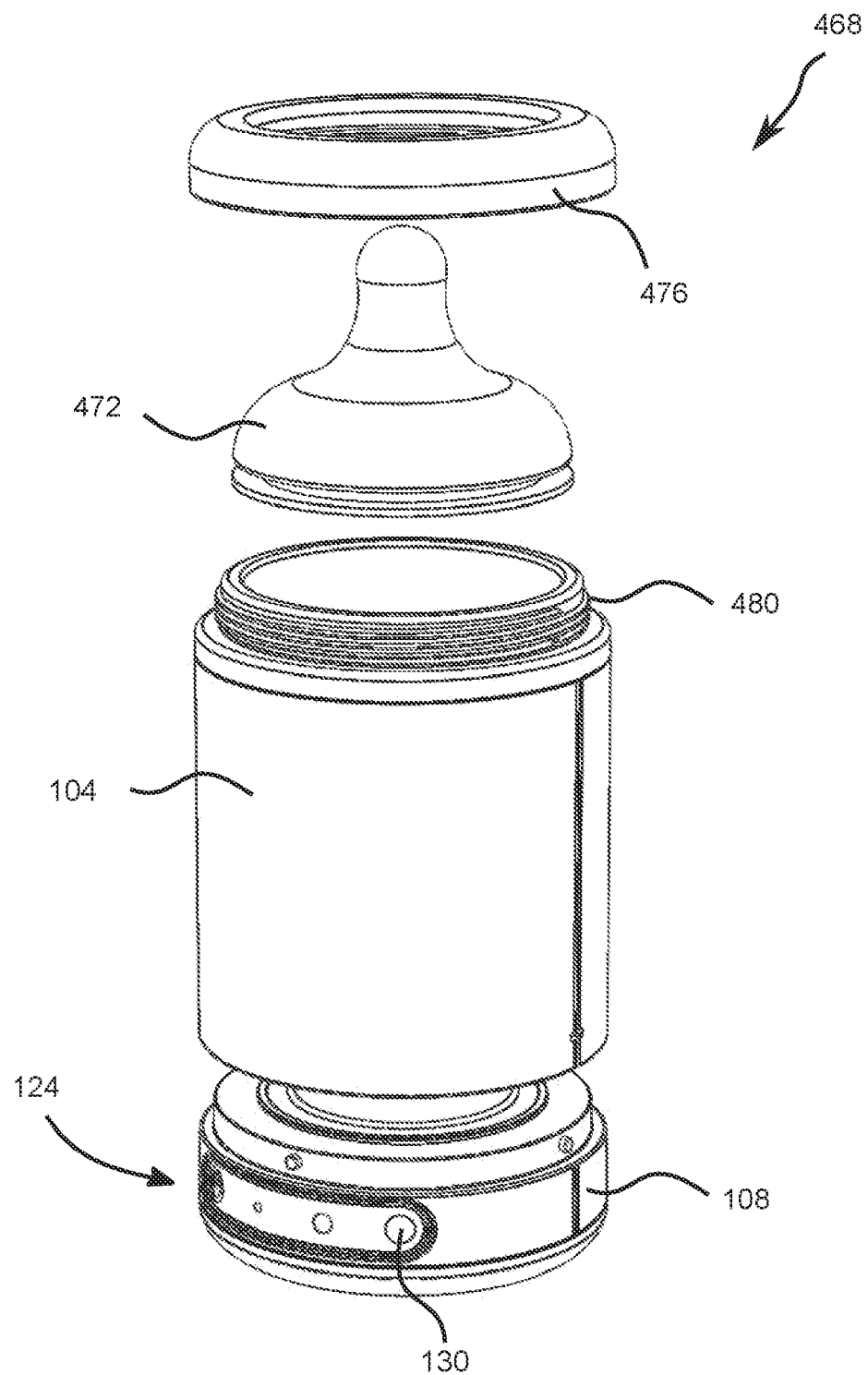
FIG. 55 is an exploded view of the warming apparatus of FIG. 54.

FIG. 53 is a flowchart showing a method of controlling the temperature in a liquid at 430. This method 400 is a proportional, integral (PI) control loop, but the microcontroller may be programmed to implement a number of suitable methods. The method 400 starts at 432 with the microcontroller 264 determining the temperature rate of change of the heater element 376 based on at least one temperature signal sent by the temperature sensor. At 436, the microcontroller determines whether or not the temperature has increased. If the temperature has not increased, the microcontroller 264 returns to box 432. If the temperature has increased, the microcontroller 264 determines whether or not the heater element is "ON" 440.

If the heater element 376 is not "ON", the microcontroller 264 determines whether or not the temperature rate of change is above normal ambient changes 444. If the temperature rate of change is not above normal ambient temperature changes, the microcontroller 264 returns to box 432. If the temperature rate of change is above normal ambient temperature changes, the microcontroller 264 sets flags indicating that the container 104 is attached to the base 108 and the container 104 holds a liquid at block 448.

If the heater is "ON", the microcontroller 264 determines at block 452 whether or not the temperature rate of change is above a threshold temperature rate of change for the container 104 holding liquid. If the temperature rate of change is above the threshold, the microcontroller 264 proceeds to 448 and sets flags to indicate that the container 104 is attached to the base 108 and the container 104 holds a liquid. If the temperature rate of change is not above the threshold for liquid, the microcontroller 264 determines whether the temperature rate of change is above a threshold for mug detection at block 456. If YES, the container 104 is not attached to the base. The microprocessor 264 controls the heater element 376 to stop heating the heater plate 240 at block 460. If NO, the microcontroller 264 proceeds to block 464 and sets a flag indicating that the container 104 is attached to the base 108. At block 464, the microcontroller 264 may control the heater element 376 to turn "ON" and increase the temperature of the container 104.

The microcontroller 264 may repeat the process continuously or at regular increments of time.

The heater element 376 may include an independent thermal cut-off mechanism. When the temperature sensor detects a temperature at or above a threshold cut-off temperature, the heater element 376 is turned "OFF". The independent thermal cut-off mechanism may serve as a back-up to the microcontroller 264.

Figure 56:
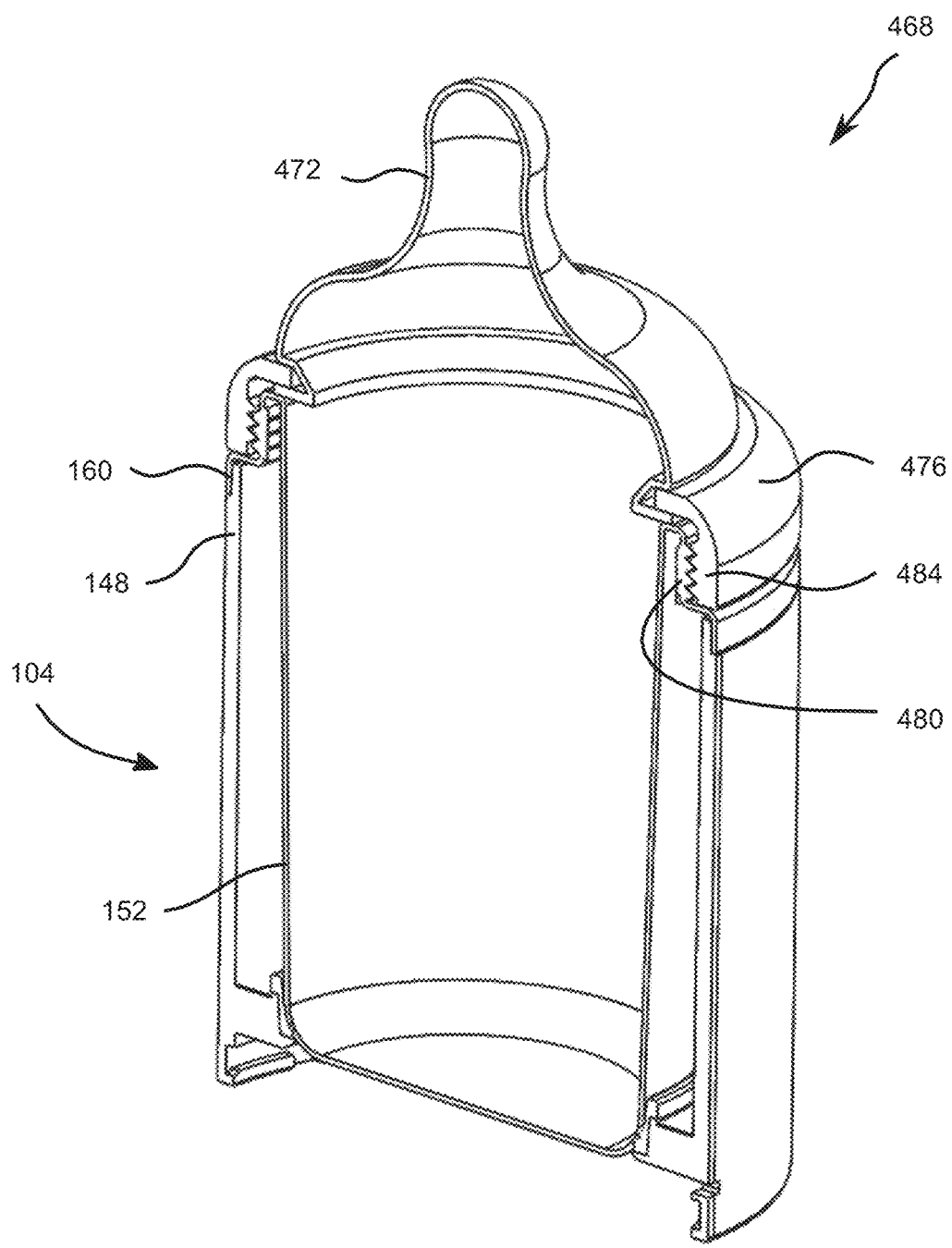
FIG. 56 is a cut-away of the warming apparatus of FIG. 54.
Figure 57:
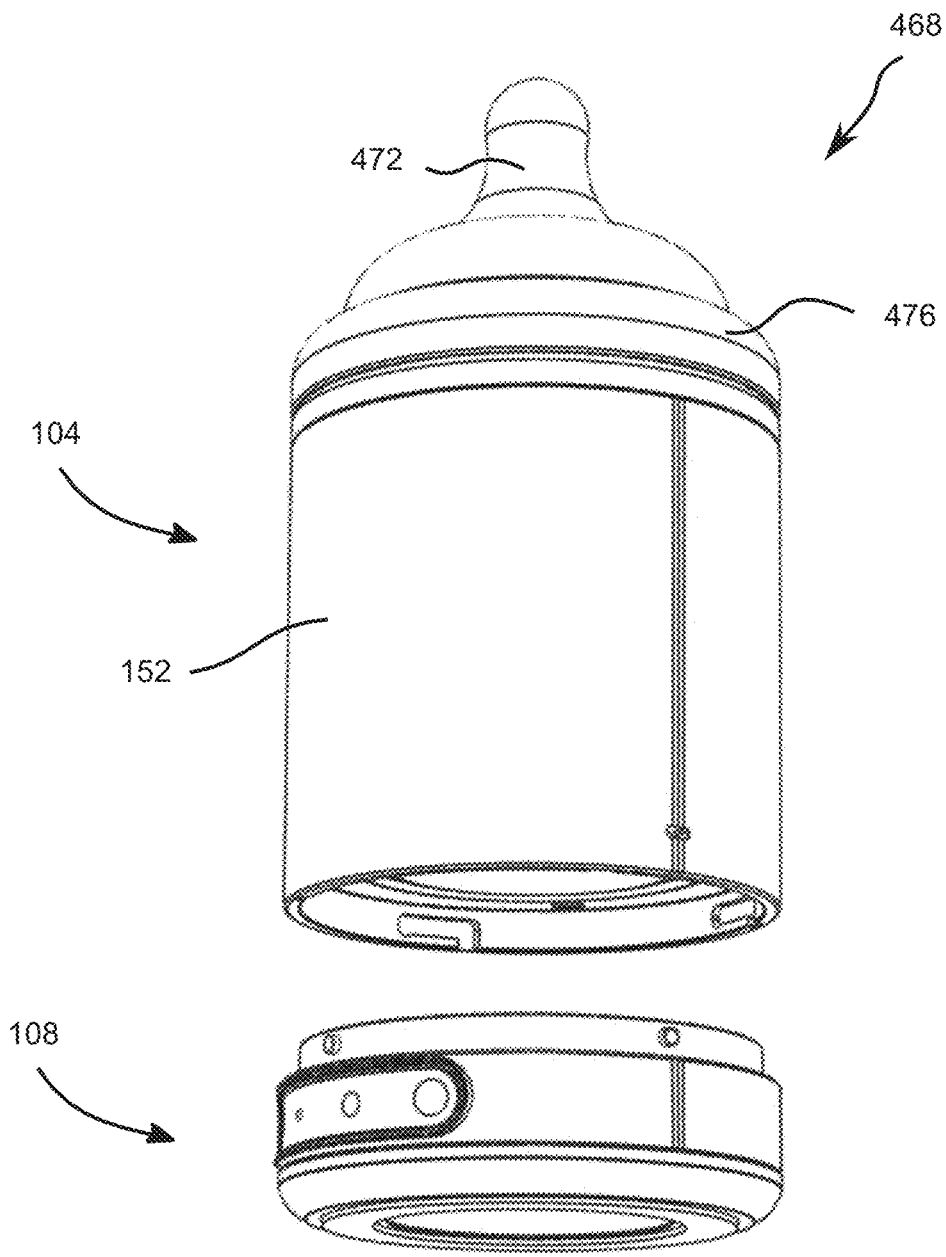
FIG. 57 is an exploded view of the warming apparatus of FIG. 54.

The apparatus need not be configured for hot beverages. In some embodiments, the apparatus may be configured to heat beverages and maintain a warm temperature. For instance, the ideal temperature for infants' milk is approximately 36 to 40° C. Breast milk or formula may be stored in a refrigerator or at room temperature and must be heated to 36 to 40° C. before it can be fed to an infant. FIGS. 54 to 57 show a warming apparatus 468 for heating a beverage such as breast milk or baby formula and keeping the beverage warm. Instead of the lid shown in previous embodiments, the apparatus 468 has a nipple 472 for feeding a beverage to a baby. The nipple 472 may be removably attached to the container 104, for example with a threaded ring 476, as shown in FIGS. 54 to 57. The container 104 may include a threaded portion 480 that is complementary to threads 484 on the threaded ring 476. When the threaded ring 476 is attached to the container 104, the threaded ring 476 may form a watertight seal with the container 104, as shown in FIG. 56.

Figure 58:
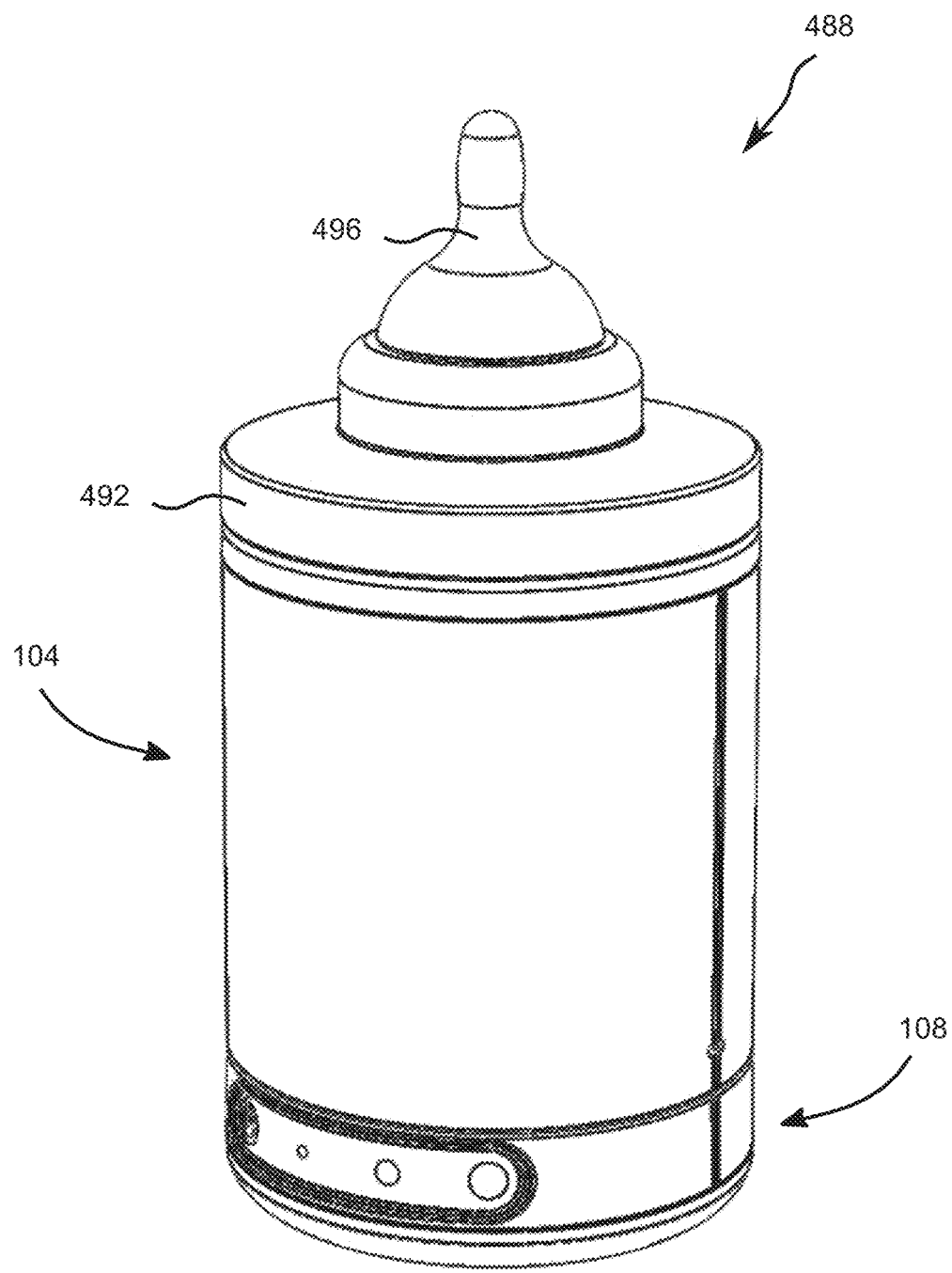
FIG. 58 is a perspective view of another warming apparatus.
Figure 59:
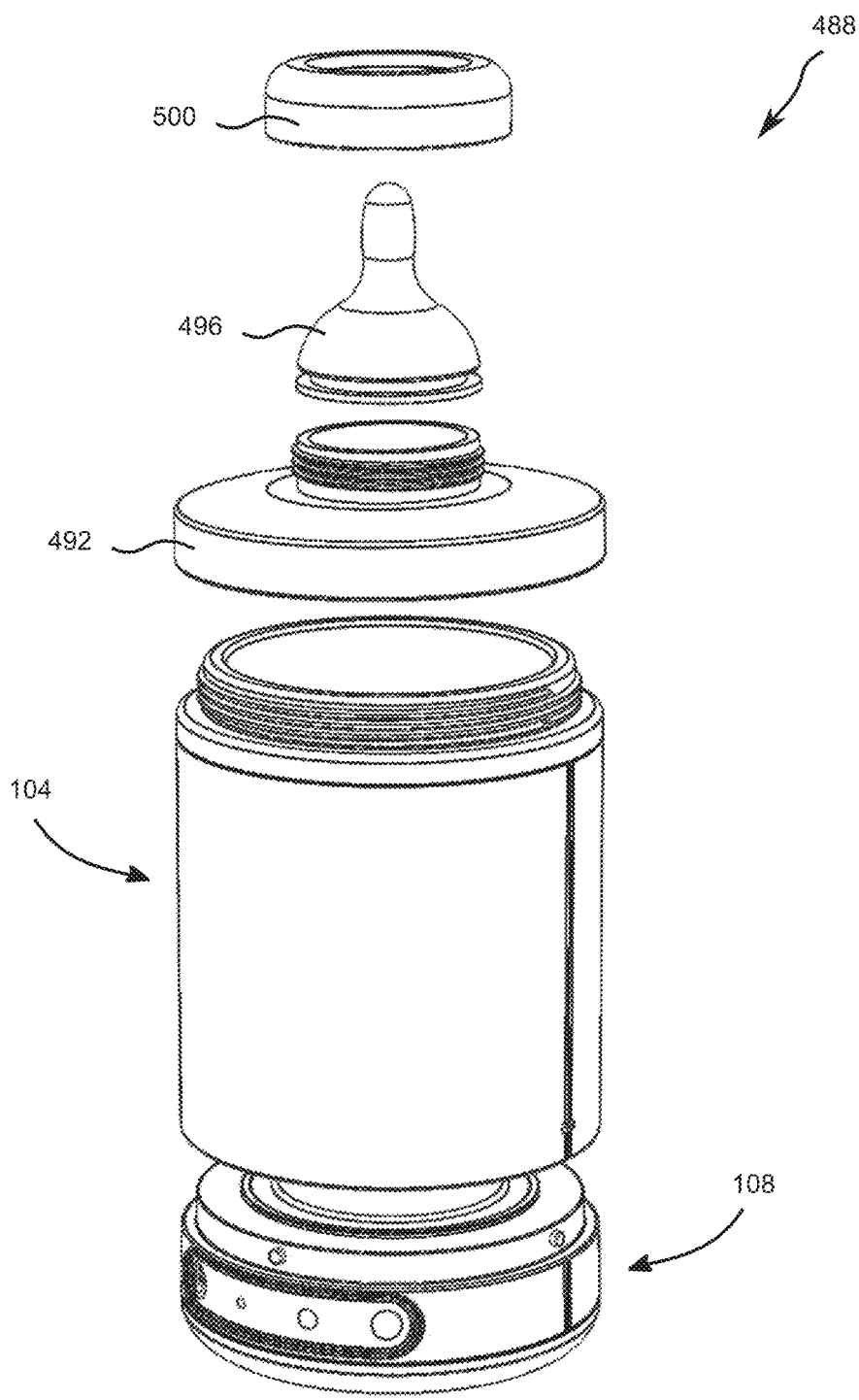
FIG. 59 is an exploded view of the another warming apparatus of FIG. 58.

Another warming apparatus 488 is shown in FIGS. 58 and 59. The warmer apparatus 488 has a lid 492 for attaching a nipple 496 that is narrower than the nipple shown in FIGS. 54 to 57. The lid 492 is removably attachable to the container 104, for example, with threads. The nipple 496 is removably attachable to the lid 492. In the embodiment shown in FIGS. 58 to 59, the nipple 496 is attachable to the lid 492 with a threaded ring 500.

The warming apparatuses 468, 488 may be attachable to the base 108. The base 108 may be configured to heat either hot beverages or warm beverages, or the base 108 may be configured to heat both hot and warm beverages.

One advantage of the above disclosed apparatus is that all of the electrical components are contained in a detachable base, which does not require regular cleaning. The container for holding liquids contains no electrical components and is therefore dishwasher safe. A further advantage of the apparatus is that heat is efficiently transferred from the base to the inner cup. Because the base directly contacts the inner cup, it is possible to power the apparatus with a portable power source for an acceptable length of time.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An apparatus for heating beverages comprising:
 a base having:
  a heater plate;
  at least one heater element attached to the heater plate and configured to heat at least a portion of the heater plate; and
  a power source electrically connected to the heater element and configured to provide current to the at least one heater element; and
 a container for holding a liquid, subject to temperature increase by said heater plate, the container removably attached to the base, the container having:
  a chassis having an open top for receiving the liquid, a circumferential wall, and an open bottom;
  an inner cup nested inside the chassis, the inner cup made of conductive material and having an open top for receiving the liquid, a circumferential wall spaced from the circumferential wall of the chassis to define an annular gap, and a closed bottom configured to contact the heater plate when the container is attached to the base; and
  a sealing mechanism for sealing the annular gap.

2. The apparatus of claim 1, the sealing mechanism comprising:
 a metal ring attached to an outer surface of the circumferential wall of the inner cup, the metal ring for attaching the inner cup to a bottom portion of said chassis;
 at least two fasteners for attaching the metal ring to the bottom portion of said chassis and configured to bias the inner cup toward the bottom portion of the chassis; and
 a gasket for sealing the chassis to the inner cup, the gasket fitted between the inner cup and the chassis.

3. The apparatus of claim 1, the sealing mechanism further comprising a waterproof sealant between the inner cup and the chassis.

4. The apparatus of claim 1, the open top of the inner cup having a lip, the lip configured to overlap with the open top of the chassis.

5. The apparatus of claim 1 further comprising an attachment mechanism for attaching the base to the container.

6. The apparatus of claim 1, the bottom portion of said inner cup having flexibility such that, when the container is attached to the base, the bottom portion of the inner cup is pressed into the bottom portion and substantially contacts the heater plate.

7. The apparatus of claim 1, the closed bottom and the circumferential wall of the inner cup having a thickness of about 0.3 to about 0.9 millimeters.

8. The apparatus of claim 7, the closed bottom and the circumferential wall of the inner cup having a thickness of about 0.5 to about 0.6 millimeters.

9. The apparatus of claim 1, the base further comprising an insulating plate in contact with the at least one heater element on a side opposite to the heater plate.

10. The apparatus of claim 1, the base further comprising a temperature sensor for detecting the temperature of said heater plate and transmitting a temperature signal based on the temperature of the heater plate.

11. The apparatus of claim 10, the base further including a microcontroller for controlling the at least one heater element, the microcontroller configured to:
   receive the temperature signal from the temperature sensor; and
   control the at least one heater element responsive to the temperature signal.

12. The apparatus of claim 11, the microcontroller programmable with at least one temperature curve, the microcontroller further configured to:
   determine a rate of change in the temperature of the heater plate; and
   control the at least one heater element responsive to (a) the rate of change in the temperature of the heater plate and (b) the at least one temperature curve.

13. The apparatus of claim 12, the base further comprising an input device for selecting a desired temperature, the microcontroller further configured to:
   receive an input signal from the input device; and
   control the at least one heater element responsive to the input signal.

14. An apparatus for heating beverages comprising:
   a heater;
   a container for holding a liquid, subject to temperature increase by said heater, the container removably attached to the heater, the container having:
      a chassis having an open top for receiving the liquid, a circumferential wall, and an open bottom;
      an inner cup nested inside the chassis, the inner cup having an open top for receiving the liquid, a circumferential wall spaced from the circumferential wall of the chassis, and a closed bottom configured to contact the heater when the container is attached to the heater; and
      a sealing mechanism for sealing the chassis to the inner cup.

* * * * *